US010204322B2

(12) United States Patent
Apostolides

(10) Patent No.: US 10,204,322 B2
(45) Date of Patent: *Feb. 12, 2019

(54) SERVICE OPERATION DATA PROCESSING USING CHECKLIST FUNCTIONALITY IN ASSOCIATION WITH INSPECTED ITEMS

(71) Applicant: RPM Industries, LLC, Washington, PA (US)

(72) Inventor: John K. Apostolides, Pittsburgh, PA (US)

(73) Assignee: RPM INDUSTRIES, LLC, Washington, PA (US)

(*) Notice: Subject to any disclaimer, the term of this patent is extended or adjusted under 35 U.S.C. 154(b) by 413 days.

This patent is subject to a terminal disclaimer.

(21) Appl. No.: 14/825,758

(22) Filed: Aug. 13, 2015

(65) Prior Publication Data

US 2016/0104127 A1 Apr. 14, 2016

Related U.S. Application Data

(63) Continuation of application No. 12/722,228, filed on Mar. 11, 2010, now Pat. No. 9,141,935, which is a
(Continued)

(51) Int. Cl.
*G06Q 10/00* (2012.01)
*G06Q 10/06* (2012.01)
(Continued)

(52) U.S. Cl.
CPC ............ *G06Q 10/20* (2013.01); *G06Q 10/06* (2013.01); *G06Q 10/06395* (2013.01);
(Continued)

(58) Field of Classification Search
CPC ......... G06Q 10/00; G06Q 40/00; G06F 17/60
(Continued)

(56) References Cited

U.S. PATENT DOCUMENTS 6,023,680 A * 2/2000 Wooster ........... G06Q 10/06316
705/7.26
6,070,155 A 5/2000 Cherrington et al.
(Continued)

FOREIGN PATENT DOCUMENTS

EP 1267310 A2 12/2002
JP 2004-227307 A 8/2004
(Continued)

OTHER PUBLICATIONS

Mobile Field Service Application: Reducing the Cost of Field Service in the Office Automation Industry, *Technologies for Comfort*, SmTAG White Paper, Jun. 2002 (8 pages).
(Continued)

*Primary Examiner* — Romain Jeanty
(74) *Attorney, Agent, or Firm* — K&L Gates LLP

(57) ABSTRACT

In one embodiment, a system is provided for performing at least one service operation in association with at least one inspected item. The system includes a service data device configured for displaying at least one data screen including at least one checklist configured for operative use in connection with performance of the service operation on the inspected item, the data device being portable and being configured for processing at least one communication; a service administrator having at least one data storage medium configured for storing at least one of the checklists displayed on the data device, the service administrator further having at least one server for enabling at least one communication between the service administrator and the data device; at least a portion of at least one of the checklists being customizable by at least the service administrator; and, at least a portion of at least one of the checklists being electronically interactive in association with performance of the service operation on the inspected item.

20 Claims, 89 Drawing Sheets

Related U.S. Application Data continuation-in-part of application No. 12/505,944, filed on Jul. 20, 2009, now Pat. No. 8,150,721, which is a continuation of application No. 10/666,463, filed on Sep. 19, 2003, now Pat. No. 7,565,306.

(51) Int. Cl.
*G06Q 10/10* (2012.01)
*G06Q 30/00* (2012.01)
*G06Q 30/02* (2012.01)

(52) U.S. Cl.
CPC .......... *G06Q 10/10* (2013.01); *G06Q 30/012* (2013.01); *G06Q 30/02* (2013.01)

(58) Field of Classification Search
USPC ...................................................... 705/7.12
See application file for complete search history.

(56) References Cited

U.S. PATENT DOCUMENTS

| | | | |
|---|---|---|---|
| 6,263,322 B1 | 7/2001 | Kirkevold et al. | |
| 6,338,045 B1 | 1/2002 | Pappas | |
| 6,513,045 B1 | 1/2003 | Casey et al. | |
| 6,671,646 B2 | 12/2003 | Manegold et al. | |
| 7,048,185 B2 | 5/2006 | Hart | |
| 7,080,325 B2 | 7/2006 | Treibach-Heck et al. | |
| 7,171,372 B2 | 1/2007 | Daniel et al. | |
| 7,403,915 B2 * | 7/2008 | Bundy | G06Q 30/0609 705/26.3 |
| 7,565,306 B2 | 7/2009 | Apostolides | |
| 7,918,402 B2 * | 4/2011 | Conlon | G06Q 10/08 235/375 |
| 8,150,721 B2 | 4/2012 | Apostolides | |
| 8,195,532 B2 | 6/2012 | Zwerger et al. | |
| 8,239,278 B1 | 8/2012 | Pohl | |
| 9,141,935 B2 | 9/2015 | Apostolides | |
| 2001/0047283 A1 | 11/2001 | Melick et al. | |
| 2002/0073000 A1 | 6/2002 | Sage | |
| 2002/0073012 A1 | 6/2002 | Lowell et al. | |
| 2002/0111844 A1 | 8/2002 | Vanstory et al. | |
| 2002/0116246 A1 | 8/2002 | Wippersteg | |
| 2002/0120535 A1 | 8/2002 | Yu | |
| 2002/0138394 A1 | 9/2002 | Elliott | |
| 2003/0055666 A1 | 3/2003 | Roddy et al. | |
| 2003/0065522 A1 | 4/2003 | Wepfer et al. | |
| 2006/0030983 A1 | 2/2006 | Bautista | |
| 2010/0030615 A1 | 2/2010 | Doyle et al. | |
| 2014/0039648 A1 | 2/2014 | Boult et al. | |
| 2014/0316998 A1 | 10/2014 | Apostolides | |

FOREIGN PATENT DOCUMENTS

| | | |
|---|---|---|
| WO | WO 98/52046 A1 | 11/1998 |
| WO | WO 00/79375 A1 | 12/2000 |
| WO | WO 2005/031500 A2 | 4/2005 |
| WO | WO 2007/143027 A2 | 12/2007 |

OTHER PUBLICATIONS

Muller, M., "Chapter 4: The Basics of Bar Coding," *Essentials of Inventory Management*, American Management Association, Jan. 28, 2003, pp. 89-113.

Stat™, Version 4.1, User's Guide, Quest Software, Irvine, California, 2002, 420 pages.

* cited by examiner

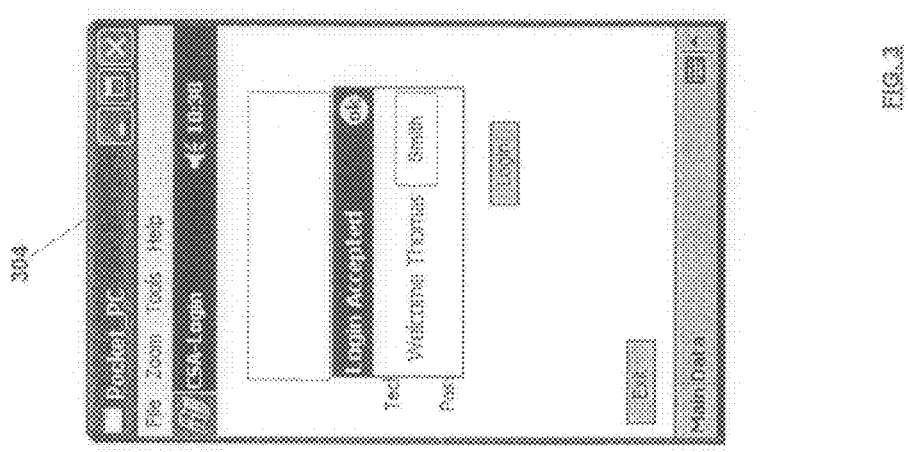
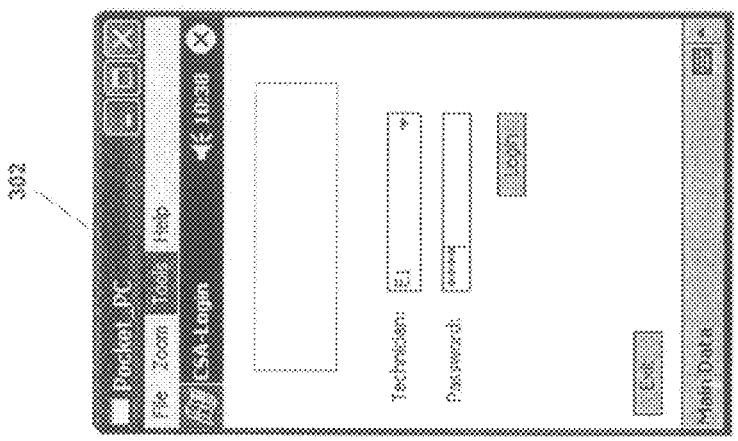
FIG. 3

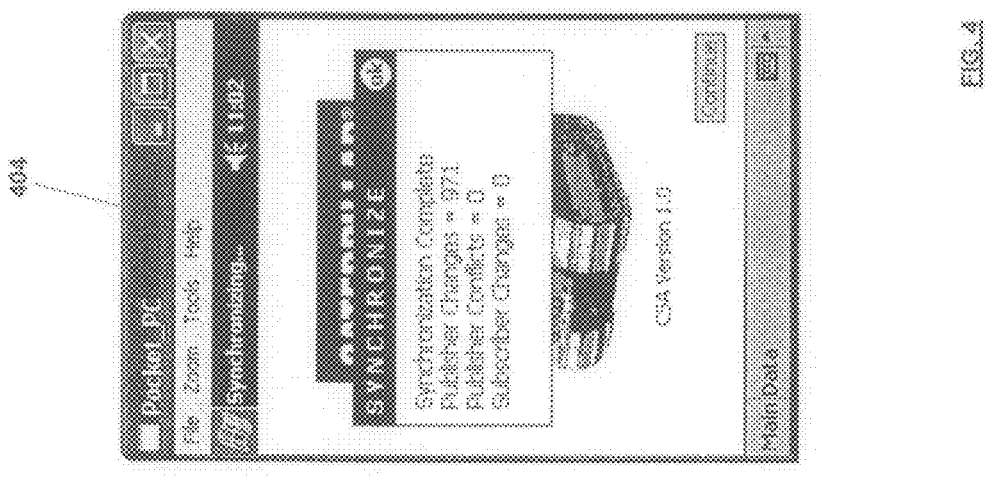
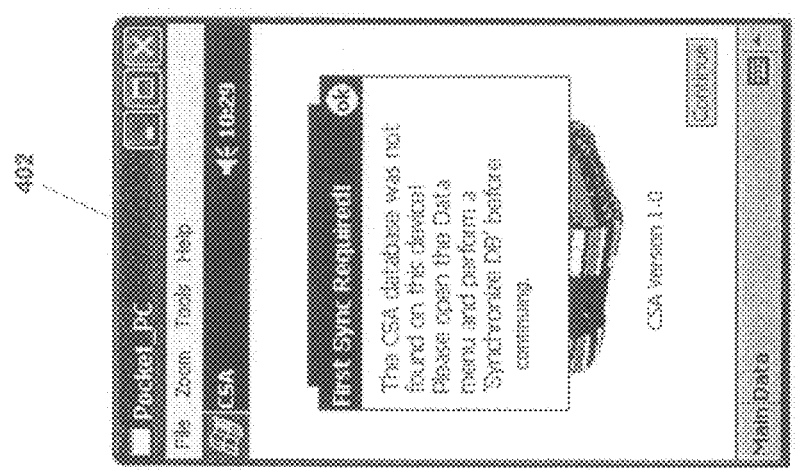
FIG. 4

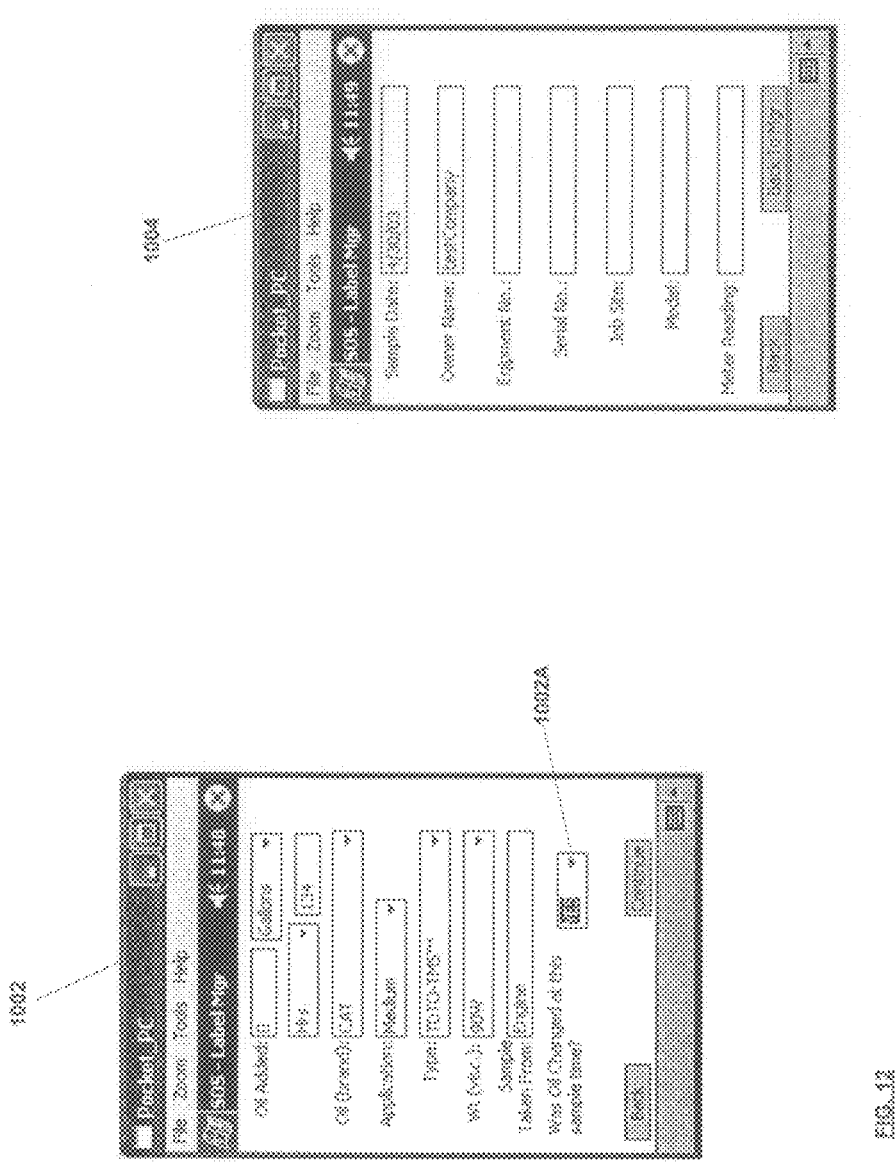

| Serial No | Compartment ID | Oil Added | Sample Date | Meter Reading | Hours On Oil | Application |
|---|---|---|---|---|---|---|
| ABCD5678 | Engine | 12 | 6/19/03 9:44 PM | 250 | 250 | Light |
| ABCD5678 | Transmission | 0 | 6/19/03 9:44 PM | 250 | 250 | Medium |
| ABCD5678 | Hydraulic | 0 | 6/19/03 9:44 PM | 250 | 250 | Medium |
| ABCD5678 | Left Rear Final | 0 | 6/19/03 9:44 PM | 250 | 250 | Heavy |
| ABCD5678 | Right Rear Final | 0 | 6/19/03 9:44 PM | 250 | 250 | Heavy |
| ABCD5678 | Rear Differential | 0 | 6/19/03 9:44 PM | 250 | 250 | Heavy |
| ABCD5678 | Engine | 12 | 6/26/03 7:53 AM | 525 | 275 | Light |
| ABCD5678 | Transmission | 10 | 6/26/03 7:53 AM | 525 | 525 | Medium |
| ABCD5678 | Hydraulic | 0 | 6/26/03 7:53 AM | 525 | 525 | Medium |
| ABCD5678 | Left Rear Final | 0 | 6/26/03 7:53 AM | 525 | 525 | Heavy |
| ABCD5678 | Right Rear Final | 0 | 6/26/03 7:53 AM | 525 | 525 | Heavy |
| ABCD5678 | Rear Differential | 0 | 6/26/03 7:53 AM | 525 | 525 | Heavy |
| ABCD5678 | Engine | 12 | 7/3/03 8:24 AM | 800 | 275 | Light |
| ABCD5678 | Transmission | 0 | 7/3/03 8:24 AM | 800 | 275 | Medium |
| ABCD5678 | Hydraulic | 0 | 7/3/03 8:24 AM | 800 | 800 | Medium |
| ABCD5678 | Left Rear Final | 0 | 7/3/03 8:24 AM | 800 | 800 | Heavy |
| ABCD5678 | Right Rear Final | 0 | 7/3/03 8:24 AM | 800 | 800 | Heavy |
| ABCD5678 | Rear Differential | 0 | 7/3/03 8:24 AM | 800 | 800 | Heavy |
| ABCD5678 | Engine | 12 | 7/14/03 3:14 PM | 1000 | 200 | Light |
| ABCD5678 | Transmission | 0 | 7/14/03 3:14 PM | 1000 | 475 | Medium |
| ABCD5678 | Hydraulic | 0 | 7/14/03 3:14 PM | 1000 | 1000 | Medium |
| ABCD5678 | Left Rear Final | 0 | 7/14/03 3:14 PM | 1000 | 200 | Heavy |
| ABCD5678 | Right Rear Final | 0 | 7/14/03 3:14 PM | 1000 | 200 | Heavy |
| ABCD5678 | Rear Differential | 0 | 7/14/03 3:14 PM | 1000 | 1000 | Heavy |

Fig. 13A

| Fluid ID | Viscosity ID | Oil Changed |
|---|---|---|
| Engine Oil | 15W40 | True |
| Transmission Oil | 30 | False |
| Hydraulic Oil | 10 | False |
| Final Drive Oil | 50 | False |
| Final Drive Oil | 50 | False |
| Final Drive Oil | 50 | False |
| Engine Oil | 15W40 | True |
| Transmission Oil | 30 | True |
| Hydraulic Oil | 10 | False |
| Final Drive Oil | 50 | False |
| Final Drive Oil | 50 | False |
| Final Drive Oil | 50 | False |
| Engine Oil | 15W40 | True |
| Transmission Oil | 30 | False |
| Hydraulic Oil | 10 | False |
| Final Drive Oil | 50 | True |
| Final Drive Oil | 50 | True |
| Final Drive Oil | 50 | False |
| Engine Oil | 15W40 | True |
| Transmission Oil | 30 | False |
| Hydraulic Oil | 10 | False |
| Final Drive Oil | 50 | False |
| Final Drive Oil | 50 | False |
| Final Drive Oil | 50 | True |

Fig. 13B

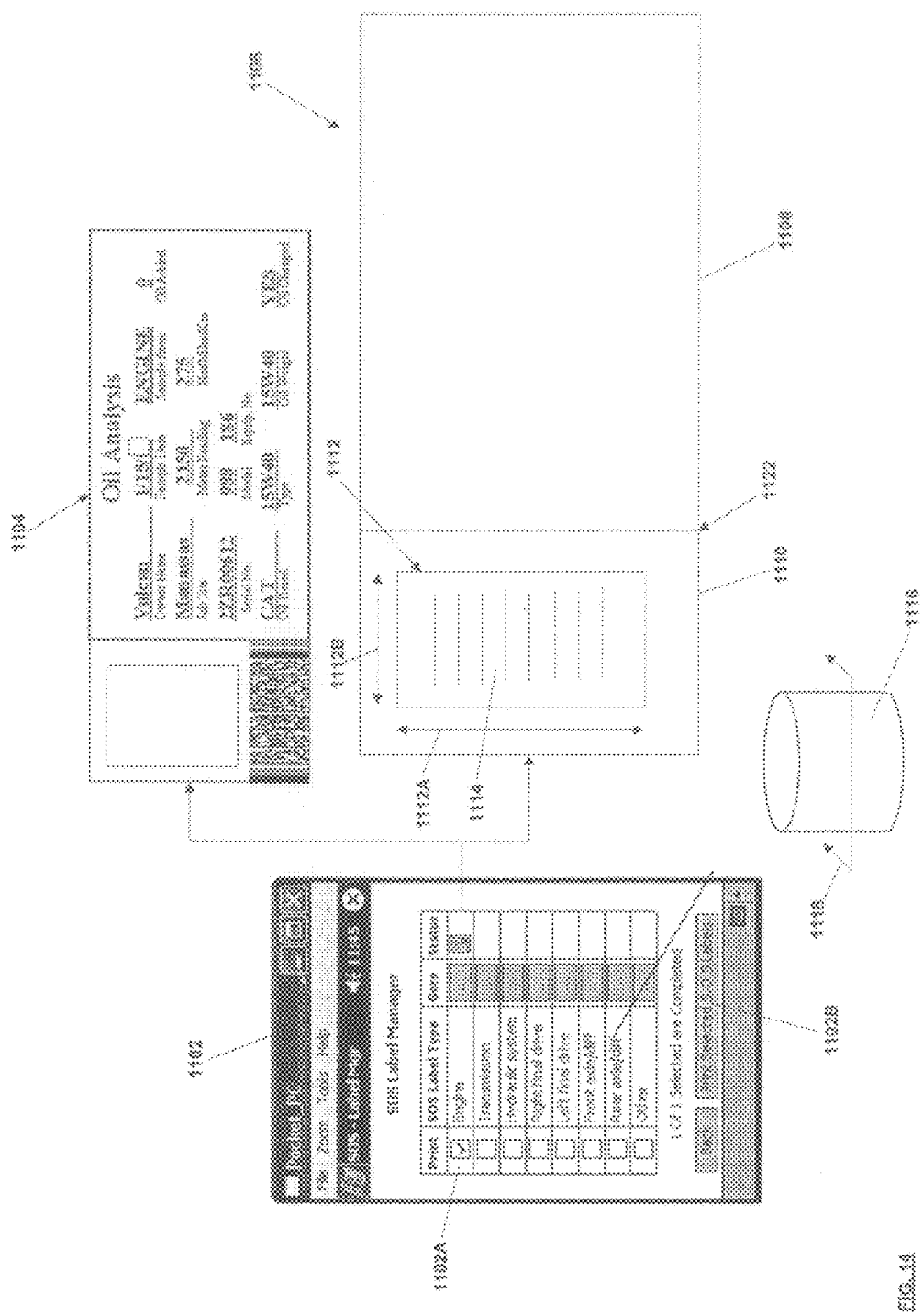

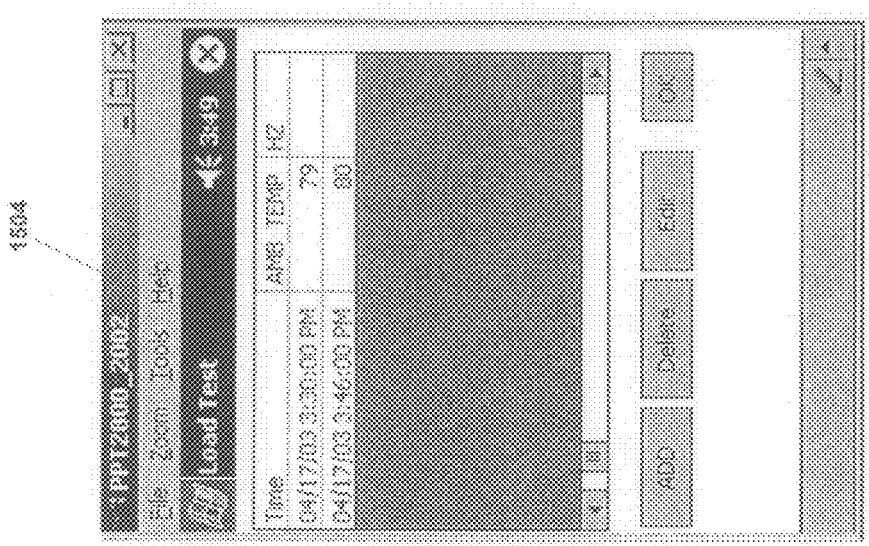
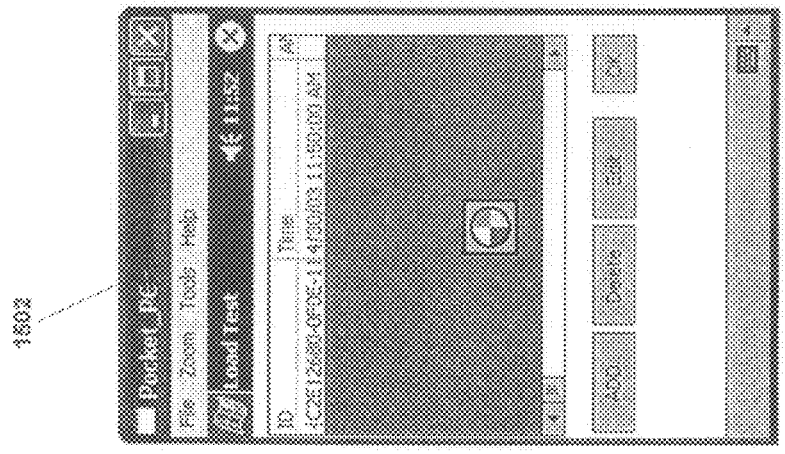
FIG. 19

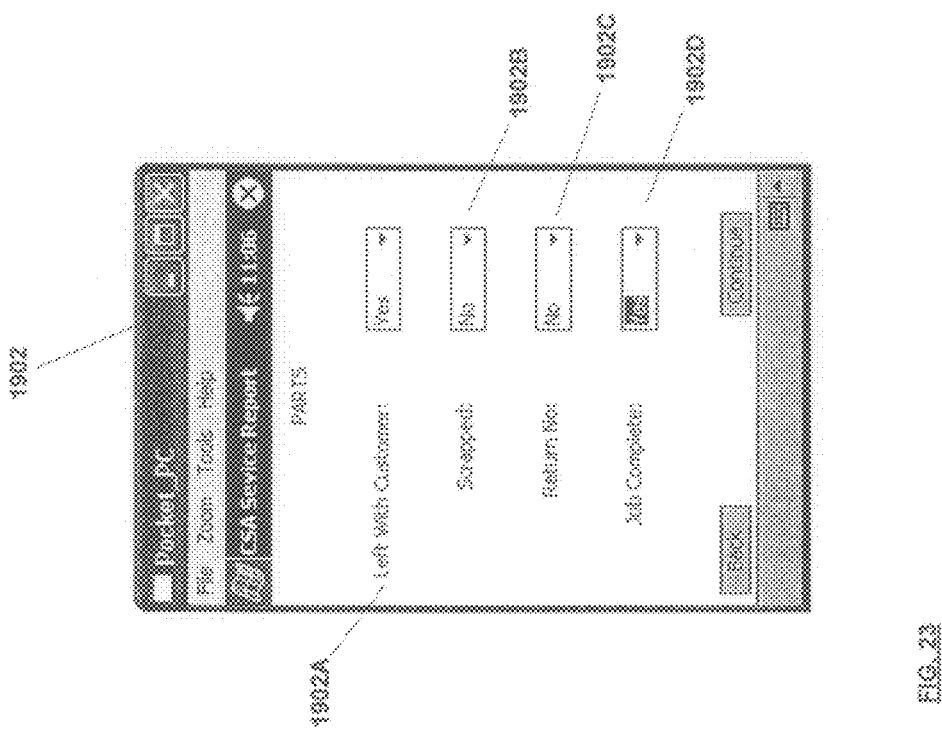

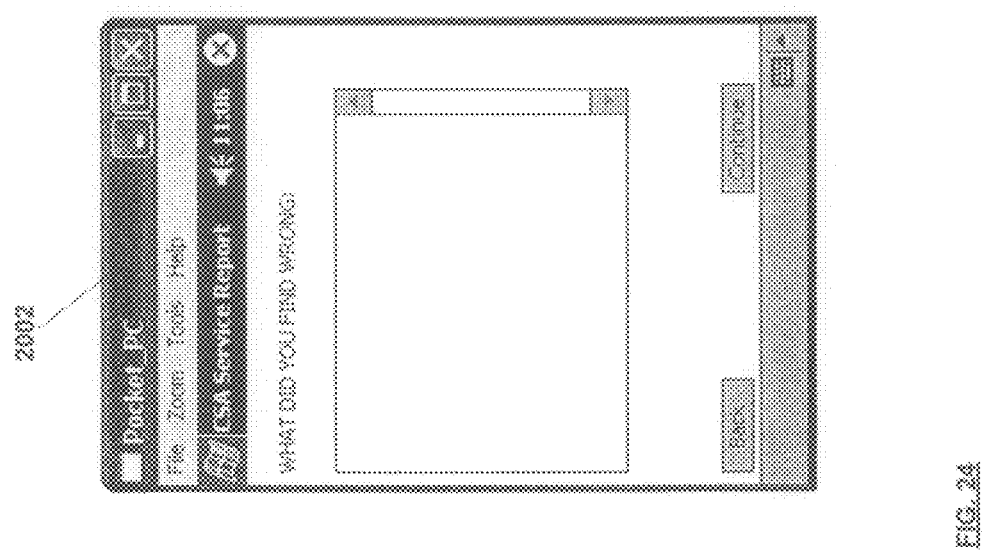

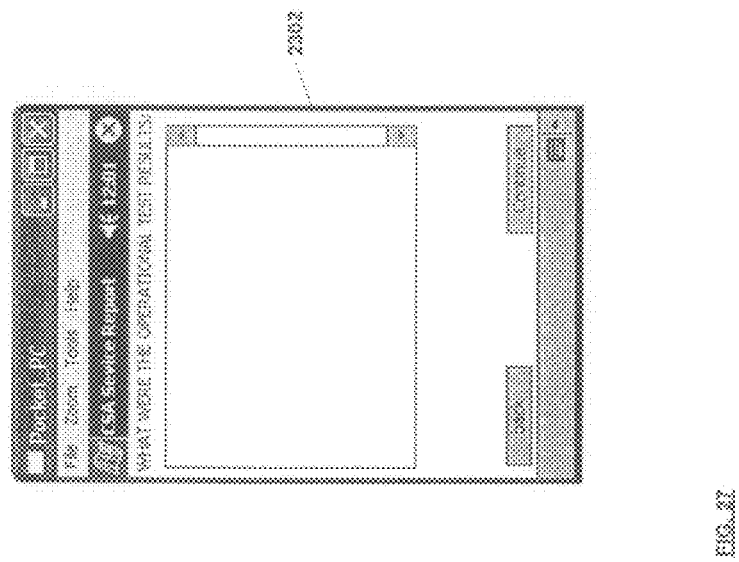

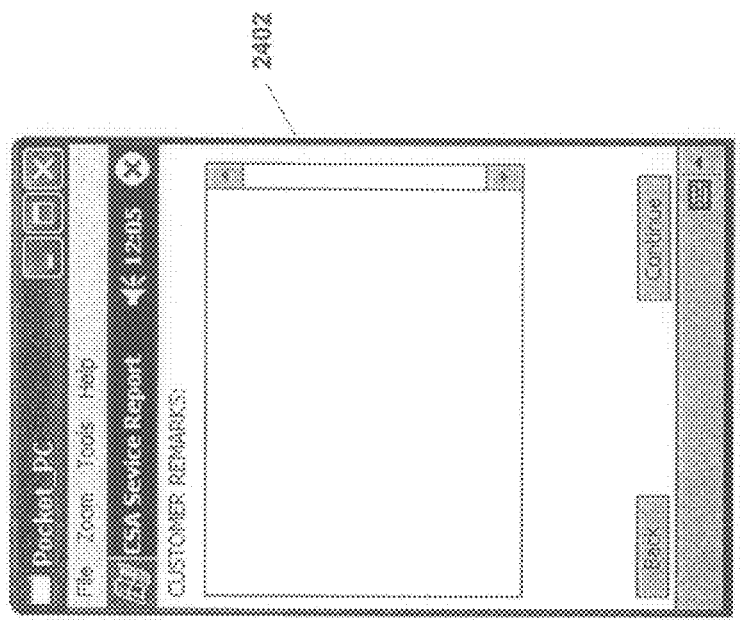

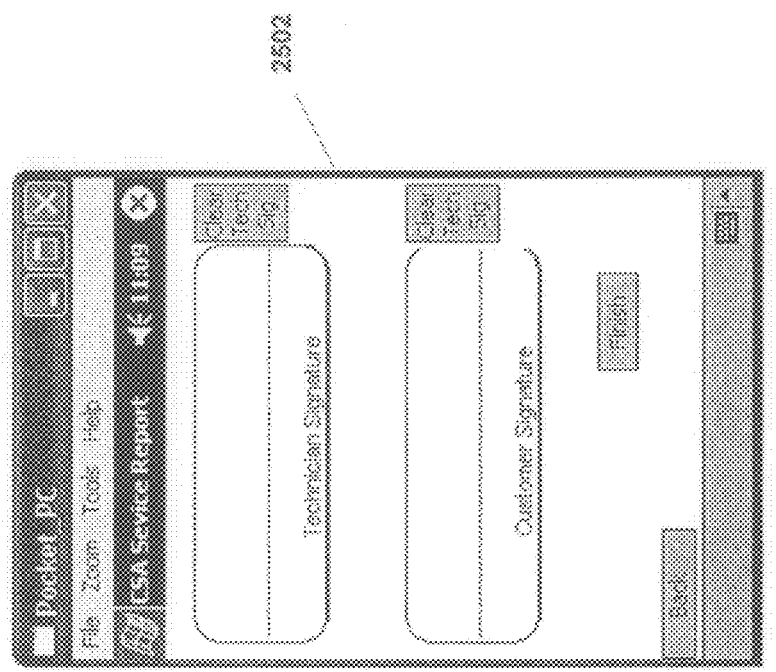

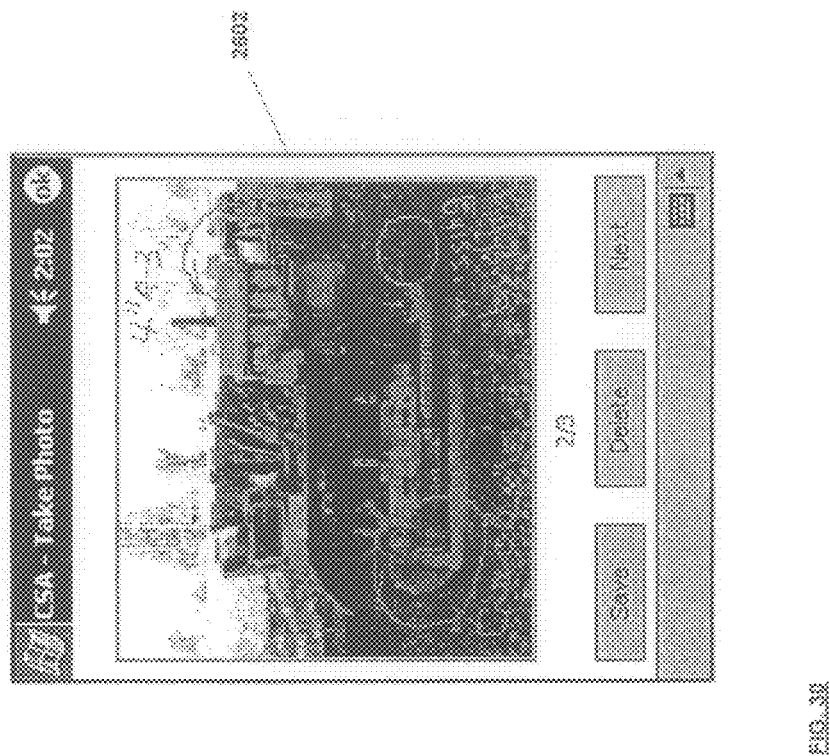

Question 8: Sample screen displays specific to performing an unassigned work order function with the PDA.

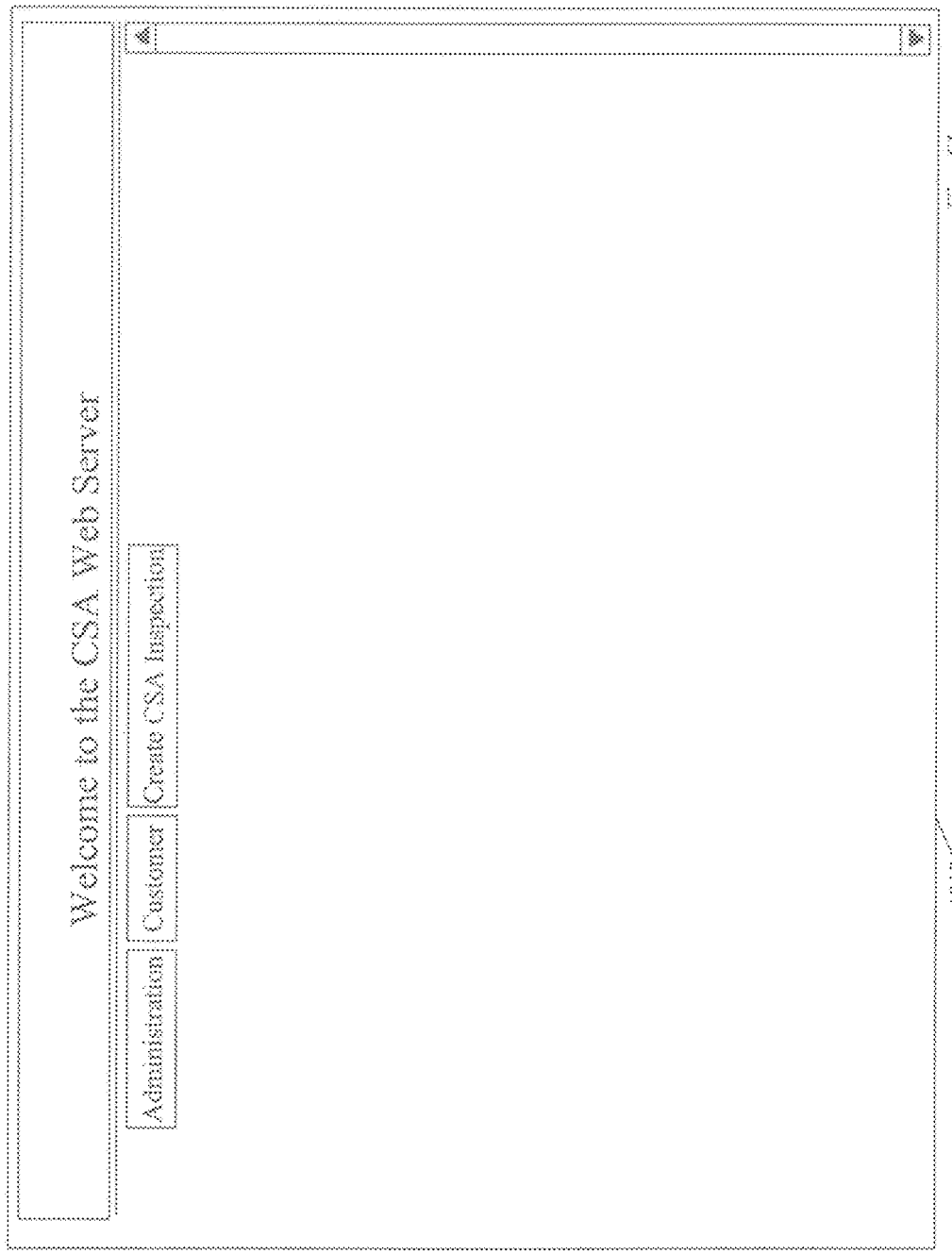

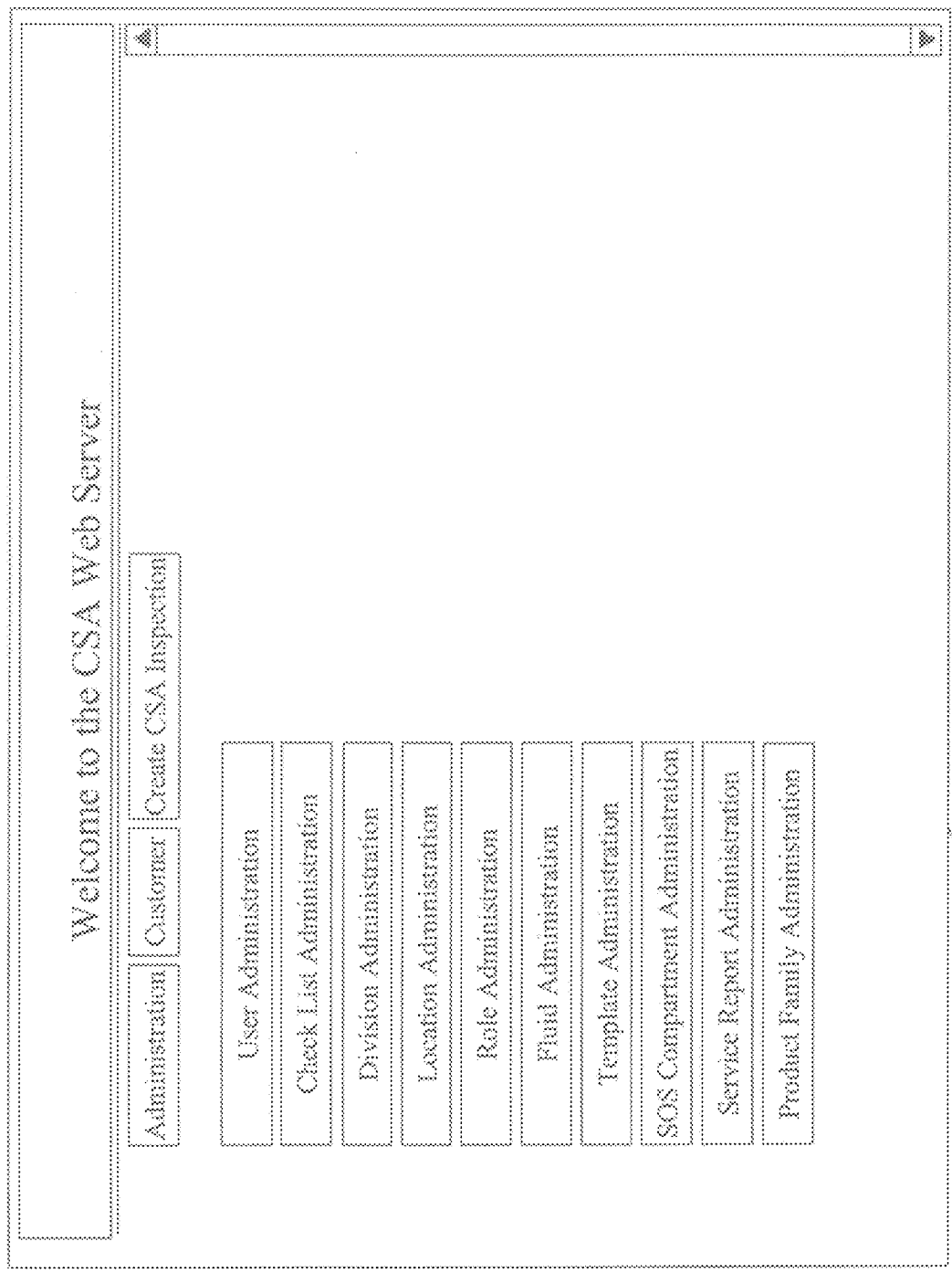

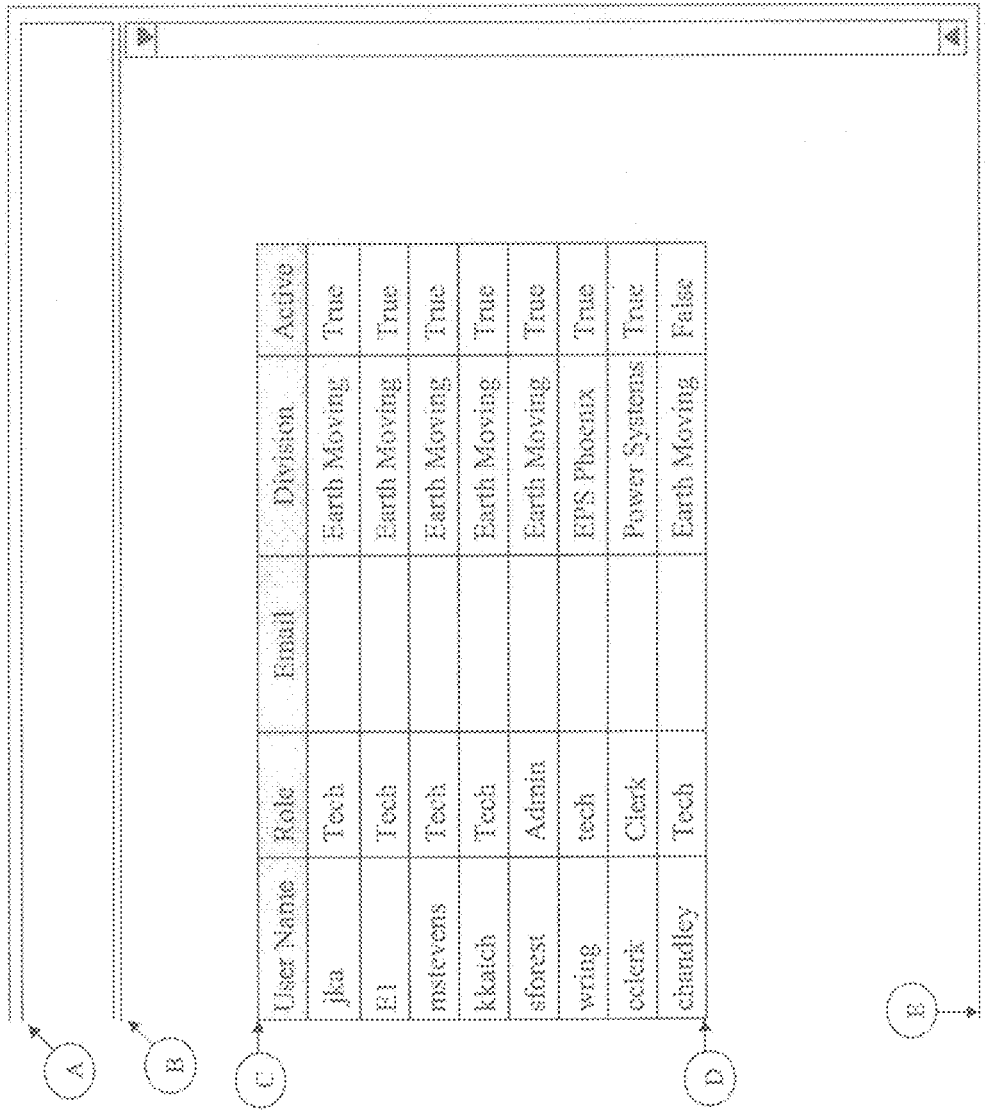

Division Administration

| Administration | Customer | Create CSA Inspection |

*Division Description

[Submit]

| Division Description |
| Power Systems |

- User Admin
- Check List Admin
- Location Admin
- Role Admin
- Fluid Admin
- Template Admin
- SOS Compartment Admin
- Service Report Admin
- Product Family Admin

| | | | |
|---|---|---|---|
| Delete | | CAT DEO SYN™ | (Synthetic Diesel Engine Oil) |
| Delete | 10 | CAT ELC™ | (Extended Life Coolant) |
| Delete | | CAT ELC™ Extender | (Extended Life Coolant Extender) |
| Delete | 12 | CAT FDAO SYN™ | (Synthetic Final Drive and Axle Oil) |
| Delete | | CAT FDAO™ | (Final Drive and Axle Oil) |
| Delete | 14 | CAT FDAO+™ | (Final Drive and Axle Oil Plus) |
| Delete | | CAT GO | (Gear Oil) |

Template Detail

[Administration] [Customer] [Create CSA Inspection] [Template Admin]

☐ Default Template

[Copy]

Select Template: [Wheel Loaders ▾]

Inspection Type: 
- Select an Inspection Type
- Select an Inspection Type
- Cooling System Radiator assy
- Lubrication, Fuel & Air Systems
- Cranking & Charging Systems
- Generators & Control Systems
- Exhaust System
- Automatic Transfer Switch
- Return System to Normal Operation
- Fluid and Filters Changed
- Oil Samples Taken and Fluid Levels Checked
- Checked

Fig. 70

Template Detail

| Administration | Customer | Create CSA Inspection | | Template Admin |

☐ Default Template

Select Template: Wheel Loaders ▼  Copy

Inspection Type: Fluid and Filters Changed ▼  Add

Select a Question to Add.
Select a Question to Add.
Engine Oil/Filter Changed 250
Transmission Filter Changed 500
Hydraulic Filter Changed 500
Transmission Oil Changed 1000
Pri/Sec Fuel Filters Changed 250

Create Template

Cancel

Fig. 71

Template Detail

[Administrators] [Customer] [Create CSA Inspection] [Template Admin]

Select Template: Wheel Loaders ▼ ☐ Default Template

Inspection Type: Fluid and Filters Changed ▼ Copy

Select a Question to Add... ▼ Add

Create Template

| ID | Sort Order | Description | Response Type | Service Interval |
|---|---|---|---|---|
| 122 | 1 | Engine Oil/Filter Changed | 1 | 250 |
| 123 | 2 | Transmission Filter Changed | 1 | 500 |
| 124 | 3 | Hydraulic Filter Changed | 1 | 500 |
| 125 | 4 | Transmission Oil Changed | 1 | 1000 |
| 126 | 5 | Pri/Sec Fuel Filters Changed | 1 | 250 |

Delete (for each row)

Fig. 72

Template Administration

| Administration | Customer | Create CSA Inspection | Back | Create/Edit Template |

Power Systems

| Template Name |
|---|
| power |
| Delete |

Check List Items

| Description | Service Interval |
|---|---|
| Oil and Fuel Leaks | 250 |
| Frame Condition | 250 |
| Track Adjustment | 250 |
| Engine Oil/Filter Changed | 250 |
| Transmission Filter Changed | 500 |
| Hydraulic Filter Changed | 500 |
| Transmission Oil Changed | 1000 |
| Pri/Sec Fuel Filters Changed | 250 |

- User Admin
- Check List Admin
- Division Admin
- Location Admin
- Rule Admin
- Fluid Admin
- SOS Compartment Admin
- Service Report Admin
- Product Family Admin

Fig. 73

Description Code Administration

| Code | Description | Response | Active |
|---|---|---|---|
| | Structural | 1 | True |
| B | Surface | 2 | True |
| | Leaks | 3 | True |
| D | Factory Assembly | 4 | True |
| | System Malfunction | 5 | True |
| E | Factory Shipping | 6 | True |
| | General Repair | 7 | True |
| H | Adjustment | 8 | True |
| | Serviceability | 9 | True |
| N | Abuse | 0 | True |

Fig. 75

Welcome to the CSA Web Server

| Administration | Customer | Create CSA Inspection | Add Customer |

| Customer Number | Company | Contact | City | State | Zip | Equipment |
|---|---|---|---|---|---|---|
| | | | | | | Equipment |
| 11 | RPM Industries, Inc. | | Washington | PA | 15301 | Equipment |
| | testCompany | | lexington | vt | 24450 | Equipment |
| | Motorola Mos 12 | | Phoenix | AZ | 85099 | Equipment |

Customer Detail

Administration | Customer | Create CSA Inspection | View Contracts

Customer Number: 2
*Company: Motorola Mos 12
Contact:
Address1:
Address2:
City: Phoenix
State: AZ
Zip: 85009
Telephone 1:
Telephone 2:
Fax:
Email:

Submit

5102

Contracts

| Administration | Customer | Create CSA Inspection | Add Contract |

| Agreement Number | Customer Contact | Phone | Service Area | Serial Number |
|---|---|---|---|---|
| | | | | S1201234 |
| | | | | |
| | | | | |

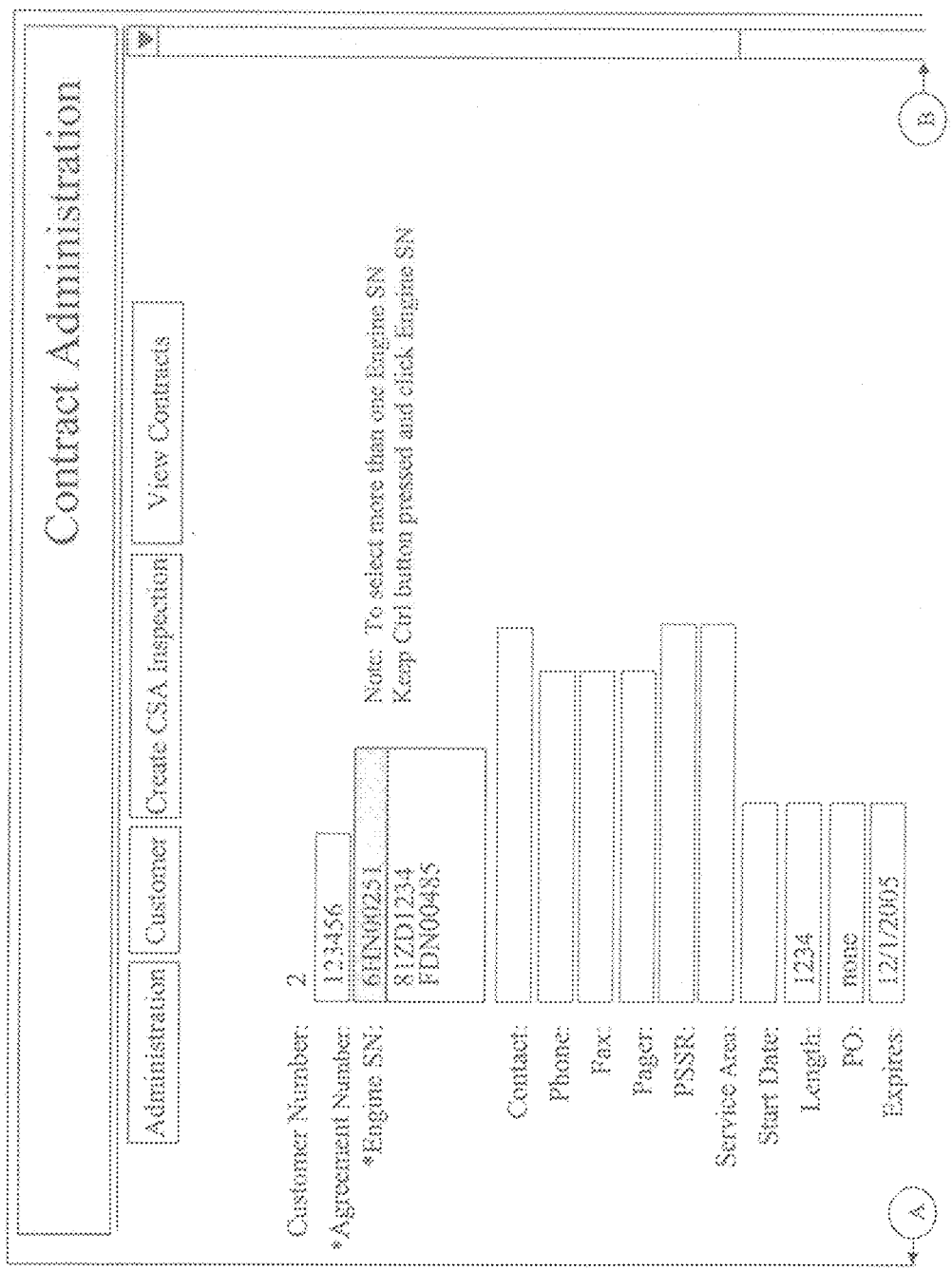

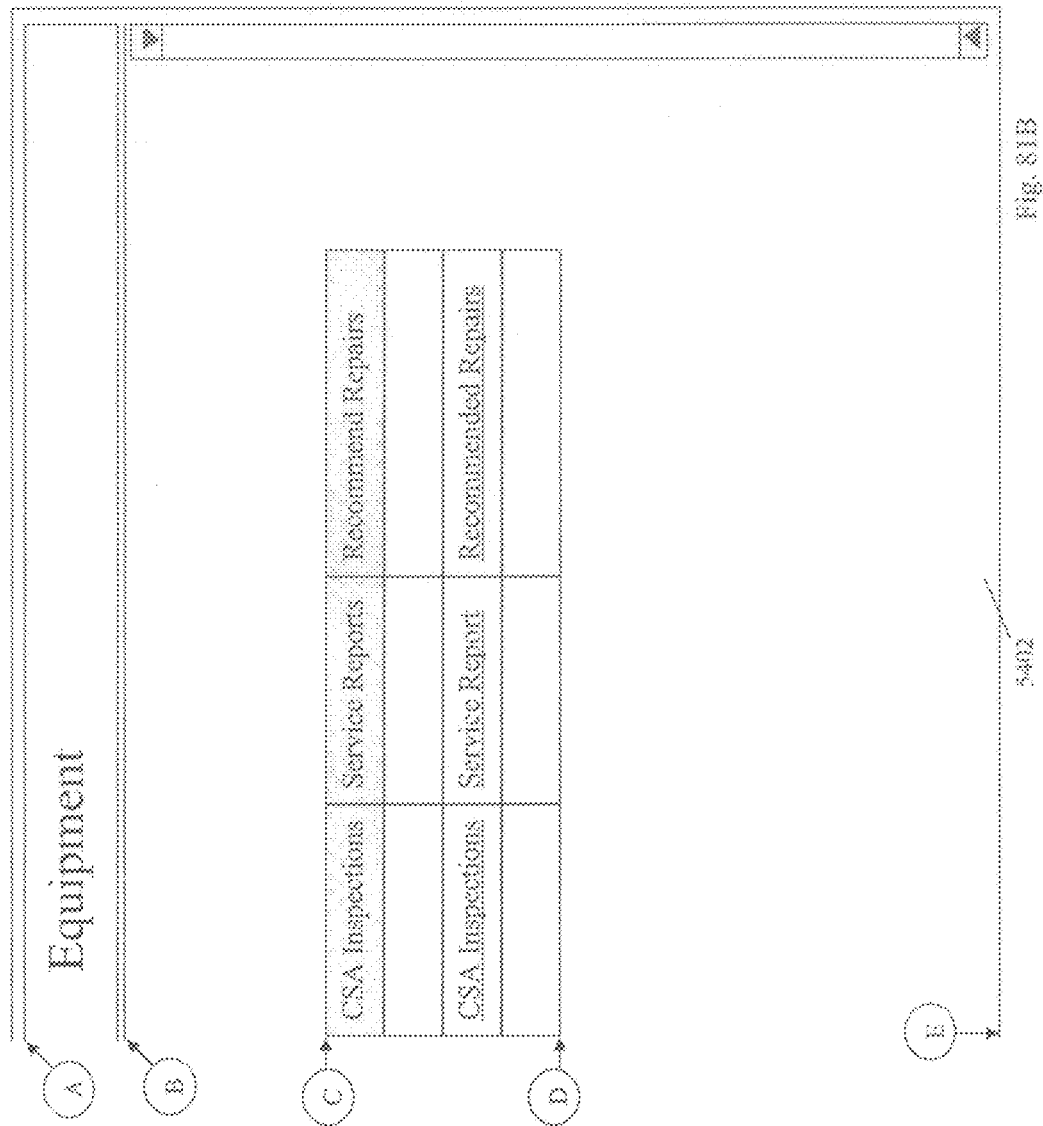

Equipment Detail

| Administration | Customer | Create CSA Inspection | Equipment Admin |

Equipment Number: 3
*Serial Number: JCR01256
Make: CAT
Model: 320BL
Year: 1999
Description: Underground Articulated Truck
Customer Number: 1
Customer Name: RPM Industries, Inc.
Location: WASHINGTON
Equipment Zone: 1
Last Service Type: 250
Last Service Date: 9/14/2001 5:56:00 PM
Meter Reading: 257
Service Interval: 250

[Submit]

Power Systems Equipment Detail

| Administration | Customer | Create CSA Inspection | Equipment Admin |

Customer No: 2
*Serial Number: PDN00485
Make: CAT
Model: 3516B
Arrangement:
CPL:
Engine Specification:
HP:
Generator Make:
Generator Model:
Generator SN:
KW: 2000
Voltage: 1247D
Amps:
Generator Specification:
Air Filter Make:
Air Filter Part Number:

Oil Type:
Oil Quantity:
Coolant Quantity:
Battery Charger Make:
Battery Charger Model:
Battery Charger SN:
Battery Charger Input Volts:
Battery Charger Output Volts:
Battery Charger Output Amps:
Battery Charging Alternator Make:
Battery Charging Alternator Model:
Battery Charging Alternator SN:
Battery Charging Alternator Output Amps:
Batteries Group Number:
Batteries Quantity:
Batteries CCA:
Batteries Lead/Acid:

Fig. 83A

Load Bank

| Test Time | AMB TEMP | HZ | VOLTS | AMPS | AMPS 2 | AMPS 3 | AMPS AVG | KW CAL | OIL PRESSURE | OIL TEMP | EXH TEMP |
|---|---|---|---|---|---|---|---|---|---|---|---|
| 4/23/2003 5:00:00 PM | 75 | 32000 | 120 | 100 | | | | 12 | 15 | 80 | 80 |
| 4/23/2003 5:06:00 PM | 70 | 31000 | 110 | 100 | | | | 11 | 13 | 100 | 100 |
| 4/23/2003 5:10:00 PM | 80 | 32000 | 110 | 100 | | | 143 | 100 | 100 | 100 | 100 |
| 4/23/2003 5:12:00 PM | 74 | 32000 | 120 | 100 | | | | 12 | 13 | 87 | 98 |

| Test Time | EXH TEMP LR | WATER TEMP | WATER IN | WATER OUT | FUEL PRESSURE | EXTRA 1 | EXTRA 2 | EXTRA 3 |
|---|---|---|---|---|---|---|---|---|
| 4/23/2003 5:00:00 PM | 80 | 100 | 100 | 90 | 100 | NA | NA | NA |
| 4/23/2003 5:06:00 PM | 80 | 100 | 100 | 100 | 55 | NA | NA | NA |
| 4/23/2003 5:10:00 PM | 75 | 100 | 100 | 100 | 100 | NA | NA | NA |
| 4/23/2003 5:12:00 PM | 99 | 87 | 72 | 86 | 17 | NA | NA | NA |

Inspection Type Notes

Customer Name: RPM Industries, Inc.    Customer No: 1
Mechanical: 0    Serial No: 0
Type of Service: 500    Meter Hours: Electrical: 1502
Equipment No: SN1234567    Date: 9/15/2001 6:32:00 AM Work Order Number: TDMD418302

Cooling System
Cooling system noie.

Inspection Checklist Item Notes

Customer Name: Motorola Mos 12  Customer No: 2
  Mechanical: 0  Model: 3516B  Serial No: 0
Type of Service: 2    Meter Hours: Electrical: 0000000000
Equipment No: FDN00485    Date: 4/23/2003 4:59:00 PM
      Work Order Number: MZ1111

Inspect cooling system hoses minimal wear but customer demands replacement.

| | PARTS | | |
|---|---|---|---|
| Left with Customer | Scrapped | Return | Job Complete |
| Yes | No | No | Yes |

WHAT DID YOU FIND WRONG?
Found With

WHAT WAS DONE TO REPAIR THE PROBLEM?

Previous  Next

Required Repair Reports

Work Order Number:

Segment: 01
Work Order:
Date & Time: 4/23/2003 3:44:00 PM
Employee:
Customer: Motorola Mos 12

Model: 3516B
Serial No:
Equipment No: 0
Last Serviced:
Last Service Type: 0
Current Service Type: 1
Electrical Meter: 0000000000
Mechanical Meter: 0
Zone Location: N/A
Location:

| Checklist Item | Checklist Response |
|---|---|
| In Phase Monitor | RR |
| inspect radiator/heat exchanger | RR |
| inspect cooling system hoses | RR |

CSA Inspection Report

Work Order Number: MZ1111  Date: 4/3/2003 4:59:00 PM  Mechanical: 0

Customer Name: Motorola Mot 12  Customer No: 2

Equipment No.  Model: 3516B  Serial No: 0

Type of Service: 2  Meter Hours: Electrical: 0000000000

Cooling System

| Inspect radiator/heat exchanger | RR | Check cooling leaks | YES |
| --- | --- | --- | --- |
| Check filler cap | OK | Record freeze/boil over protection | OK |
| Inspect cooling system hoses | RR | Inspect hose clamps | OK |
| Check fan drive/pulleys | OK | Check water pump | OK |
| Check block heater | OK | Check Radiator Hoses | YES |

Lubrication, Fuel & Air Systems

| Replace oil & lube filters | OK | Collect oil sample | OK |
| --- | --- | --- | --- |
| Inspect engine for oil leaks | OK | Inspect crankcase breather | OK |
| Replace fuel filters | OK | Drain water from separators | OK |

Fig. 90A

| | | Inspect fuel filters | OK |
|---|---|---|---|
| Inspect fuel priming pump | OK | Inspect day tank/controls | OK |
| Inspect fuel tank | OK | Replace air filters | OK |
| Check all fuel lines | OK | Inspect air filter seals/clamps/pathways | OK |
| Inspect air filter housing | OK | | |
| Inspect all louvers/passageways | OK | | |
| Cranking & Charging Systems | | | |
| | | Check battery electrolyte level | OK |
| Check Alternator output voltage | OK | Check battery charger output voltage | OK |
| Check battery specific gravity | OK | Check all battery cables | OK |
| Check battery charger output amperage | OK | | |

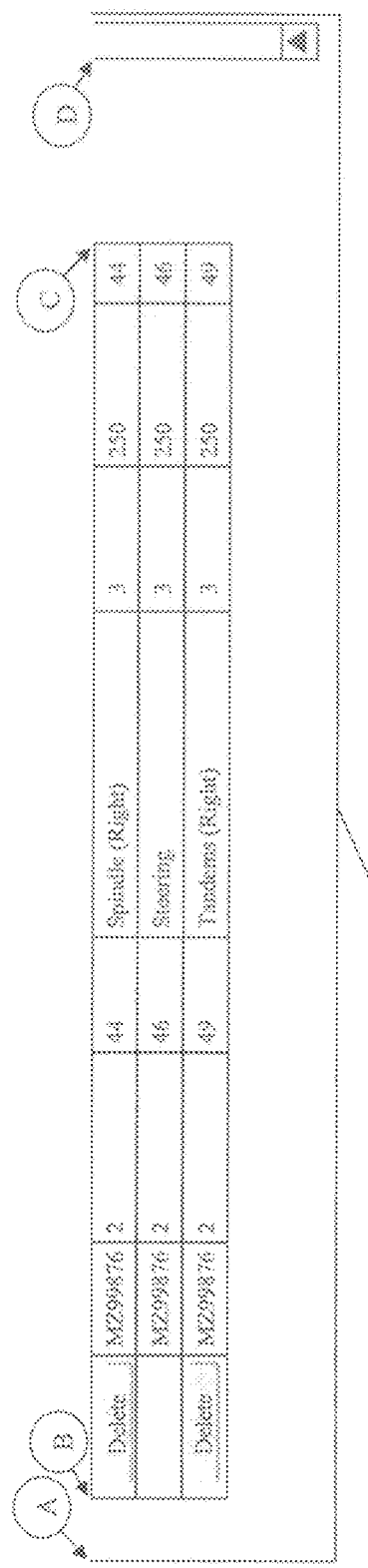

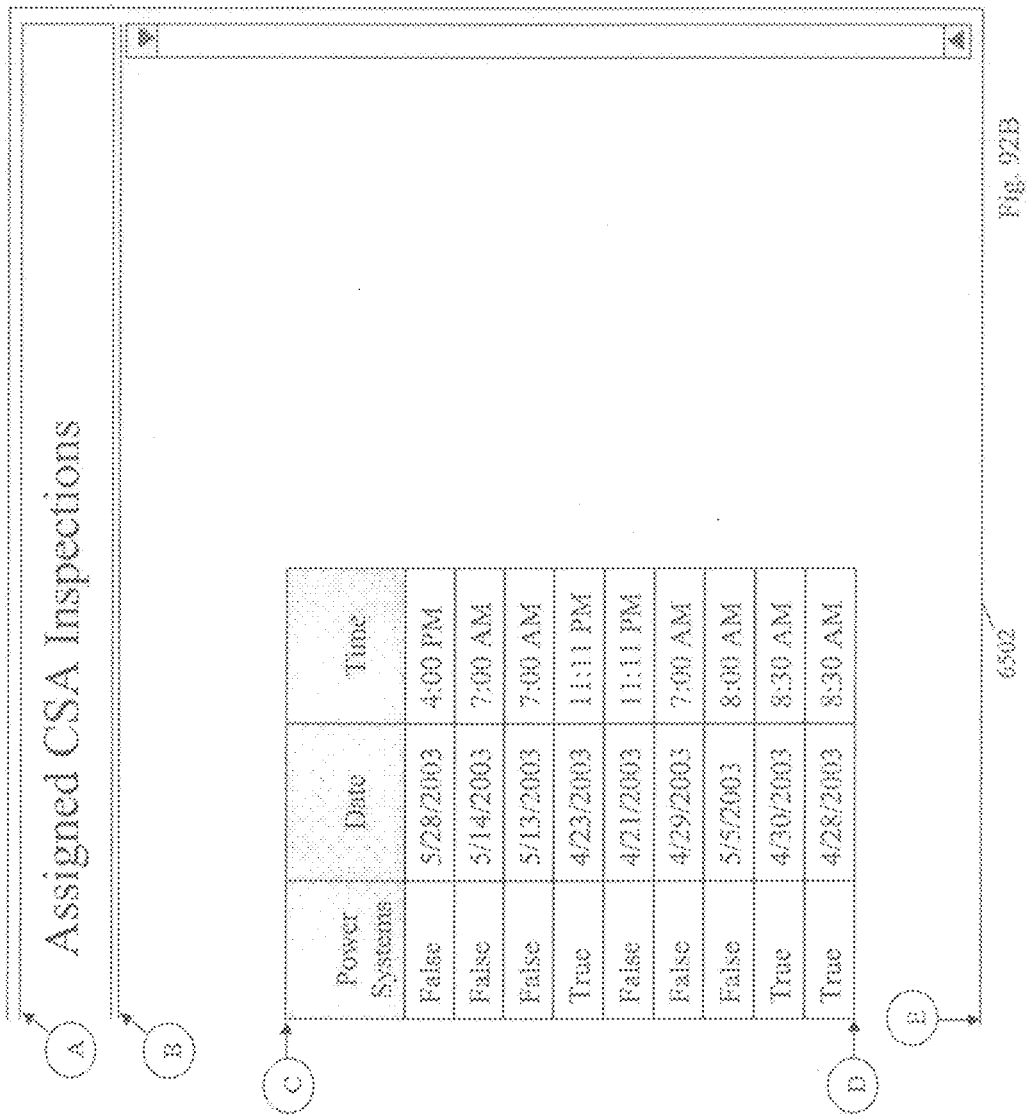

SERVICE OPERATION DATA PROCESSING USING CHECKLIST FUNCTIONALITY IN ASSOCIATION WITH INSPECTED ITEMS

CROSS-REFERENCE TO RELATED APPLICATIONS/PRIORITY CLAIM

The present patent application is a continuation-in-part of co-pending U.S. patent application Ser. No. 12/505,944 filed on Jul. 20, 2009, which is a continuation of U.S. patent application Ser. No. 10/666,463, filed on Sep. 19, 2003, now issued as U.S. Pat. No. 7,565,306; and the foregoing applications are hereby incorporated by reference in their entirety into the present application.

BACKGROUND

In many conventional situations, various non-electronic versions of documents are often used to record, store, track, analyze and/or process data derived from service operations performed on a variety of inspected items. In the context of service operations performed on a machine, for example, such non-electronic documents may be used during periodic machine inspections and maintenance, fluid change procedures, fluid sampling procedures, load bank tests, repair assessments and cost estimates, and other like service operations. Machines and components can lose useful operational life in connection with a number of factors including, for example, failure or inability to plan, prepare, and/or adhere to prescribed maintenance schedules; failure to perform proper tests of fluids employed in machines; ineffectiveness or absence of means for collecting, storing, analyzing and/or processing data associated with equipment operation; poor communication between/among service technicians, distributors, customers and other service providers regarding issues with machine operation; as well as other factors related to inefficient and/or ineffective service operations performed on machines and their components. The inefficiencies attendant upon non-electronic methods, systems and documents often contribute or aggravate the effect of these factors.

Examples of other contexts in which there is prevalent use of non-electronic documents and processes include the healthcare industry and the financial industry, among others. Manual data entry errors reflect one example of a source of error and potential harm arising from use of non-electronic documents and processes in these industries. In addition, many electronic documentation systems and procedures lack connectivity, and thus do not address lack of communication between/among the various entities associated with service operations performed on inspected items. Furthermore, non-electronic documents are often inflexible in their design, development, and/or application to performance of service operations on inspected items.

Thus, conventional products and services may benefit from improved methods, systems and products for collecting, storing, analyzing and/or processing data in association with service operations performed on inspected items. Improved communications between/among service administrators, service technicians, distributors, customers and/or other service providers are also needed to enhance the efficiency and effectiveness of service operations performed on inspected items.

SUMMARY

In one embodiment of the present embodiments, a system is provided for performing at least one service operation in association with at least one inspected item. The system includes a service data device configured for displaying at least one data screen including at least one checklist configured for operative use in connection with performance of the service operation on the inspected item, the data device being portable and being configured for processing at least one communication; a service administrator having at least one data storage medium configured for storing at least one of the checklists displayed on the data device, the service administrator further having at least one server for enabling at least one communication between the service administrator and the data device; at least a portion of at least one of the checklists being customizable by at least the service administrator; and, at least a portion of at least one of the checklists being electronically interactive in association with performance of the service operation on the inspected item.

In another embodiment of the present embodiments, a method is provided for performing at least one service operation in association with at least one inspected item. The method includes displaying at least one data screen on a service data device, including displaying at least one interactive checklist configured for operative use in connection with performance of the service operation on the inspected item, the data device being portable and being configured for processing at least one communication; storing at least one of the checklists displayed on the data device on at least one data storage medium of a service administrator; and, customizing at least a portion of at least one of the checklists with the service administrator.

In another embodiment of the present embodiments, a computer-readable medium is provided including instructions for performing a method for performing at least one service operation in association with at least one inspected item. The medium includes instructions for displaying at least one data screen on a service data device, including instructions for displaying at least one interactive checklist configured for operative use in connection with performance of the service operation on the inspected item, the data device being portable and being configured for processing at least one communication; instructions for storing at least one of the checklists displayed on the data device on at least one data storage medium of a service administrator; and, instructions for customizing at least a portion of at least one of the checklists with the service administrator.

In another embodiment of the present embodiments, a label product structured for placement on an object having a radius is provided. The label product includes a data presentation portion including information associated with at least one service operation performed on an inspected item; at least one bar code portion including a bar code having a vertical axis and a horizontal axis; one or more bar code indicia imprinted on the bar code, the bar code indicia being representative of at least a portion of the information associated with the service operation performed on the inspected item; and, the horizontal axis of the bar code being dimensioned as a function of the radius of the object.

In another embodiment of the present embodiments, a bar code product for use in association with scanning an object having a radius with a bar code scanner is provided. The bar code product includes one or more bar code indicia printed on the bar code product; and, at least one of the bar code indicia having an effective width dimensioned as a function of an arcuate distance of the bar code indicia away from a central axis of the bar code scanner.

In another embodiment of the present embodiments, a bar code product for use in association with scanning an object having a radius with a bar code scanner is provided. The bar code product includes one or more bar code indicia printed on the bar code product; and, at least one of the bar code indicia having a first thickness and second thickness, the second thickness being greater than the first thickness to provide an effective width dimensioned as a function of an arcuate distance of the bar code indicia away from a central axis of the bar code scanner.

Other embodiments of the present invention will become apparent to one skilled in the art upon review of the following drawings and detailed description. It is intended that all such additional embodiments be included within this description, be within the scope of the present invention, and be protected by the claims.

BRIEF DESCRIPTION OF THE DRAWINGS

FIG. 3 includes example data screens provided in association with one or more aspects of the present embodiments;

FIG. 4 includes example data screens provided in association with one or more aspects of the present embodiments;

FIG. 12 includes example data screens provided in association with one or more aspects of the present embodiments;

FIGS. 13A-13B include an example tabulation of data processed in association with one or more aspects of the present embodiments;

FIG. 14 includes an example data screen and schematic samples of labels provided in association with one or more aspects of the present embodiments;

FIG. 19 includes example data screens provided in association with one or more aspects of the present embodiments;

FIG. 23 includes an example data screen provided in association with one or more aspects of the present embodiments;

FIG. 24 includes an example data screen provided in association with one or more aspects of the present embodiments;

FIG. 25 includes an example data screen provided in association with one or more aspects of the present embodiments;

FIG. 26 includes an example data screen provided in association with one or more aspects of the present embodiments;

FIG. 27 includes an example data screen provided in association with one or more aspects of the present embodiments;

FIG. 29 includes an example data screen provided in association with one or more aspects of the present embodiments;

FIG. 30 includes an example data screen provided in association with one or more aspects of the present embodiments;

FIG. 33 includes an example data screen provided in association with one or more aspects of the present embodiments;

FIG. 34 includes an example data screen provided in association with one or more aspects of the present embodiments;

FIG. 35 includes an example data screen provided in association with one or more aspects of the present embodiments;

Figures 49, 50, 51:
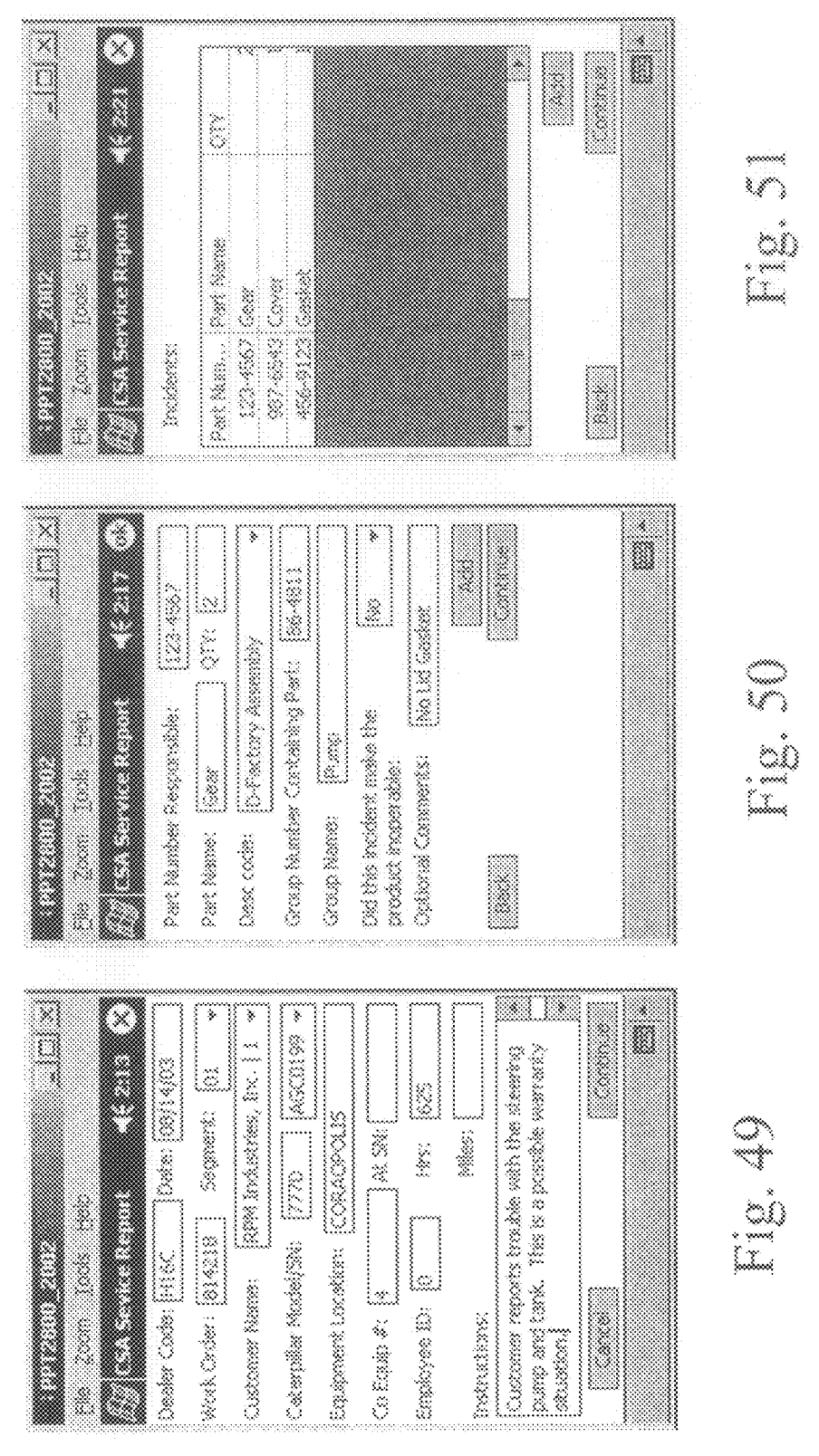

FIG. 49 includes an example data screen provided in association with one or more aspects of the present embodiments;

FIG. 50 includes an example data screen provided in association with one or more aspects of the present embodiments;

FIG. 51 includes an example data screen provided in association with one or more aspects of the present embodiments;

FIG. 61 includes an example network site page provided in accordance with one or more aspects of the present embodiments;

FIG. 62 includes an example network site page provided in accordance with one or more aspects of the present embodiments;

FIG. 64 includes an example network site page provided in accordance with one or more aspects of the present embodiments;

FIG. 65 includes an example network site page provided in accordance with one or more aspects of the present embodiments;

FIGS. 66A-66C include an example network site page provided in accordance with one or more aspects of the present embodiments;

FIG. 67 includes an example network site page provided in accordance with one or more aspects of the present embodiments;

FIG. 70 includes an example network site page provided in accordance with one or more aspects of the present embodiments;

FIG. 71 includes an example network site page provided in accordance with one or more aspects of the present embodiments;

FIG. 72 includes an example network site page provided in accordance with one or more aspects of the present embodiments;

FIG. 73 includes an example network site page provided in accordance with one or more aspects of the present embodiments;

FIG. 75 includes an example network site page provided in accordance with one or more aspects of the present embodiments;

FIG. 77 includes an example network site page provided in accordance with one or more aspects of the present embodiments;

FIG. 78 includes an example network site page provided in accordance with one or more aspects of the present embodiments;

FIG. 79 includes an example network site page provided in accordance with one or more aspects of the present embodiments;

FIGS. 81A-81B include an example network site page provided in accordance with one or more aspects of the present embodiments;

FIG. 82 includes an example network site page provided in accordance with one or more aspects of the present embodiments;

FIGS. 83A-83B include an example network site page provided in accordance with one or more aspects of the present embodiments;

FIG. 85 includes an example network site page provided in accordance with one or more aspects of the present embodiments;

FIG. 87 includes an example network site page provided in accordance with one or more aspects of the present embodiments;

FIGS. 88A-88B include an example network site page provided in accordance with one or more aspects of the present embodiments;

FIG. 89 includes an example network site page provided in accordance with one or more aspects of the present embodiments;

FIGS. 90A-90B include an example network site page provided in accordance with one or more aspects of the present embodiments;

FIGS. 91A-90B include an example network site page provided in accordance with one or more aspects of the present embodiments;

FIGS. 92A-92B include an example network site page provided in accordance with one or more aspects of the present embodiments;

DESCRIPTION

Figure 1:
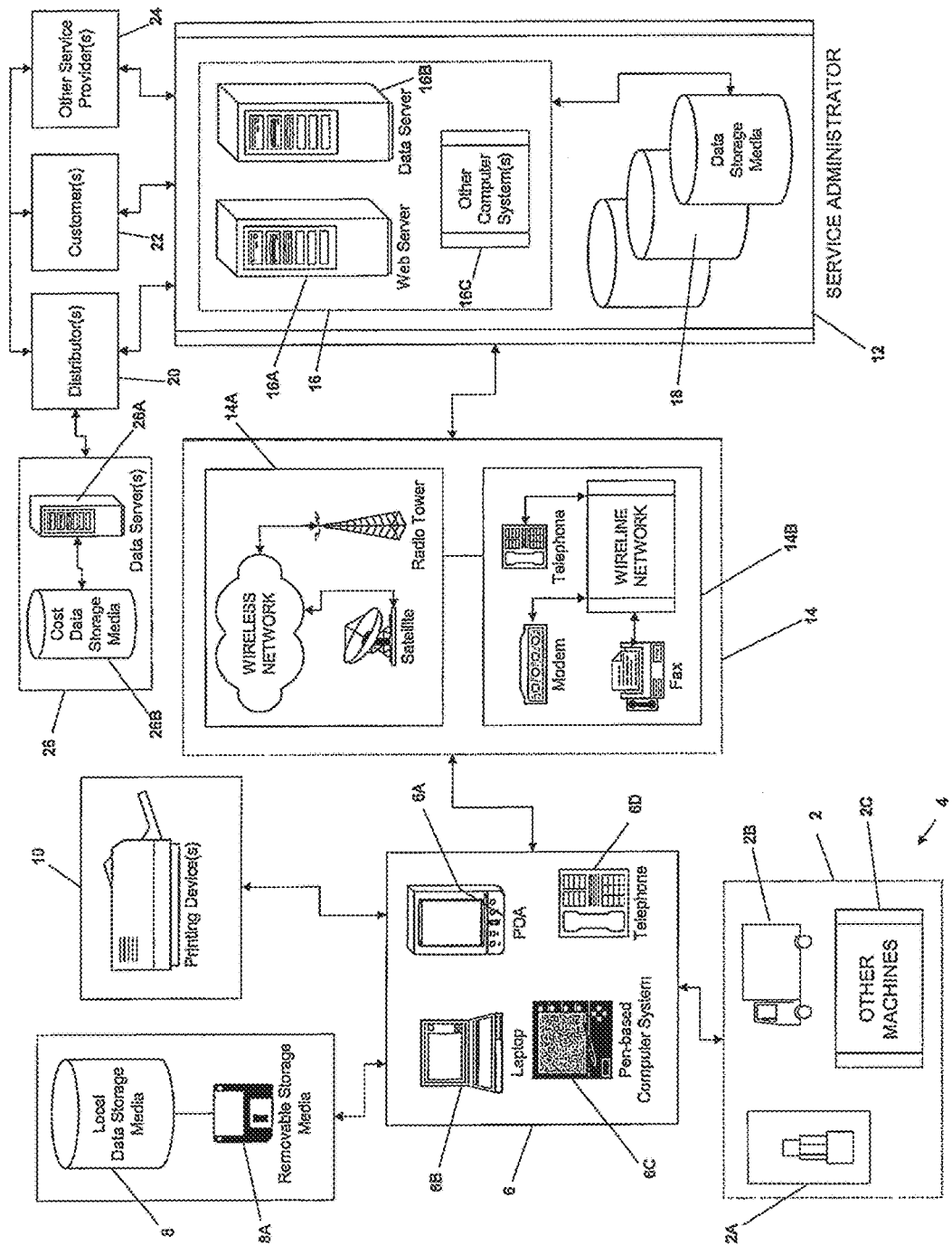
FIG. 1 includes a schematic diagram illustrating various example aspects of the present embodiments.

As applied herein, an "inspected item" includes any equipment, document, product, article of manufacture, inanimate object, animate object (e.g., people, animals, and/or other living organisms), and/or any other item suitable for use in accordance with one or more aspects of the present embodiments. In one example aspect, the inspected item can include, without limitation, a "machine" suitable for application to one or more aspects of the present embodiments. Examples of "machines" as applied herein can include, for example and without limitation, a lubrication system, engines, diesel engines, large-scale diesel engines, motors, rotating equipment, generators, emergency machines, emergency generators, compressors, earth-moving equipment, excavation equipment electrical power generation equipment ("EPG" or "EPGs"), equipment that includes a machine (e.g., such as mining equipment, construction equipment, marine equipment, and the like), and/or other like equipment and/or equipment components. It can be appreciated, however, that the scope of the present embodiments may encompass other types of inspected items such as financial documents (e.g., including loan processing in association with the financial documents), patients (e.g., including examination of patients at a health care facility). In addition, it can be appreciated that various aspects of the present embodiments may be readily adapted/configured/structured for applicability to a wide variety and plurality of different inspected items.

As applied herein, the terms "service operation" and "service operations" include, for example and without limitation, any function, method, process and/or other like activity performed in association with an inspected item. In the context of an inspected item which includes a machine, for example, service operations performed can include, for example and without limitation, maintenance, installation, repair, replacement, overhaul, inspection, fluid changes, and/or any other similar operations, functions and/or activities performed in association with one or more of the machines. In another aspect, in the context of an inspected item which includes a financial document, for example, service operations performed can include, without limitation, data entry, application processing, document storage and retrieval, document transmission, and/or any other similar operations, functions and/or activities performed in association with one or more of the financial documents. In another aspect, in the context of an inspected item which includes a patient, for example, service operations performed can include, without limitation, physical examination, administration of medicine to the patient, receiving/storing/analyzing/processing patient data, health care facility admitting procedures, collection of patient fluids (e.g, blood), and/or any other similar operations, functions and/or activities performed in association with one or more patients.

As applied to various data device embodiments described herein, the term "interactive" includes the capacity for a user to manipulate data, data fields including data entry fields, buttons, radio buttons, and/or other functions available in the various data device embodiments described herein.

As applied herein to various embodiments, the term "CSA" can be used to refer to one or more aspects of a calendaring and scheduling application and/or may include any method, system, apparatus, device, product and/or computer-readable media embodiment configured for data collection, processing, storage, and/or analysis in accordance with one or more of the present embodiments.

OPERATIONAL EXAMPLES

The following operational examples are intended to illustrate, by way of example, various embodiments and aspects provided in accordance with the present method, system, product, and computer-readable media embodiments. The intention of providing these operational examples is to teach one skilled in the art how to make, use and/or practice various embodiments of the present invention. The intention of providing the operational examples is not, however, to limit the scope of the present embodiments to any particular details or aspects of the operational examples as described herein.

Where appropriate, to promote convenience of disclosure and clarity of illustration, detailed discussion included for a first operational example may or may not be repeated for a second, third or other operational example. For example, it will be apparent to those skilled in the art that many aspects of the first operational example described herein with respect to service operations for machines (i.e., "Operational Example 1—Machines") can be readily and analogously applied to their substantially equivalent and/or functionally equivalent aspects in the subsequently described operational examples (i.e., "Operational Example 2—Patients" and "Operational Example 3—Financial Documents").

Operational Example 1

Machines

Referring now to FIG. 1, in one example embodiment of the present embodiments, various types of machines 2 can be positioned at a service site 4. The machines 2 can include, for example and without limitation, one or more types of electrical power generation equipment ("EPGs") 2A, one or more varieties of earth-moving equipment 2B, and/or one or more other machines 2C for which one or more service operations are to be performed. In one aspect, one or more service data devices 6 can be employed by a service technician, for example, in association with service operations performed on the machines 2 at the service site 4. Examples of service data devices 6 can include, as shown, a personal digital assistant 6A (PDA), a laptop 6B, a pen-based computer system 6C, and/or a telephone 6D (such as wireless telephones including cellular phones, for example, or a wireline telephone). In various aspects, a suitable type of data device 6 includes a capacity for portability such as for performing one or more field service operations, for example. In addition, in accordance with various of the present embodiments, a given data device 6 can be structured/configured for performing communications including, for example, real-time wireless communication, communicating with a computer system to synchronize through a cradle or other equivalent apparatus, storing data as a stand alone device and then subsequently communicating the collected data to another location (i.e., store and forward applications), and/or a reasonable combination of these communications, and/or another suitable form of communication.

One or more local data storage media 8 can be operatively associated with one or more of the service data devices 6 to receive and store data collected during execution of one or more service operations on the machines. In one aspect, at least one of the local data storage media 8 can serve as temporary storage for collected service operation data. In another aspect, such temporarily stored data may serve as a backup source of data in the event of malfunction or failure of the service data device 6, for example. In another aspect, the local data storage media 8 can include one or more removable data storage media 8A. In addition, in another example embodiment of the present embodiments, one or more printing devices 10 can be operatively associated with one or more of the service data devices 6. In one aspect, at least one of the printing devices 10 can be employed to print a label, for example, associated with a service operation performed on one of the machines 2. In an example aspect, the label or other item printed with the printing device 10 can include indicia associated with data collected during the service operation such as, for example, two-dimensional bar code indicia including data obtained from a fluid change service operation. It can be appreciated that other information displayed on the data device 6 can be printed on one or more of the printing devices 10 such as, for example, a summary report of data obtained from service operations performed on an inspected item.

In another aspect of the present embodiments, the service data devices 6 can be configured for operative communication with a service administrator 12 through one or more communication media 14. In various embodiments, the communication media 14 can include one or more wireless networks 14A, one or more wireline networks, and/or a reasonable combination of one or more of the wireless networks 14A with one or more of the wireline networks 14B. The service administrator 12 can include one or more computer systems 16 such as, for example, a web server 16A configured to host an network site, for example; a data server 16B configured for receiving, processing and/or directing the storage of data, such as data related to service operations performed on the machines 2 communicated by one or more of the service data devices 6; and/or one or more other computer systems 16C. In one aspect, data processed by the web server 16A, the data server 16B, and/or the other computer systems 16C of the service administrator 12 can be stored in one or more data storage media 18 operatively associated with the computer systems 16 of the service administrator 12. In one aspect, activation of one of the service data devices 6 can include synchronization of the service data device 6 through the communication media 14 with one or more computer systems 16 of the service administrator 12 to update information displayed or stored on the service data device 6, for example. In another aspect, one or more communications can be enabled between the data device 6 and the service administrator 12, for example.

In further examples of the present embodiments, one or more of a distributor 20, a customer 22, and/or a service provider 24 can be operatively configured to communicate with the service administrator 12 such as to obtain, review, and/or analyze data associated with service operations performed on the machines 2. In one aspect, the distributor 20 can be an entity that maintains a relationship with an original equipment manufacturer (OEM) for the marketing, sale and/or service of one or more of the machines 2 and/or their associated components. In another aspect, the customer 22 can be an entity such as a construction company, for example, employing the machines 2 to perform excavation work at a construction site, for example. In other aspects, one or more other service providers 24, such as a laboratory facility performing analysis on fluid change/fluid sample data, for example, can be configured to communicate with, and access service operation data from, the service administrator 12.

In another aspect, the distributor 20 can be operatively associated with a service cost system 26 that can be configured to provide cost estimates such as for recommended repairs ("RRs") for one or more of the machines 2, such as when an inquiries are received from the service data devices 6, for example, for such cost estimates. In one example configuration, the service cost system 26 includes one or more data servers 26A operatively associated with one or more cost data storage media 26B. In one operational aspect, the service data devices 6 can communicate one or more service reports to the service cost system 26 of the distributor 20 to solicit cost estimate information for performing one or more recommended repair, installation, replacement, and/or other maintenance activities for one or more of the machines 2.

In various embodiments discussed herein, data input for the service data device 6 can be performed substantially automatically by communication of the service data device 6 with one or more of the computer systems 16 of the service administrator 12. In other embodiments, data input for the service data device 6 can be conducted partially by manual data entry and/or partially through substantially automatic data retrieval from one or more of the data storage media 18 of the service administrator 12 by means of communication of the service data device 6 with the service administrator 12 through one or more of the communication media 14. In one example, entering a serial number as a key identifier into a data manipulation screen of the service data device 6 can execute a retrieval program to access, collect and pre-populate the data screen with other data associated with the entered serial number such as, for example, customer name, last service type, last service date, and other data linked to the serial number. In other embodiments, a machine can be equipped with a bar code label that includes data such as a machine serial number, for example. In these embodiments, data entry for the service data device 6 can be performed by scanning the bar code label, RFID tag, or other indicia with a bar code reader, for example, to input data represented by the bar code label into the service data device 6.

Figure 2:
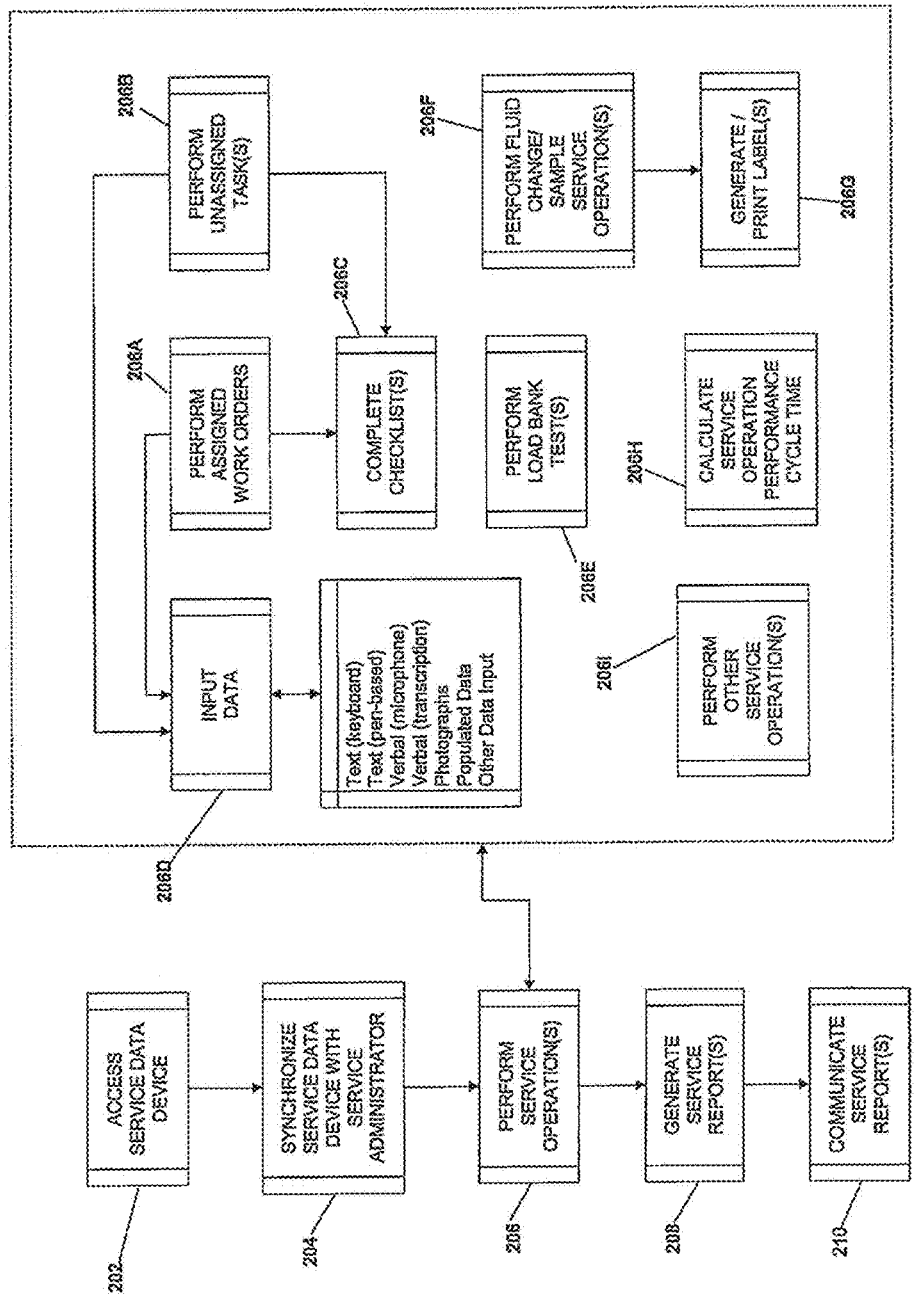
FIG. 2 includes a process flow diagram illustrating various example aspects of the present embodiments.

In various embodiments, the service data device 6 can be programmed or configured to retrieve, display and/or communicate various data manipulation screens, including at least one interactive data screen, in association with collecting, processing, storing and/or analyzing data obtained from one or more service operations performed on one or more of the machines 2. Referring now to FIGS. 1 and 2, one illustrative overview method embodiment is provided in accordance with the present embodiments. In step 202, the service data device 6 is accessed, such as by a conventional login procedure, for example. In step 204, the service data device 6 is synchronized with data stored, for example, within one or more data storage media 18 of the service administrator 12. In one embodiment, synchronization between the data device 6 and the service administrator 12 of step 204 can be structured or configured to occur prior to the login procedure of step 202.

In step 206, one or more service operations can be performed on one or more machines in connection with the function of the service data device 6. In various example aspects, performing service operations in step 206 can include performing one or more assigned work orders in step 206A and/or performing one or more unassigned or new tasks in step 206B. Either or both of steps 206A and 206B may involve completing one or more checklists in step 206C. In addition, in step 206D and in association with performing one or both of steps 206A and 206B, data are input to the service data device 6. As shown, examples of types of data input in step 206D can include, without limitation, text entered by keyboard, text entered by use of a pen-based computer system, verbal communications recorded by one or more microphones including one or more microphones configured to eliminate, reduce and/or filter background noise for a recording, verbal communications received and transcribed into text format, digital photograph data and associated annotations, populated data provided through communication of the service data device 6 with the service administrator 12, for example, and/or other types of suitable data input. In various aspects, one or more types of input data (e.g., text entries) can be stored for subsequent retrieval such that recurring, repetitive service operations (e.g., warranty repairs) can be cataloged to corresponding input data and retrieved/displayed for subsequent service operations. As applied herein, a "repetitive" service operation can include any set of service operations wherein at least one data field, at least one portion of a report, or other data are replicated across multiple service operations. It can be seen that such capability minimizes the need for a service technician, for example, to replicate data entry particularly in the context wherein multiple, at least substantially identical service operations are performed on multiple inspected items. Other service operations performed in step 206 can include performing one or more load bank tests in step 206E, performing one or more fluid change or fluid sampling operations in step 206F and generating one or more labels in step 206G as a result of the processing of step 206F, and/or calculating a cycle time associated with performance of service operations in step 206H. In addition, and in view of specific example embodiments described hereinafter, it can be appreciated that other types of service operations can be performed in step 206I.

In step 208, one or more service reports reflecting data collected and processed during performance of the service operations in step 206 can be generated. In step 210, service reports generated in step 208 can be communicated to an appropriate destination such as to the service administrator 12, for example, the distributor 20, the customer 22, or another service provider 24, for further processing of data included within the service reports. In another aspect, various portions of various reports (such as reports described herein) can be stored, displayed, and/or edited on the data device 6 prior to establishing communication (e.g., synchronization) between the data device 6 and the service administrator 12, for example, to transmit data collected during a service operation to the service administrator 12. In other aspects, various labels, reports, and/or other documents, or portions thereof, described herein can be stored, displayed and/or manipulated entirely in bar code format or another suitable scanner symbology format.

In one embodiment, a service technician, for example, can access the service data device 6 at the service site 4 to initiate communication with the service administrator 12 through one or more of the communication media 14 using the login screen 302 shown in FIG. 3. The service technician logs-in by entering technician identification and a password into the login screen 302. In one aspect, entry of technician identification information can be performed by scanning an identification badge of the technician, for example, such as by use of a bar code scanning apparatus or system. Once the service administrator 12 verifies that access is authorized for the service technician, a confirmation screen 304 can be displayed on the service data device 6 to confirm successful login for the service technician. As shown in FIG. 4, a data screen 402 can be displayed on the service data device 6 to advise that an initial synchronization of the service data device 6 should be performed with one or more of the data storage media 18 of the service administrator 12 to acquire the most currently available service operation information. Once synchronization is completed, a confirmation data screen 404 can be displayed to confirm the number and type of changes, for example, which have occurred since the last time the service technician logged into the service data device 6. In another aspect, the service data device 6 can be configured to establish communication with the service administrator 12 to perform such synchronization functions on a substantially automated basis upon initial login by a service technician with the service data device 6.

Figure 5:
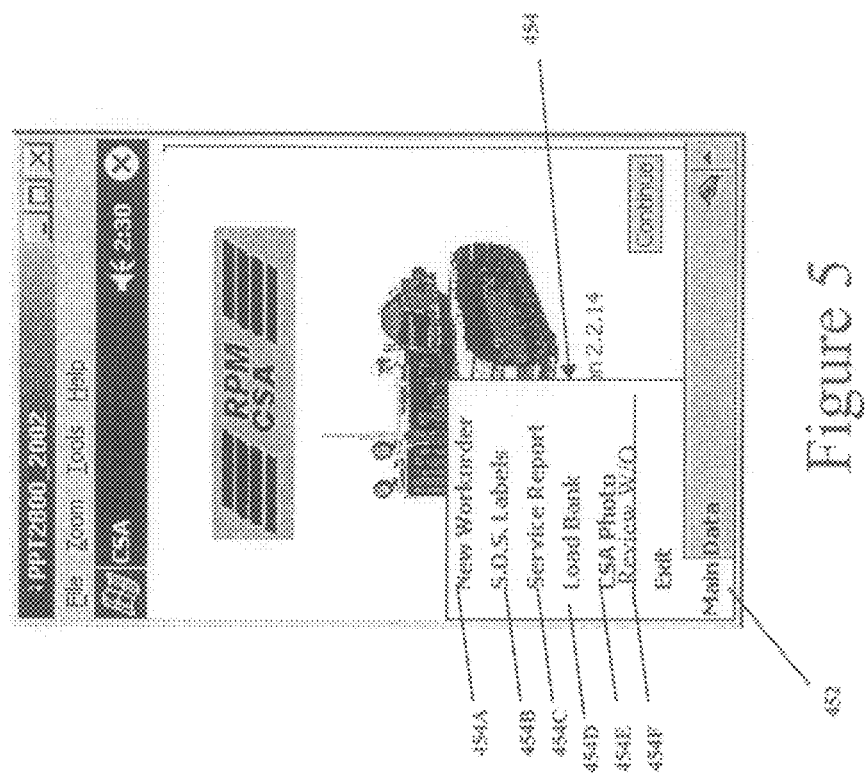
FIG. 5 includes an example data screen provided in association with one or more aspects of the present embodiments.

Referring now to FIG. 5, a data screen can include a "Main" button 452 that permits a user of the data device 6 to display a navigation menu 454 including a variety of optional functions that can be accessed through the data device 6. In one aspect, a "New Workorder" function 454A permits a user to navigate to one or more data screens where assigned, unassigned and/or other types of work orders can be processed for a machine by a service technician, for example. In one aspect, by selecting a customer and a machine serial number, for example, information can be pre-populated into the data screens permitting a service technician, for example, to enter machine hours/miles, complete one or more checklists, and/or perform/complete other service operations. An "S.O.S. Labels" function 454B permits the user to navigate to one or more data screens where labels including a variety of data associated with the machine can be generated and/or printed for service operations (e.g., fluid sampling operations as described above with reference to step 206F) performed in connection with the machine. A "Service Report" function 454C permits the user to navigate to one or more data screens associated with generating one or more aspects of reports including information gathered during one or more service operations performed on the machine. A "Load Bank" function 454D guides the user to one or more data screens that include functionality for performing various aspects of load bank testing such as in connection with an electrical generator, for example. A "CSA Photo" function 454E permits a user to take a digital photograph or digital image of at least a portion of a machine for which service operations are performed. A "Review W/O" function 454F permits the user to navigate to one or more data screens wherein a previously completed, or at least partially completed, work order for a machine can be viewed by the user.

Figure 6:
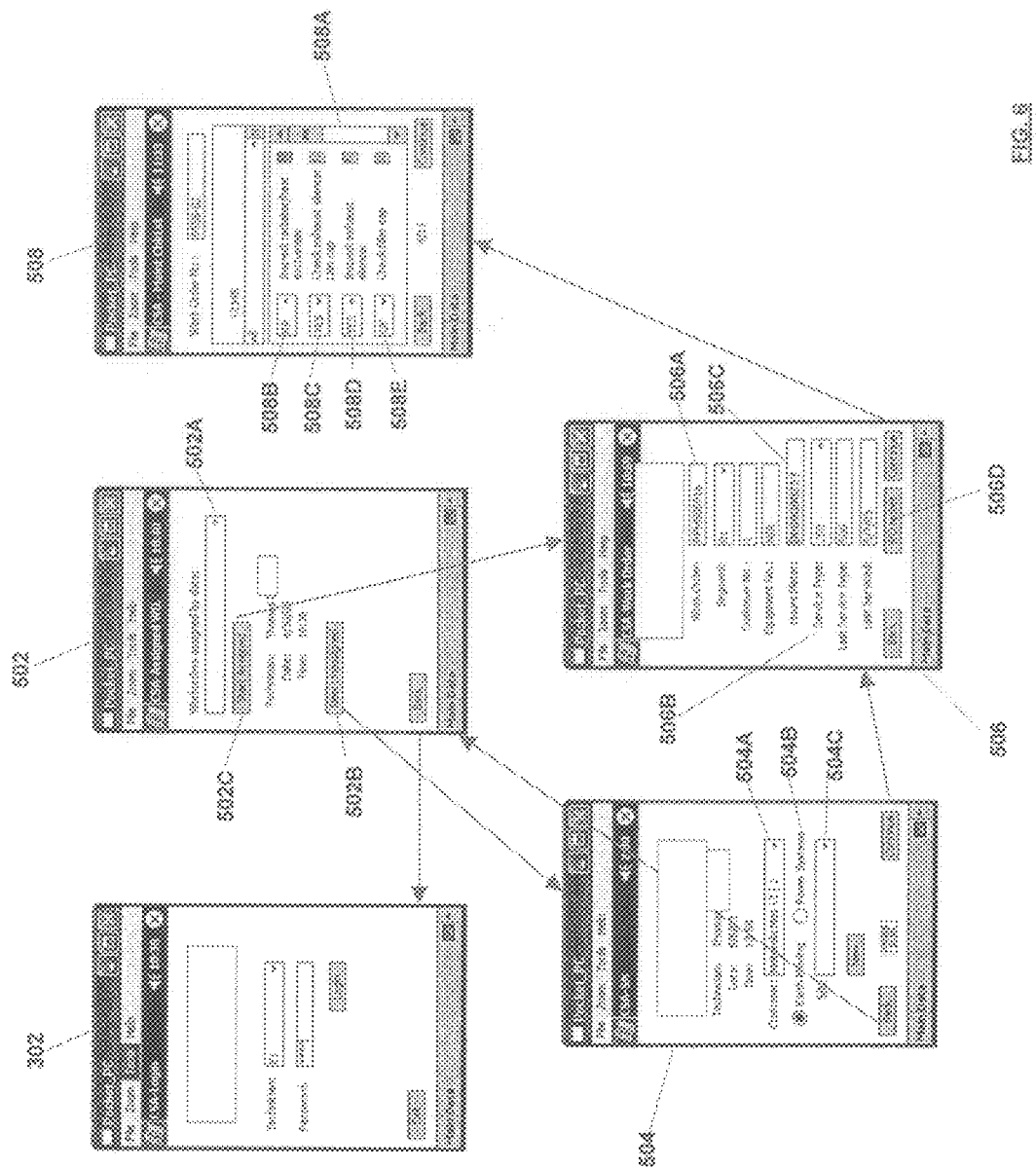
FIG. 6 includes example data screens provided in association with one or more aspects of the present embodiments.
Figure 7:
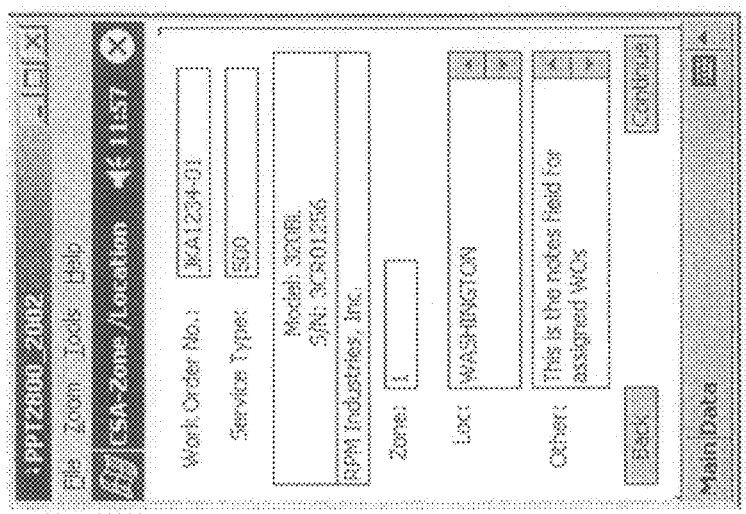
FIG. 7 includes an example data screen provided in association with one or more aspects of the present embodiments.

Referring now to FIG. 6, in an example embodiment provided in accordance with the present embodiments, the service technician can access a work order data screen 502, which includes a list of assigned work orders to be completed by the service technician. In one aspect, one or more work orders assigned to the service technician can be sorted and displayed by a scheduled date of service, for example, and accessed by means of a conventional drop-down menu feature 502A, for example. In other aspects, a "New Unassigned" button 502B and a "Start Assigned" button 502C can be provided on the work order data screen 502. Activating the "New Unassigned" feature provides a data input screen 504 in which, among other functions, the service technician can select a customer name 504A, a type of equipment 504B (e.g., "Earth Moving" or "Power Systems"), and/or a serial number 504C for a machine on which unscheduled or unassigned service operations are to be performed. As shown, data for a given machine can be input to the service data device 6 such as by use of a conventional bar code scanning technology, an RFID technology, or other functionally equivalent and suitable technology. In one aspect, the customer name 504A, the type of equipment 504B (e.g., "Earth Moving" or "Power Systems"), and/or the serial number 504C for a machine can be input by reading a bar code label installed on the machine such as by means of a bar code scanner, for example. Referring now to FIGS. 6 and 7, when a "W/O Notes" button 506D is pressed, the information associated with a given work order is displayed as shown in FIG. 7.

Activating the "Start Assigned" button 502C, or deciding to "Continue" from the data input screen 504, displays a data entry screen 506, which is pre-populated with various data associated with a machine. Among other data that can be selected on the data entry screen 506, a service type 506B (e.g., expressed as a number of hours, mileage, and/or other like indicators) can be selected to determine which service operation checklist is to be applied for servicing the machine. Data such as the number of hours/miles shown on an hours meter or odometer operatively associated with the machine, for example, can also be collected/entered into the "Hours Meter" field 506C portion of the data entry screen 506. In one aspect, the service data device 6 can compare the hours entered in field 506C, through communication with the service administrator 12, to the date/time of a prior inspection or other service operation performed for the machine. For example, if the prior service operation was a 500-hour service performed on a date prior to the current service operation, the service administrator 12 can increment to the next interval of predetermined service operation time due for the machine, such as to a 750-hour service interval, for example. In another aspect of this operational example, given that the 500-hour service has been previously performed, the service data device 6 can confirm through communication with the service administrator 12 that a 750-hour service checklist should be presented in association with service operations to be performed on the machine. In another aspect, the service technician may elect to override the current service interval determined by the service administrator 12 and perform service operations in accordance with a different service interval. It can be appreciated that service intervals for service operations can be configured by the service administrator 12. It is emphasized that the examples of service intervals applied herein are provided merely for convenience of disclosure. In various aspects, service intervals can be scheduled at varying intervals, with any degree of frequency or non-periodicity, as a function of machine type, environment of machine use, life cycle of machine, and/or other potentially relevant factors.

Once data input is completed for the data entry screen 506, a checklist 508A of activities and/or inspection items for the service technician to perform/inspect can be displayed on the checklist data screen 508. In various aspects, the checklist 508A includes a number of predetermined and customized work items that a customer, for example, requires to be performed for a machine. Thus, the customer can customize the type, content, and/or number of questions/items to be included on the checklist 508A. In addition, a service technician or other user of the data device 6 who accesses the checklist 508A may readily edit the checklist by use of drop-down menus and/or data entry fields that are structured/configured to reflect data collected during a service operation on a machine for a given inspection.

The checklist 508A can include one or more items such as items 508B, 508C, 508D, 508E to be inspected during a service operation that includes periodic maintenance, for example. The service technician can select the appropriate entry for each item (e.g., such as "YES", "NO", "OK", or "RR", among others). In various aspects, entries available for each item can be customizable by the service administrator 12 (as discussed/illustrated hereinafter in more detail). In example aspects, each checklist item can be defaulted to a "NO" or "YES" designation to promote effective completion of all checklist items by the service technician and to allow single-touch toggle of entries (i.e., compare to a first touch to provide a drop-down menu, for example, and then a second touch to make a selection of an entry). In another aspect, the selection of "RR" for a checklist item (such as item 508B) is interpreted as "Repair Recommended" by the service data device 6. In various aspects, logic programmed through the service administrator 12 can specify that a given checklist item is applicable on a "less than or equal to" basis with respect to the service interval to which the checklist item is assigned. For example, a checklist item designated for a 1000 service interval and designated on a "less than or equal to" basis is applicable and can be applied to any service operation performed at a service interval equal to or less than the 1000 service interval (e.g., service intervals of 250, 500, 750 and 1000 can be included in one example checklist). In other aspects, entries can include a variety of different types of data fields including, for example and without limitation, calculated fields, manual text entry fields, radio button fields, and/or other types of data fields.

Figure 8:
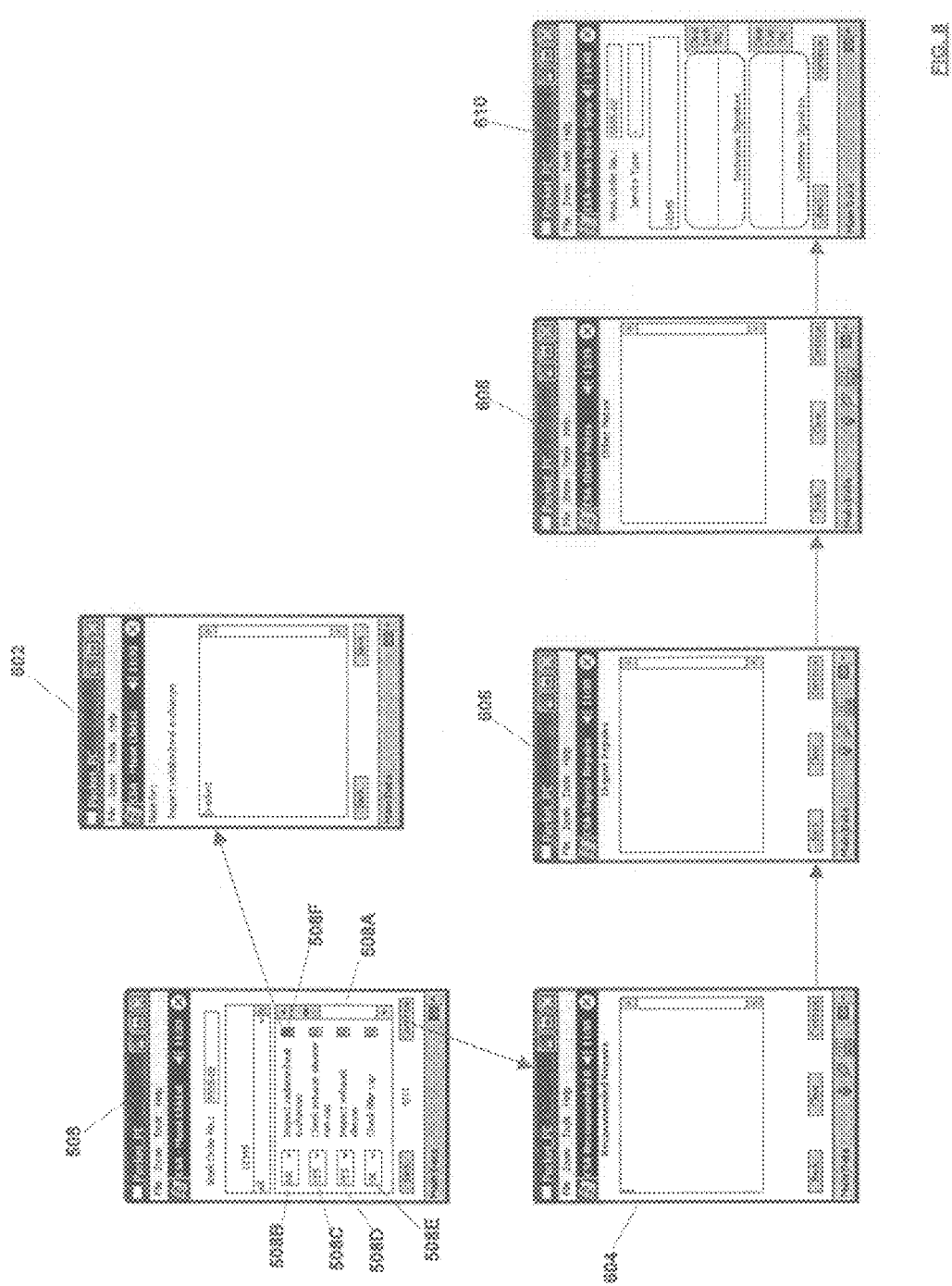
FIG. 8 includes example data screens provided in association with one or more aspects of the present embodiments.

As shown in FIG. 8, the "RR" checklist entry on the data screen 508 can result in association of indicia such as a colored "N" box 508F, for example, indicating that one or more explanatory notes have been associated with the "RR" checklist item. In various aspects, any checklist item can include an associated note, in addition to annotated "RR" checklist items. A note providing details on the selection of the "RR" designation, for example, can be included on a data entry screen 602. In other aspects, notes and other data entered by the service technician can be entered/categorized on a "Recommended Repairs" data screen 604, an "Urgent Repairs" data screen 606, and/or on an "Other Notes" data screen 608. In addition, completion of service operations on a given work order can be acknowledged by entering/capturing the signature of one or both of a technician and a customer associated with a particular machine in a data entry screen 610. In one aspect, any checklist items including items for which repair is recommended (i.e., designated with an "RR"), for example, can be selected and consolidated into a summary portion of a service report generated in association with completion of the checklist items. In another aspect, the service report including the summary of recommended repairs can be communicated to one or more of the distributor 20, the customer 22, the service administrator 12, and/or the other service providers 24 for review, analysis and/or further processing to be conducted pursuant to the issues raised in the service report.

In other aspects of the various embodiments described herein, a percentage complete status field can be included on various of the data manipulation screen displays associated with checklists processed and completed during field service operations. In one example aspect, for a given checklist, percentage complete can be based on comparing the number of currently uncompleted checklist items to the total number of items included on the checklist. In addition, time/date information associated with initiation of a service operation can be collected, stored, and compared to time/date information associated with completion of the service operation. In various aspects, time/date information can be collected/stored on a per checklist item basis to provide cycle time information for each checklist item as completed by the operation. In other aspects, the sequence in which checklist items are completed by a service technician, for example, can be collected/stored for later analysis to identify an optimum sequence or sequences for completing various service operations. In this manner, cycle times for various service operations can be calculated and employed to compare the cycle time for completion of a service operation performed by a first service technician, for example, to the cycle time for completion of the same service operation by other service technicians. It can be appreciated that such cycle time comparisons can be useful as management/training tools, for example, for improving the performance and effectiveness of service operations.

In various embodiments herein, data entered into the service data device 6 by a technician, a customer, or another entity or entities providing information associated with service operations can be received or captured into the service data device 6 in a variety of ways. In one aspect, data entry can be performed by use of a keyboard or other similar data input device. In another aspect, data entry can be performed using a pen-based or wand-based data entry system, in which a graphics file including the handwritten note of a technician, for example, is recorded/captured by the data service device 6. In another aspect, a verbal description of an issue arising from a service operation can be captured and recorded as a voice data file (e.g., through one or more microphones operatively associated with the service data device 6, wherein the microphone or microphones can be configured for filtering noise to eliminate or reduce background noise that arises during a recording) and/or transcribed into text from the verbal description of the issue by software programmed on the service data device 6 and/or stored in one or more of the local data storage media 8. In one operational example, a service report generated upon completion of a given maintenance checklist includes an association to one or more voice, text, and/or data files including information gathered during service operations.

Figure 9:
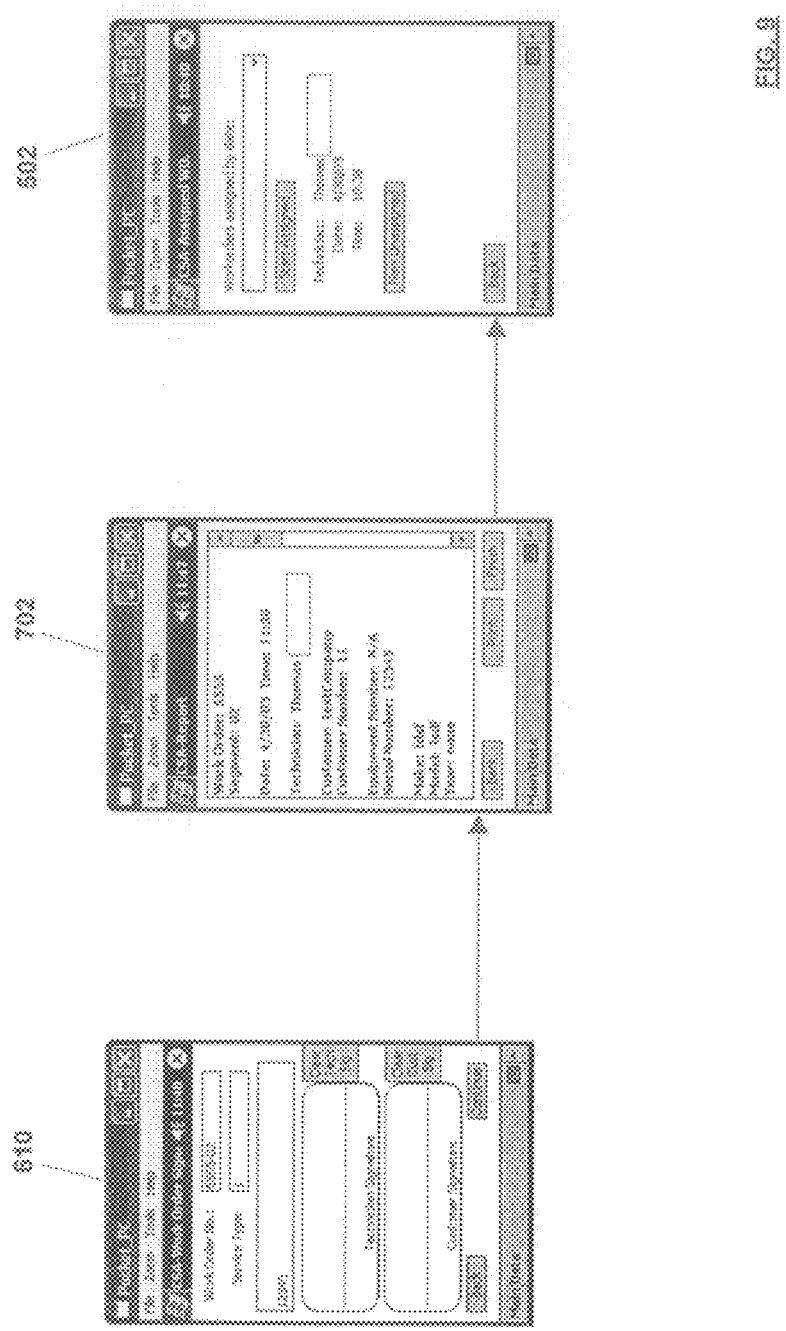
FIG. 9 includes example data screens provided in association with one or more aspects of the present embodiments.

Referring now to FIG. 9, once signature data is captured in the data entry screen 610, a service report screen display 702 can be generated and displayed on the service data device 6. In various aspects, the service report shown on the screen display 702 includes various data collected and stored during service operations performed using the service data device 6. In various aspects, any portion of the service report can be communicated through the communication media 14 to one or more of the computer systems 16 of the service administrator 12. In another aspect, the service report can be remotely printed (e.g., at the remote location of a service site where service operations are performed), such as by use of an appropriate portable printing device 10. Once work with the service report is completed, the work order screen 502 can be accessed again as shown, such as in the event of a service technician accessing an additional assigned task for which service operations are required, for example. In other aspects of the present embodiments, service reports can be communicated and/or automatically routed to distributors 20, customers 22, or other service providers 24 for storage, analysis, and/or further processing of data obtained from service operations. During synchronization with the service administrator 12, for example, updated service operations data can be communicated to distributors 20 to permit the distributors 20 to act on issues identified in the service report such as by notifying management, sales representatives, and/or service technicians, for example. In one example aspect, the service report including the summary of recommended repairs can be communicated through the communication media 14, in electronic format or another desired format, to the service cost system 26 of the distributor 20 for generation of cost estimates for resolving issues identified in the service report. Such cost estimates can be further communicated, for example, to the customer 22 for the machine or machines 2, or components thereof, associated with the service report.

Figure 10:
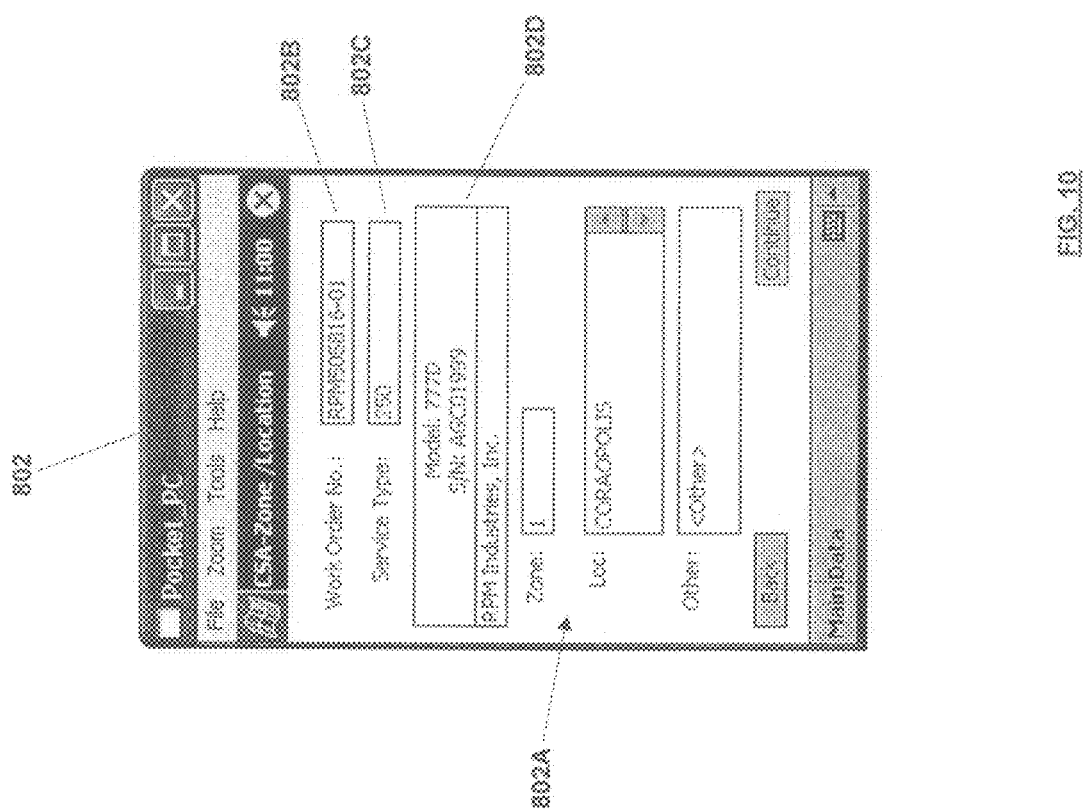
FIG. 10 includes an example data screen provided in association with one or more aspects of the present embodiments.

In another embodiment of the present methods and systems, zone/location information 802A can be accessed through use of the service data device 6 to display a zone/location screen display 802, as shown in FIG. 10. The zone/location information 802A can indicate a site where a machine is being employed to perform work, which work site may also be a suitable service site, in one aspect. In addition, the zone/location information 802A can also be associated with one or more other data fields such as, for example, work order number 802B, service type 802C, and/or model/serial number information 802D.

Figure 11:
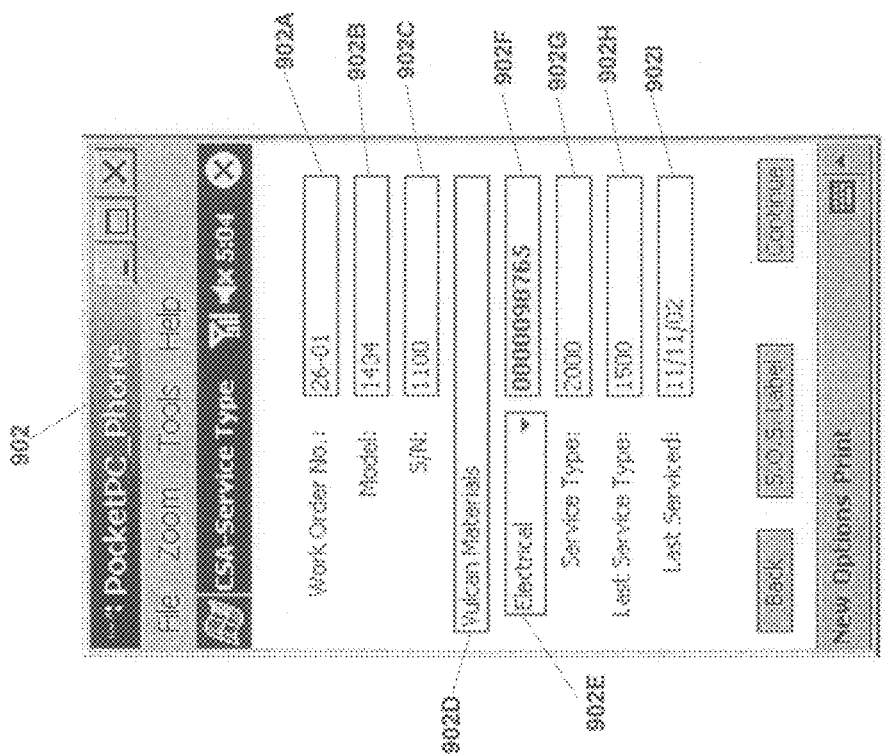
FIG. 11 includes an example data screen provided in association with one or more aspects of the present embodiments.

Referring now to FIG. 11, in another embodiment of the present methods and systems, a service type screen display 902 can be provided. As shown, the service type screen display 902 can include information for a machine such as, for example, work order number 902A, model number 902B, serial number 902C, customer name 902D, an indication 902E of the type of machine (e.g., "Electrical"), an hours field 902F for receiving entry of a current hour meter reading for the machine, a service type (expressed as hours) 902G representing the number and kind of service operations to be performed for the machine, an indication of the last service type 902H performed for the machine, and/or a date 902I of the most recent service operations performed on the machine. In one aspect, a service technician can override the service type 902G to perform one or more service operations that may be necessary outside usual maintenance schedules. In one example, the service technician can override the service type 902G to perform service operations that may be missed in the future because of an expected period of operation of the machine without the opportunity to perform service operations during that period of operation.

In another embodiment of the present methods and systems, one or more labels (such as Scheduled Oil Service ("SOS") labels, for example) can be generated in connection with one or more fluid change type and/or fluid sampling type service operations. In one aspect, the "SOS Label" button 902J on the screen display 902 can be activated to display the data entry screen display 1002 (see FIG. 12). In another aspect, the label function can be configured to require data entry for machine hours, for example, before labels may be generated, completed, and/or printed. As shown, the data entry screen display 1002, and an associated data entry screen display 1004, include various data options that can be selected/entered by a service technician, for example, in connection with an oil change and/or oil sampling service operation performed on a machine. In various aspects, printed labels can include one or more adhesive surfaces for securement of the label to an appropriate object or machine, for example. In other aspects, printed labels can be provided with one or more non-adhesive surfaces.

In another aspect, once a machine serial number is entered for a service operation, the service administrator 12 can determine which compartment samples are required and display the required compartments on the data device 6. It can be appreciated that the particular examples of oil changes/oil sampling are described herein merely for purposes of illustration; it can be further appreciated that other types of fluid change/sampling service operations can be performed in accordance with the present methods and systems. Examples of other fluid change/sampling service operations include, without limitation, transmission fluid, hydraulic fluid, fuels, and other types of fluids employed during operation of a machine. In one aspect, an indication 1002A of whether or not oil was both changed and sampled at the time of data collection can be entered into the data entry screen display 1002. It can be seen that information concerning the timing of fluid changes (e.g., a "YES" response entered as the indication 1002A) such as oil changes, for example, can be communicated to the service administrator 12 to be incorporated into future periodic maintenance schedules, for example, for the machine. In one aspect, intervals such as the time, for example, between "YES" indications 1002A, for example, can be calculated by the service administrator 12 to determine hour/mileage intervals between service operations for a given compartment, and to determine when another fluid change should be performed for the machine. In addition, because additional types of fluid change/sampling processes are within the scope of the present methods and systems, it can be appreciated that calculations between "YES" indications, for example, can be distinctly performed on a compartment-by-compartment basis. Thus, analysis of the need to perform a transmission fluid change, for example, can be performed in addition to, and independently from, similar calculations performed in association with oil change/sampling service operations.

FIGS. 13A-13B display a sample tabulation of stored results obtained, in various aspects of the present embodiments, from various service operations including one or more fluid sampling operations. As shown, data associated with fluid sampling operations can include a serial number of the machine for which service operations are being performed; a compartment identification (e.g., engine, transmission, hydraulic, and others) and can be individually identified on the label, eliminating or reducing the need for a manually-annotated tabulation of checklist items; an amount of oil added, if any, to the compartment; a time/date stamp for the fluid sampling operation; a meter reading for the machine; an "hours on oil" number; a designation of degree of application severity for the machine (e.g., light, medium, heavy, and others); a fluid identifier (e.g., engine oil, transmission oil, hydraulic oil, and others); a fluid viscosity identifier; and/or an "oil changed" indication that records whether or not a fluid change operation has been performed in addition to the fluid sampling operation. Once selections are chosen for a particular machine serial number, or other primary key or identifier, such selections can be configured to become default settings (which can be overridden as described herein) for future fluid operations performed on the same machine to reduce the need for repetitive data entry selections for the future fluid operations. In various aspects, it can be seen that application of various aspects of the present embodiments may increase the available, useable area of a label by incorporating compartment selection into data entry processes on the data device 6 and by including compartment information in association with label generation/printing.

Referring now to FIG. 14, in other aspects of the present embodiments, a label manager screen display 1102 can be provided for managing the generation, completion and printing of labels associated with fluid change/sampling service operations performed on a machine. In one aspect, an icon can be configured to appear on the screen display 1102 once a label has been completed and is ready to be printed, if desired. As shown, an engine related fluid compartment 1102A can be selected and data associated with oil sampled from the engine can be compiled and generated on a label 1104 or on a label 1106. In one aspect, a "Print Selected SOS Labels" button 1102B can be activated on the label manager screen display 1102 to transmit an electronic version of the label 1104 and/or the label 1106 to one or more of the printing devices 10 to generate the label 1104 and/or the label 1106 in a tangible medium such as may be suitable for placement on a bottle, for example, or other container that holds the oil sample associated with the label 1104. In another aspect, the particular printing device 10 employed to print the label 1104 can be operatively and remotely associated with a laboratory facility, for example, or other service providers 24 that are to conduct analysis of the oil sample.

In other aspects of the present embodiments, a label including a bar code portion can be pre-printed at a first location and transported for use in connection with one or more service operations at a second location or other locations, such as one or more field service locations, for example. The bar code portion of the label can be pre-populated with various data associated with a machine for which service operations are to be performed. In one example, the label can include pre-populated data such as machine serial number among other machine data. In addition, one or more portions of the label can be configured, for example, for entry of a date, a number of machine hours, a number of miles and/or other pertinent information associated with a service operation. The label can then be affixed, as desired, to a chart, a report, a container, and/or another suitable medium. In another aspect, to resist unauthorized personnel from viewing machine data, the label can include only a bar code portion representing the machine data. It can be seen that printing of labels at a first location permits a service technician, for example, at a second location to benefit from the various embodiments described herein with or without having the capacity to print labels at the second location or other site where service operations such as fluid operations, for example, are performed.

In other aspects, a label including a bar code portion, for example, can be employed as a means for promoting security of data collected during service operations. In one aspect, data can be stored in the bar code portion for retrieval only by a predetermined and permissible bar code scanning apparatus, system and/or method. Thus, certain data can be stored in the bar code portion of the label that are not visually discernible by a service technician and are configured to be accessible only through an approved bar code scanning apparatus, system and/or method. In other aspects, a label with a bar code portion can be adhered directly to a portion of a machine for which service operations are provided. In this context, the label may serve as a visual reminder of future service operations, for example, to be performed for the machine. In another aspect, one or more labels can be printed on-site with respect to the machine to provide an indication of such future service operations that can be placed on the machine.

As shown in FIG. 14, in other aspects of the present embodiments, the label 1106 can include a data presentation portion 1108 and one or more bar code portions, such as bar code portion 1110 as shown. In one aspect, the bar code portion 1110 includes a bar code 1112 having a vertical axis 1112A and a horizontal axis 1112B, wherein the vertical axis 1112A of the bar code 1112 is structured/configured to be greater in length in comparison to the horizontal axis 1112B of the bar code 1112 to enhance available, useable area of the label 1106 that can be employed as the data presentation portion 1108. In various aspects, one or more bar code indicia 1114 are imprinted on the bar code 1112 and may be representative of various information and data associated with a machine, for example, and/or service operations performed on the machine. In various aspects, the horizontal axis 1112B of the bar code 1112 is structured to be in general parallel alignment with a transverse plane of a variety of objects including, for example and without limitation, machine surfaces, documents, and/or radiused objects such as containers, for example, on which the label 1106, or at least the bar code portion, is positioned for use. For example, a radiused container 1116 can include at least one transverse plane such as transverse plane 1118, for example, that can be in general parallel alignment with the horizontal axis of a bar code positioned on a label (e.g., such as label 1106) positioned on the container 1116. In one aspect, the orientation of the horizontal axis 1112B of the bar code 1112 can be configured in association with a comparatively larger vertical axis 1112A of the bar code 1112 to derive benefits from enhancing available, useable area in the data presentation portion 1108 of the label 1106 for including and displaying relevant machine data, service operation data, and/or other information.

It can be appreciated that the bar code 1112 and the bar code indicia 1114 are structured/configured to be read/scanned by a conventional bar code scanning apparatus or system. In various aspects, the length of the horizontal axis 1112B of the bar code 1112 is dimensioned as a function of a surface area portion of an object to which the label is applied. In the context of an object having a radius, for example, such as a bottle-type container, for example, the length of the horizontal axis portion of the bar code is minimized to a sufficient degree to account for scanning of the bar code and to mitigate the problems attendant upon scanning a radiused object or any object having an arcuate or rounded outside surface area portion. In one aspect, the label 1106 can be die cut or die stamped such as during production of a blank version of the label 1106, for example, to form a perforation 1122, for example, or other like structure that permits ready detachment of the bar code portion 1110 from the data presentation portion 1108 of the label 1106.

Figure 15:
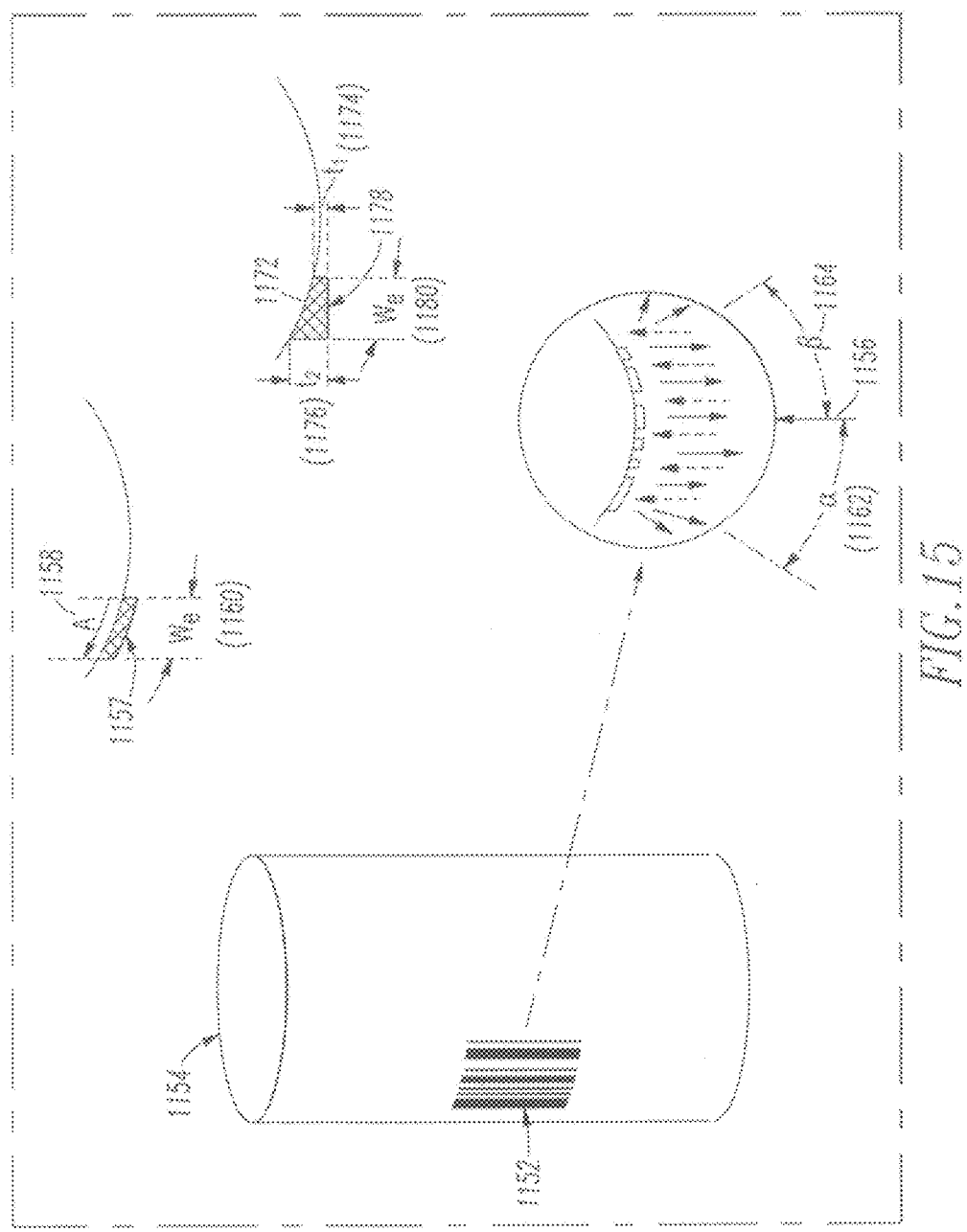
FIG. 15 includes various schematic diagrams provided in association with one or more aspects of the present embodiments.

Referring now to FIG. 15, in other embodiments of the present embodiments, methods and systems are provided for scanning a bar code 1152 imprinted on a cylindrical object 1154 (such as a bottle type container for fluid samples, for example), generally cylindrical portion of an object, or other arcuate or generally arcuate portion of an object having a radius and/or a circumference. In the example shown, applying a central axis 1156 of a conventional bar code scanner or system (not shown) to the bar code 1152 imprinted on the generally arcuate surface of the container 1154 may result in one or more beams that do not reflect effectively back to the bar code scanner or system after striking bar code indicia imprinted on the bar code. It can be appreciated that such errant beams may provide no results or incorrect results when the bar code on the container is scanned for information. In one embodiment of the present embodiments, at least one bar code indicium 1157 is imprinted along an arcuate portion of the container extending a distance A (1158) to provide an effective width $w_e$ (1160) sufficient to permit an effective reading of the bar code indicia 1157 by a bar code scanning apparatus or system. In various aspects, the bar code indicia 1157 can be provided with the enhanced effective width $w_e$ (1160), in the event that the indicia 1157 are located outside the range of a cone of scanning beams extending from the central axis 1156 of the bar code scanner within an alpha range 1162 of degrees on a first side of the central axis 1156 and/or within a beta range 1164 of degrees on a second side of the central axis 1156.

In another embodiment, bar code indicia 1172 are imprinted along an arcuate portion of the container with a first thickness 1174 and a second thickness 1176. As shown, the thicknesses 1174,1176 can be structured to provide a scanning surface 1178 with an effective width $w_e$ (1180) sufficient to permit an effective reading by a bar code scanning apparatus or system. It can be further appreciated that the difference in magnitude of the thicknesses 1174, 1176 can be adjusted to provide a generally flat surface for receiving one or more scanning beams, for example, transmitted from a bar code scanning apparatus or system.

Figure 16:
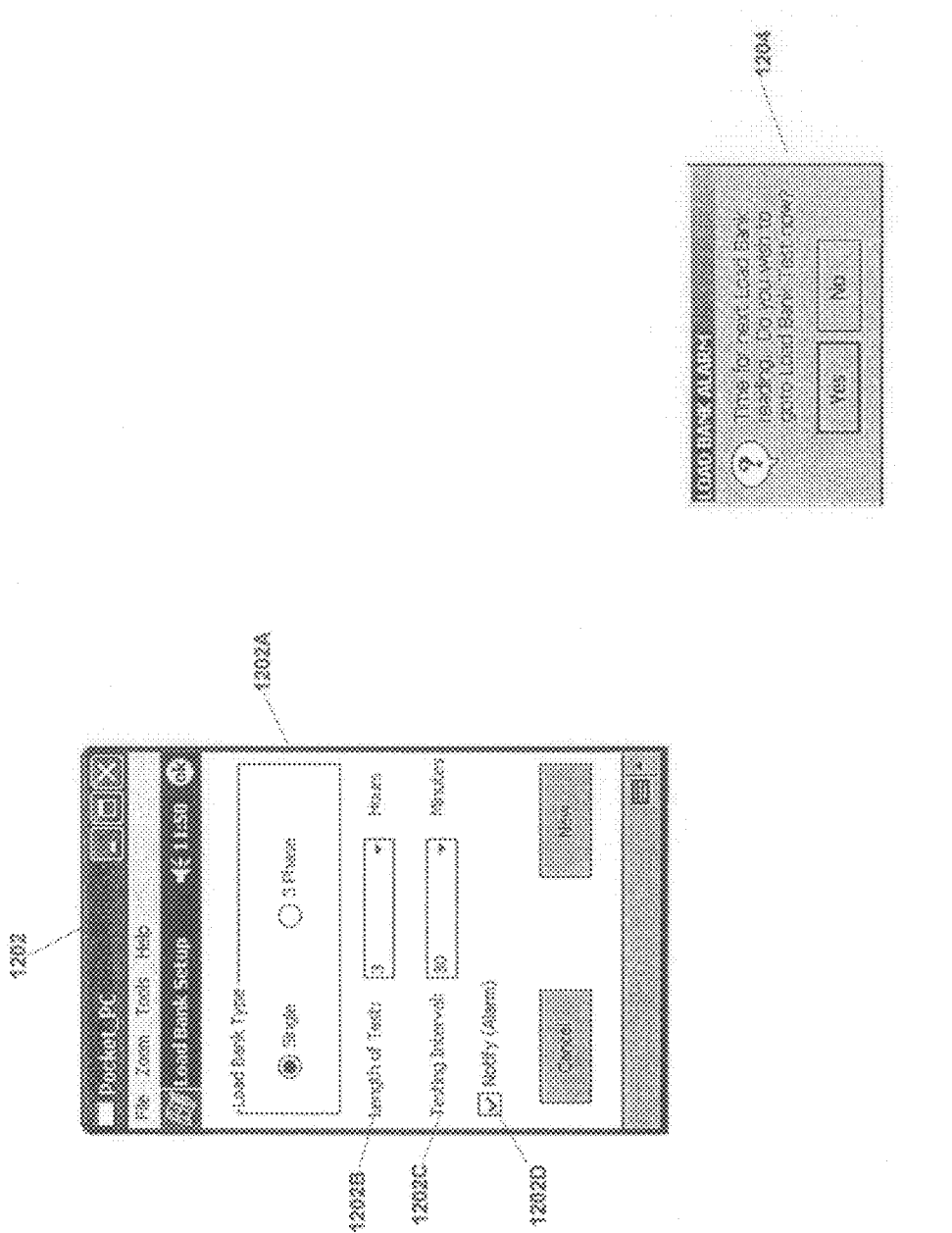
FIG. 16 includes example data screens provided in association with one or more aspects of the present embodiments.
Figure 17:
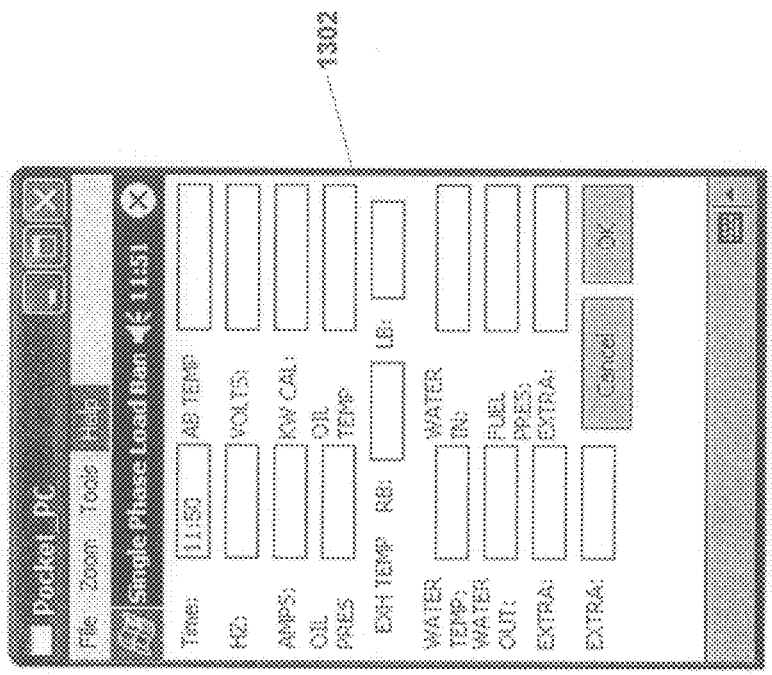
FIG. 17 includes an example data screen provided in association with one or more aspects of the present embodiments.
Figure 18:
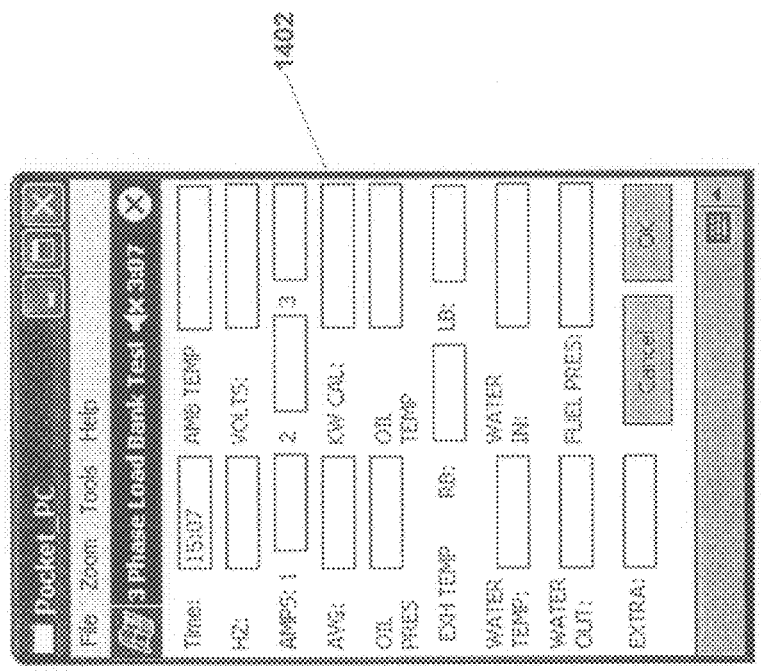
FIG. 18 includes an example data screen provided in association with one or more aspects of the present embodiments.

In other embodiments of the present methods and systems, one or more load bank tests can be performed in connection with use of the service data devices 6 and one or more of the machines 2 which include electrical power generation (EPG) equipment. Referring now to FIG. 16, in one example embodiment, a load bank test setup display screen 1202 is shown. The load bank test setup screen is configured to receive data including, for example, a load bank type 1202A (i.e., whether the machine is a single-phase or three-phase electrical machine), a length of test 1202B, a testing interval 1202C, and an option 1202D to elect an alarm notification in association with the time that each testing interval occurs. It can be appreciated, in accordance with other discussion of customization of checklists presented herein, that one or more data screens associated with load bank testing, or portions thereof, can be customized to address customer requirements. Based on selection of the option 1202D for an alarm notification, the service data device 6 can generate a notification, such as the dialog box 1204, at a predetermined time before or after elapse of a testing interval. In one aspect, the data device 6 can be configured to "awaken" automatically when a subsequent load bank test reading is required. In other aspects, the data device 6 can "awaken" from an off-state of the data device 6, or can generate a notification or other prompt in an on-state of the data device 6, that a subsequent test reading is needed, if the data device 6 is currently powered down or in use for another type of service operation. The dialog box 1204 provides the option for a service technician, for example, to be directed to a load bank test screen display 1302 for single phase testing (see FIG. 17) or to a load bank test screen display 1402 (see FIG. 18) for three-phase testing. As can be seen and appreciated, various data associated with load bank testing can be entered into the load bank test screen displays 1302,1402 of the service data device 6 during the test period. In another aspect, upon completion of load bank testing, load bank test results can be displayed such as in the example load test result screen displays 1502,1504 shown in FIG. 19. In another aspect, load bank test results can be communicated from the service data device 6 through the communication media 14 to one or more computer systems 16 and/or data storage media 18 of the service administrator 12 for storage, analysis, scheduling of service operations, and/or other processing activities.

Figure 20:
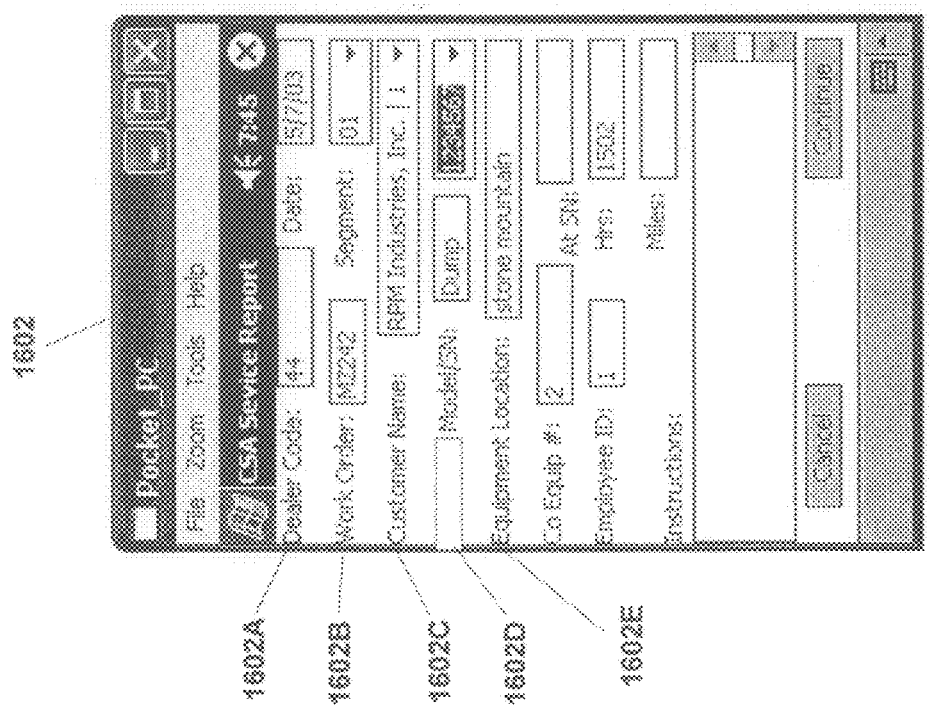
FIG. 20 includes an example data screen provided in association with one or more aspects of the present embodiments.
Figure 21:
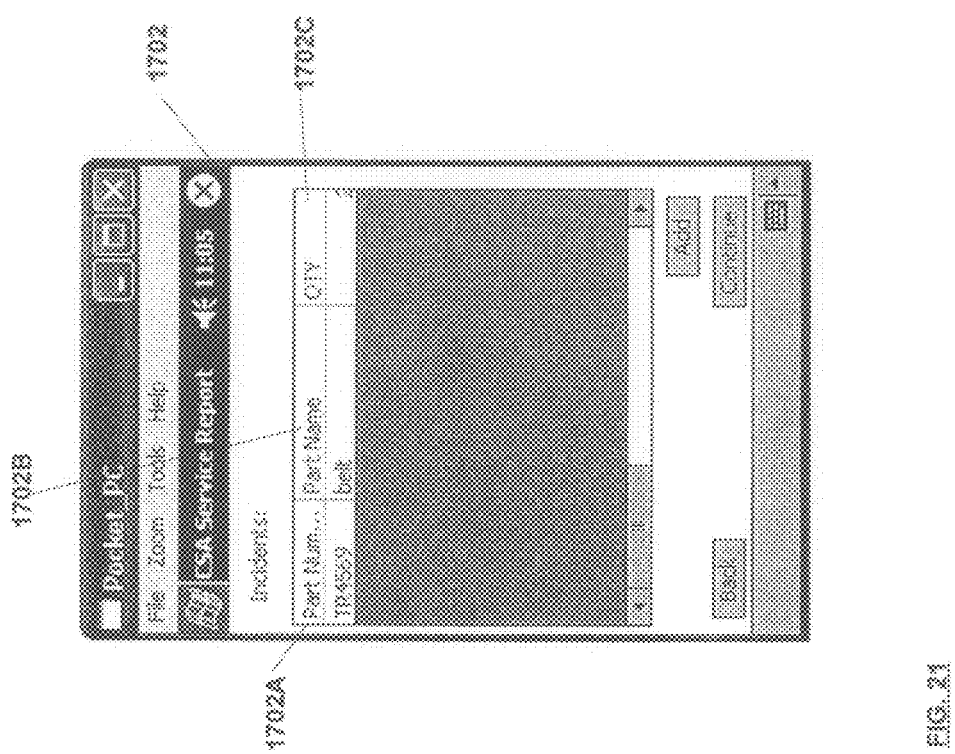
FIG. 21 includes an example data screen provided in association with one or more aspects of the present embodiments.
Figure 22:
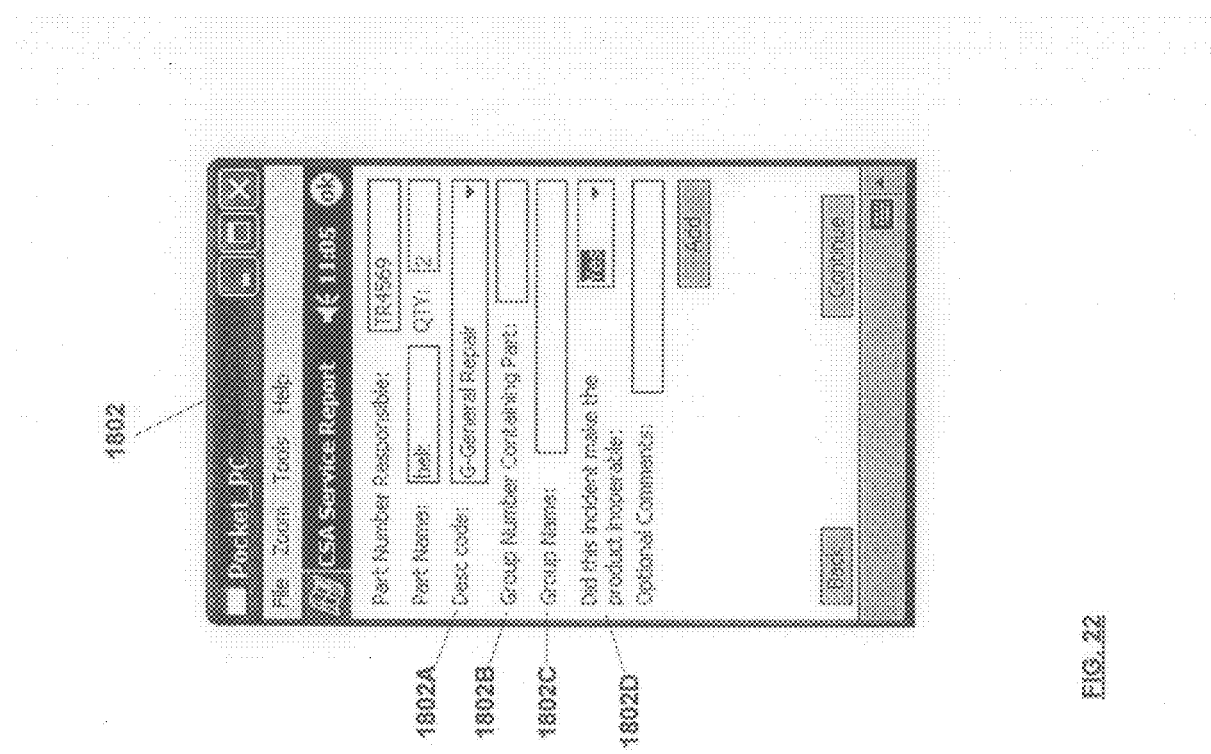
FIG. 22 includes an example data screen provided in association with one or more aspects of the present embodiments.

In other embodiments of the present methods and systems, a service report module can be programmed within the service data device 6 in which data are collected and stored during one or more service operations performed on a machine. Referring now to FIG. 20, a service report data screen 1602 can be provided with various data associated with a machine such as, for example, dealer code 1602A, work order number 1602B, customer name 1602C, model/SN (serial number) 1602D, equipment location 1602E, among other data elements as shown. In one aspect of the service report module as shown in FIG. 21, an incidents screen display 1702 displays components identified as requiring repair, replacement or other service during service operations performed on the machine. In the example shown, a part number 1702A, a part name 1702B associated with the part number 1702A, and a quantity 1702C of the part number reflect an incident reported during a service operation by a service technician. As shown in FIG. 22, in another aspect of the example, a part number responsible screen display 1802 can be displayed including a description code 1802A associated with the type of problem presented by the part number (e.g., "G—General Repair"). In addition, data associated with parts/components related to the part number can be displayed in data fields 1802B, 1802C, for example. In another aspect, in data field 1802D, data can be entered by a service technician, for example, providing an indication of whether or not the incident makes the product (e.g., machine) inoperable. In another aspect, a parts screen display 1902 (see FIG. 23) can also be employed to indicate whether parts were left with the customer (data field 1902A), whether parts were scrapped (data field 1902B), and/or whether the service operation was completed (data field 1902C). In addition, if parts are to be returned, a data field 1902D can be provided for data entry of a return number associated with any returned parts.

Figure 28:
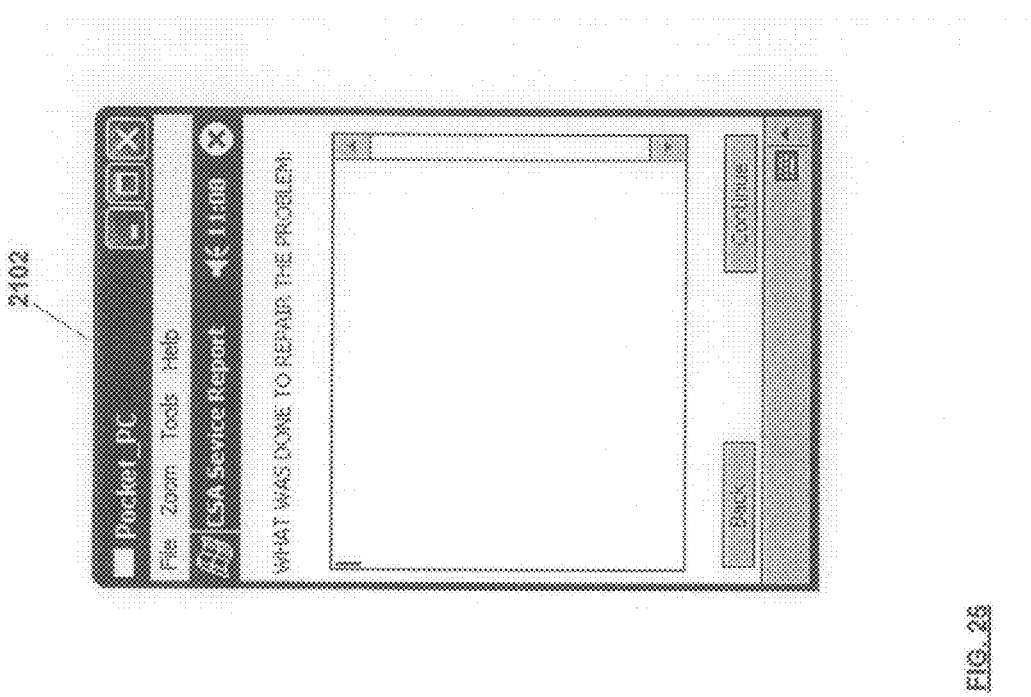
FIG. 28 includes an example data screen provided in association with one or more aspects of the present embodiments.
Figure 28:
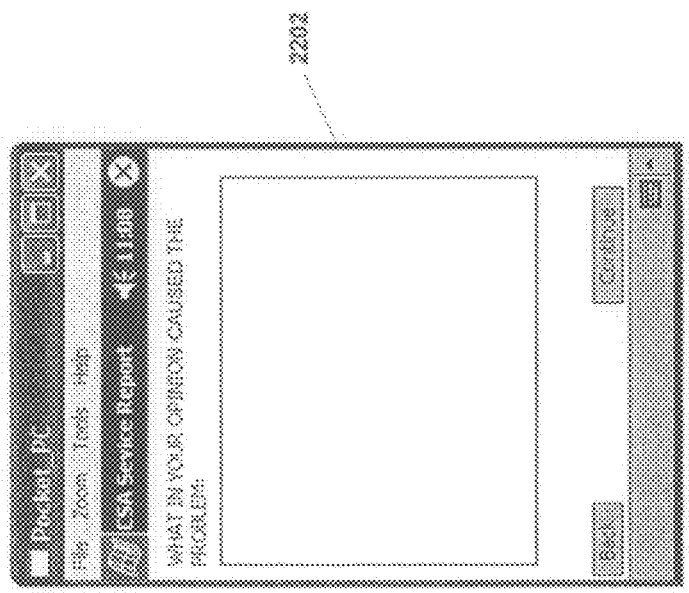

In other aspects of the service report module, one or more screen displays can be provided for data entry of comments and other descriptions of problems identified during one or more service operations performed on a machine. In one aspect shown in FIG. 24, a data entry screen 2002 can be provided wherein information associated with a "What did you find wrong:" query can be entered into the service data device 6. In another aspect shown in FIG. 25, a data entry screen 2102 can be provided wherein information associated with a "What was done to repair the problem:" query can be entered into the service data device 6. In another aspect shown in FIG. 26, a data entry screen 2202 can be provided wherein information associated with a "What in your opinion caused the problem:" query can be entered into the service data device 6. In another aspect shown in FIG. 27, a data entry screen 2302 can be provided wherein information associated with a "What were the operational test results:" query can be entered into the service data device 6. In another aspect shown in FIG. 28, a data entry screen 2402 can be provided wherein information associated with "Customer Remarks:" query can be entered into the service data device 6. As described herein, text can be entered by keyboard, attached as a graphic file (e.g., a .pdf file), entered through graffiti text functions, entered through conversion of voice data, and/or a variety of other types of data entry methods. In another aspect, once entry of service operation related data and remarks is completed, signatures can be captured electronically from one or both of a service technician and a customer, for example, by use of the signature data entry screen 2502 configured for the service report module (see FIG. 29). In other aspects, many of the service report fields can be pre-populated as a part of the service report assignment function. This pre-population of data feature can be beneficial in situations where repetitive service operations are to be performed for multiple machines such as, for example, in the event of warranty repair/replacement required for multiple machines. In various embodiments, and in accordance with prior discussion above, it can be appreciated that data can be entered in the foregoing data entry screens by use of, for example and without limitation, a keyboard, a voice recognition/transcription software, a microphone for recording verbal communications and associated software for storing such communications as voice data files, capture of pen-based data entry in a graphics file, and/or another suitable means for data entry.

As can be applied to various of the method and system embodiments described hereinabove, the service data device 6 can include a camera, for example, or another operatively associated video apparatus suitable for capturing visual digital data associated with a machine for which service operations are performed. As shown in FIG. 30, a photograph data screen 2602 can be used to display a digital image or digital picture of a machine, or portions of a machine, such as portions which are affected by disrepair or other conditions (e.g., corrosion). In one aspect, visual digital data can automatically be made part of the machine inspection or service report, thus obviating the need for a separate attachment or manual download of the visual digital data to create an association with the machine inspection or service report. It can be appreciated that once a digital photograph or digital image of a machine is captured using the service data device 6, data associated with the picture can be communicated through the communication media 14 to the service administrator 12. In one aspect, picture or image data can be stored in one or more of the data storage media 18 of the service administrator 12 and manipulated in connection with one or more other service data elements collected, stored and/or processed in association with performance of service operations for the photographed machine. In another aspect, a pen-based system can be operatively associated with the service data device 6 to permit markings, text and other annotations to be added to a digital photograph (as shown) or other image by a service technician, for example, for storage and use in connection with the digital photograph.

Figure 32:
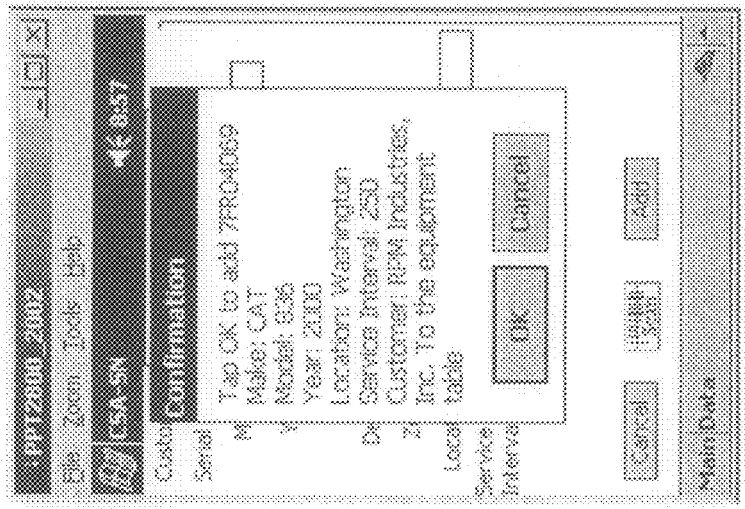
FIG. 32 includes an example data screen provided in association with one or more aspects of the present embodiments.
Figure 31:
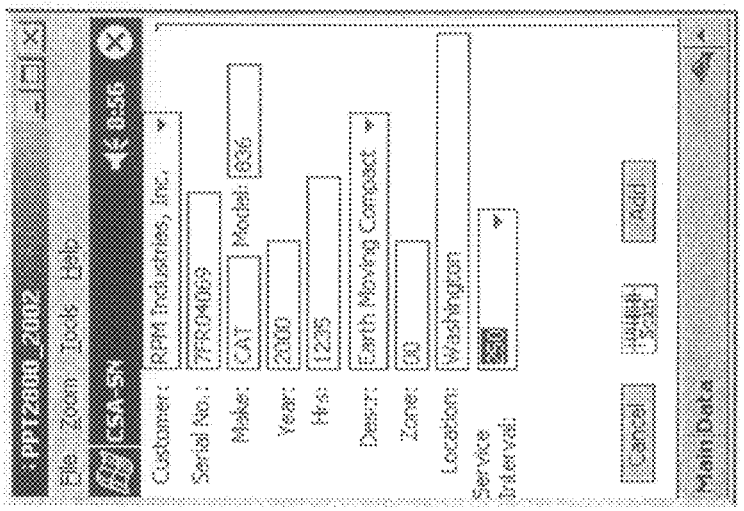
FIG. 31 includes an example data screen provided in association with one or more aspects of the present embodiments.

Referring now to FIGS. 31 and 32, in another embodiment of the present embodiments, a data screen can be provided that permits a user of the data device 6 to add a new machine for a given customer using the data device 6. In the example shown, service operations are to be performed for a new earth-moving machine of a given customer. On the data screen, a customer field can be selected and a machine serial number can be specified in a serial number field. In addition, service operations associated with a given service interval can be selected for the new machine by entering a service interval designation in a service interval field. In one aspect, data can be entered or populated into the data device 6 by use of a bar code scan function provided on the data screen. The data screen of FIG. 32 displays a confirmation function that can be employed to confirm adding the new machine on the data device 6.

Figures 33, 34, 35:
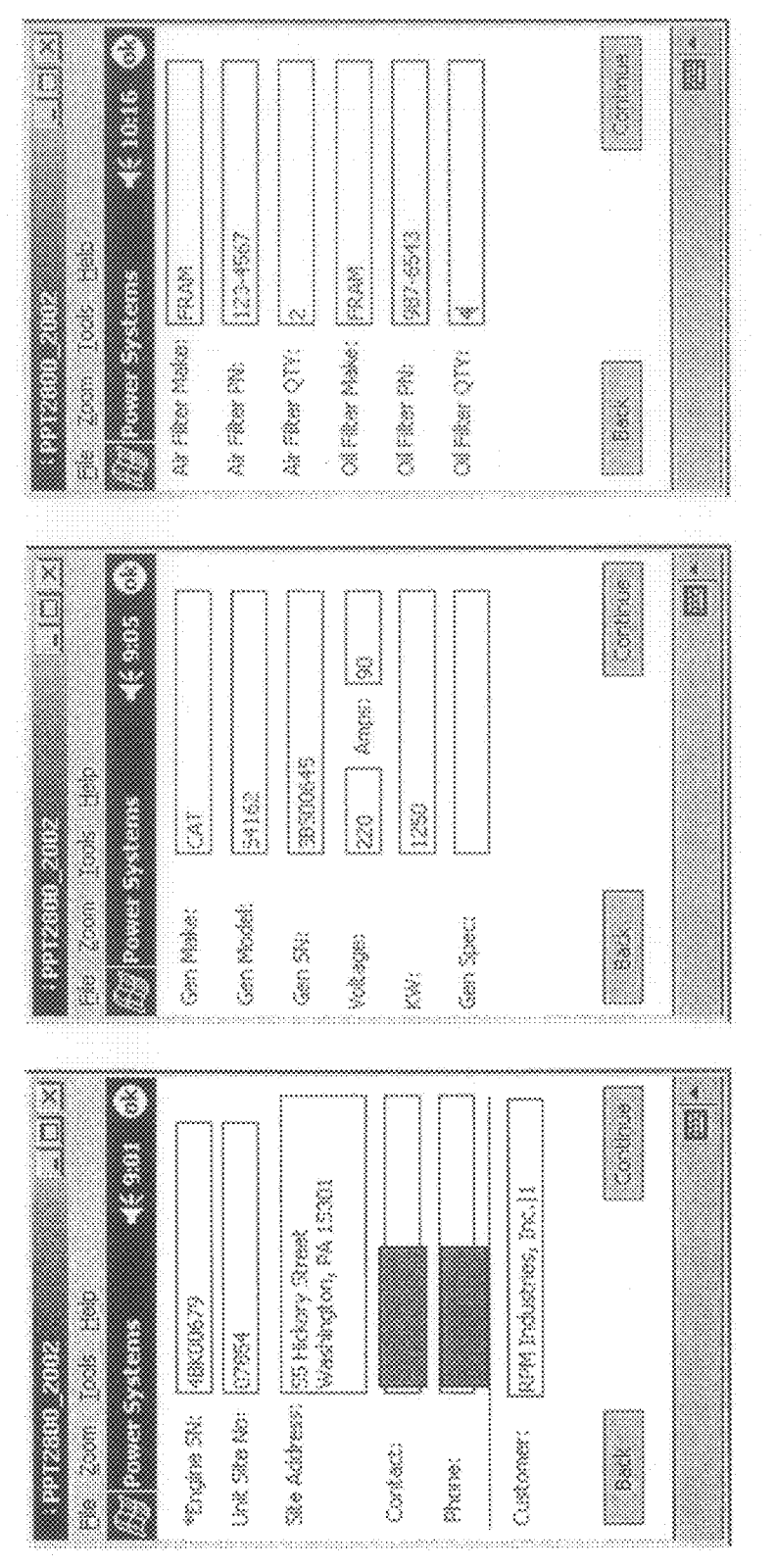

In another embodiment of the present embodiments, data associated with other new and/or unassigned machines can be recorded by use of the service data device 6. Referring now to FIGS. 33 and 34, data entry screens 2702,2802 can be provided for adding one or more EPG machines, such as an engine and a generator, for example, for use by the service data device 6. The data entry screens 2702,2802 can include various data fields such as, for example, a data field 2702A for entry of an engine serial number, a data field 2802A for generator make, a data field 2802B for generator model, among other pertinent data fields associated with specifications and other information for the engine and the generator to be added.

Figures 36, 37, 38:
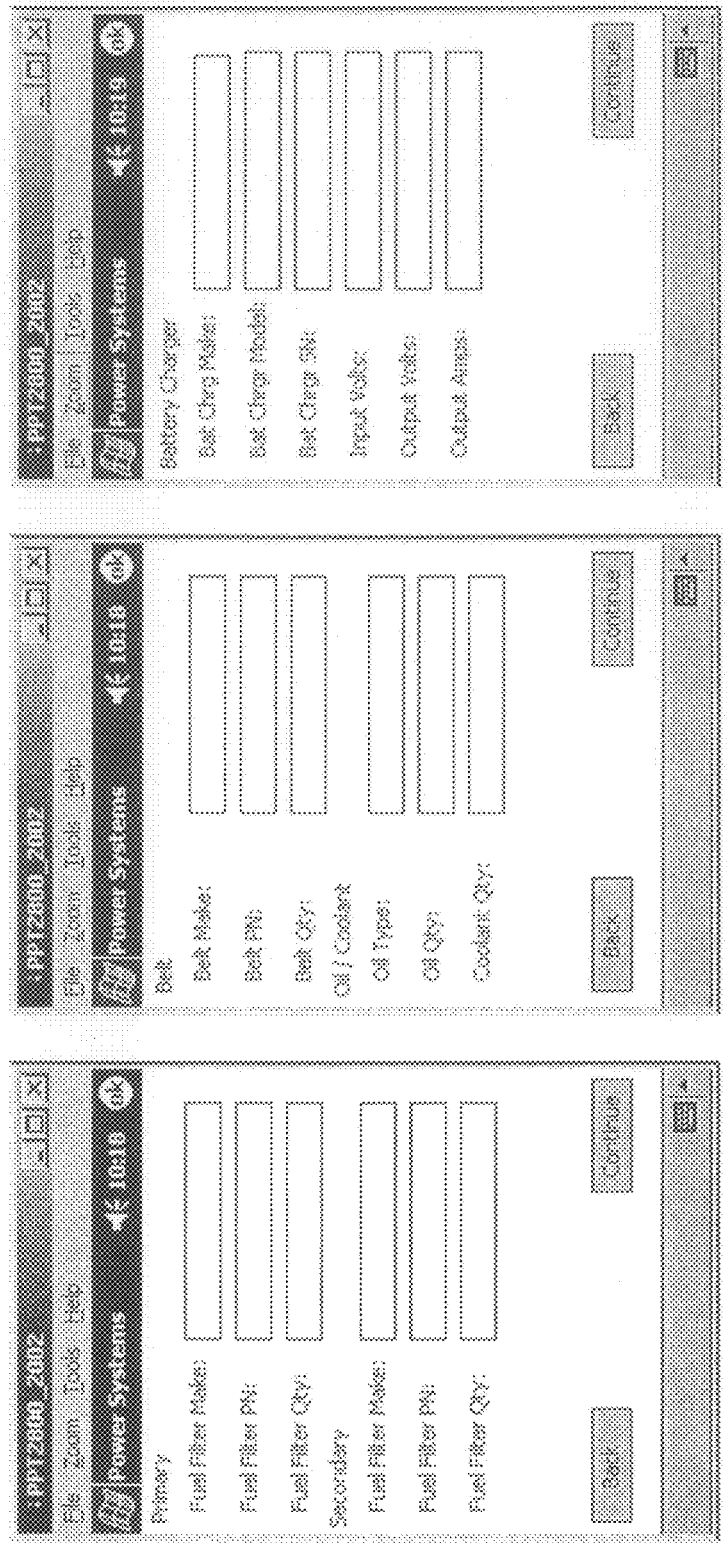
FIG. 36 includes an example data screen provided in association with one or more aspects of the present embodiments.
FIG. 37 includes an example data screen provided in association with one or more aspects of the present embodiments.
FIG. 38 includes an example data screen provided in association with one or more aspects of the present embodiments.
Figure 39:
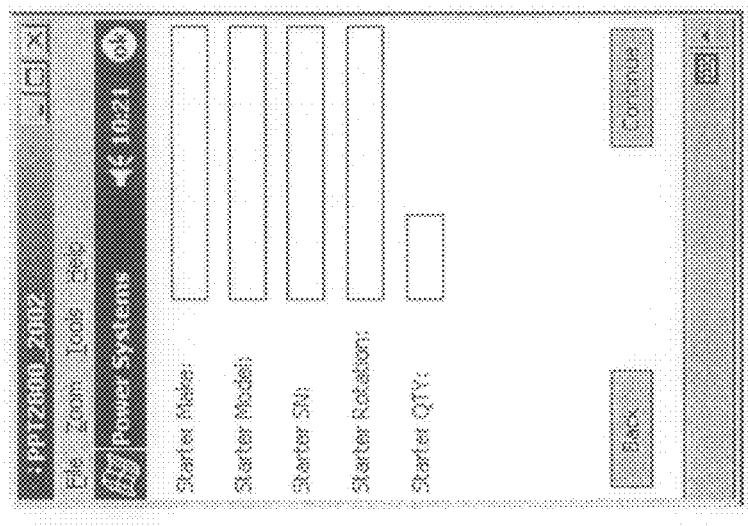
FIG. 39 includes an example data screen provided in association with one or more aspects of the present embodiments.
Figure 40:
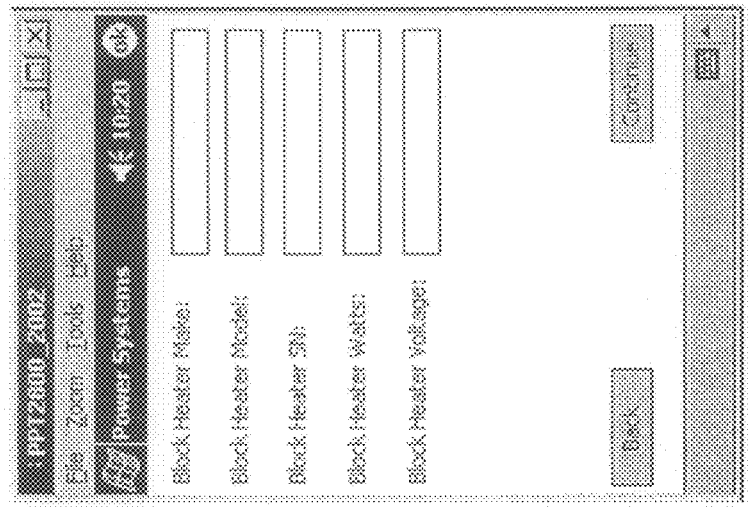
FIG. 40 includes an example data screen provided in association with one or more aspects of the present embodiments.
Figure 41:
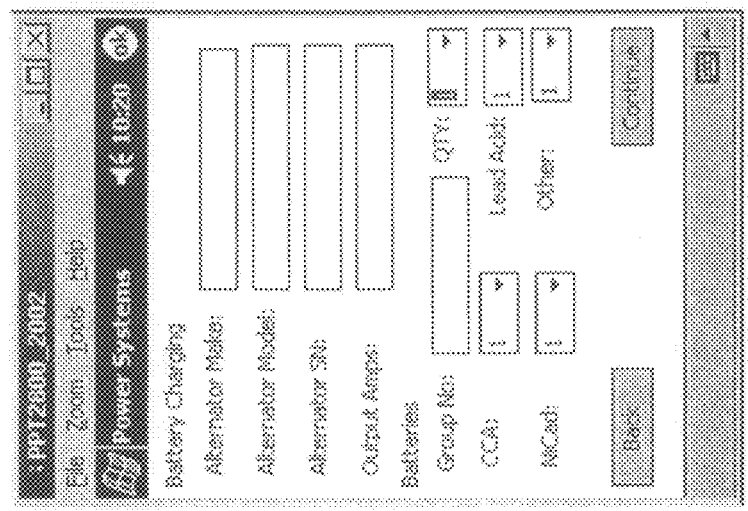
FIG. 41 includes an example data screen provided in association with one or more aspects of the present embodiments.
Figure 44:
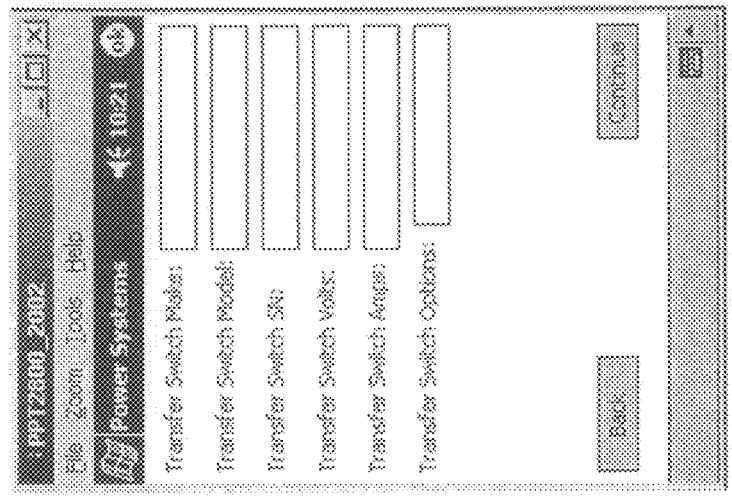
FIG. 44 includes an example data screen provided in association with one or more aspects of the present embodiments.
Figure 43:
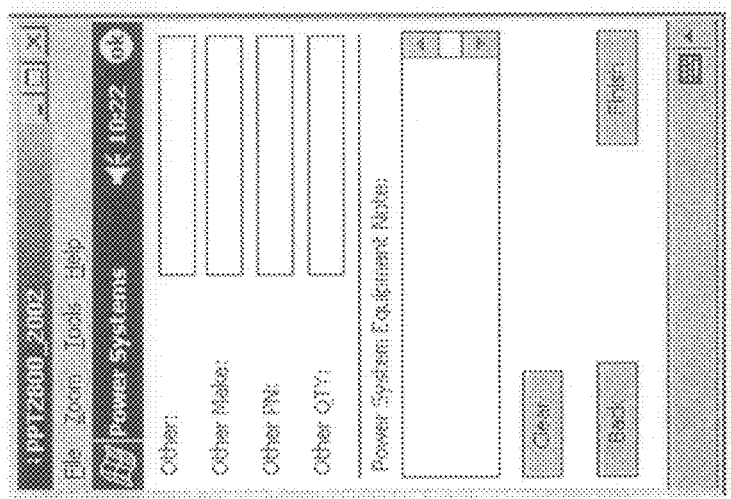
FIG. 43 includes an example data screen provided in association with one or more aspects of the present embodiments.
Figure 42:
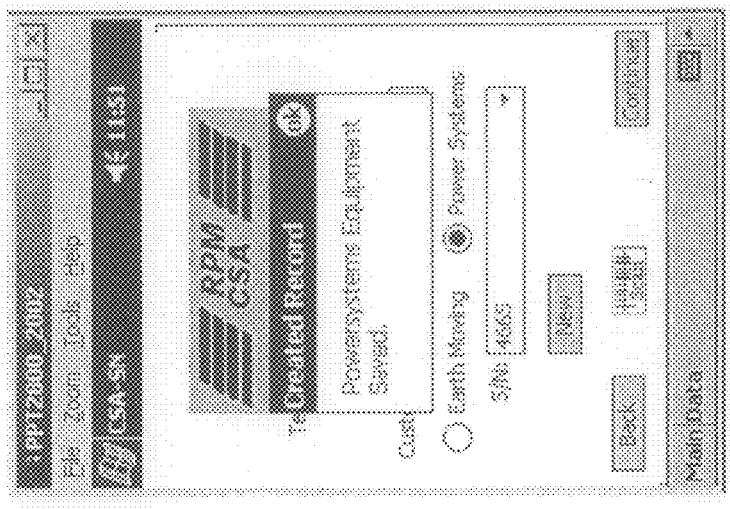
FIG. 42 includes an example data screen provided in association with one or more aspects of the present embodiments.

With reference to FIGS. 35 and 36, in other aspects, filter data screens 3002,3102 are provided with various data fields, as shown, for entry of data related to, for example, an oil filter, air filter, and a fuel filter. With reference to FIG. 37, in another aspect, a component data screen 3202 is provided with various data fields, as shown, for entry of data related to belts, oil and/or coolants, for example. With reference to FIGS. 38 and 39, in other aspects, battery data screens 3302,3402 are provided with various data fields, as shown, for entry of data related to battery chargers, battery charging, and/or batteries. With reference to FIG. 40, in another aspect, a block heater data screen 3502 is provided with various data fields, as shown, for entry of data related to a block heater. With reference to FIG. 41, in another aspect, a starter data screen 3602 is provided with various data fields, as shown, for entry of data related to a starter. With reference to FIG. 42, in another aspect, a transfer switch data screen 3702 is provided with various data fields, as shown, for entry of data related to a transfer switch. With reference to FIG. 43, in another aspect, a miscellaneous data screen 3802 is provided with various data fields, as shown, for entry of data related to other machines, components of machines, or other aspects of machines. In various embodiments, it can be appreciated that data entered into the various data fields of the data screens of FIGS. 33 through 43 can be accomplished manually, electronically by use of a bar code scanner, for example, and/or remotely communicated from a data source external with respect to the service data device 6, such as through communication of data received from the service administrator 12, for example. In addition, in various embodiments, it can be appreciated that data entered into the various data fields of the data screens of FIGS. 33 through 43 can be used to add a new machine for a given customer, update profile information for a given machine, providing a format for data collection by service technicians, and/or other functions associated with service operations. As shown in FIG. 44, in one aspect of the present embodiments, a confirmation message can be displayed confirming that information for the new machine has been added to a memory storage of the data device 6.

Figures 45, 46:
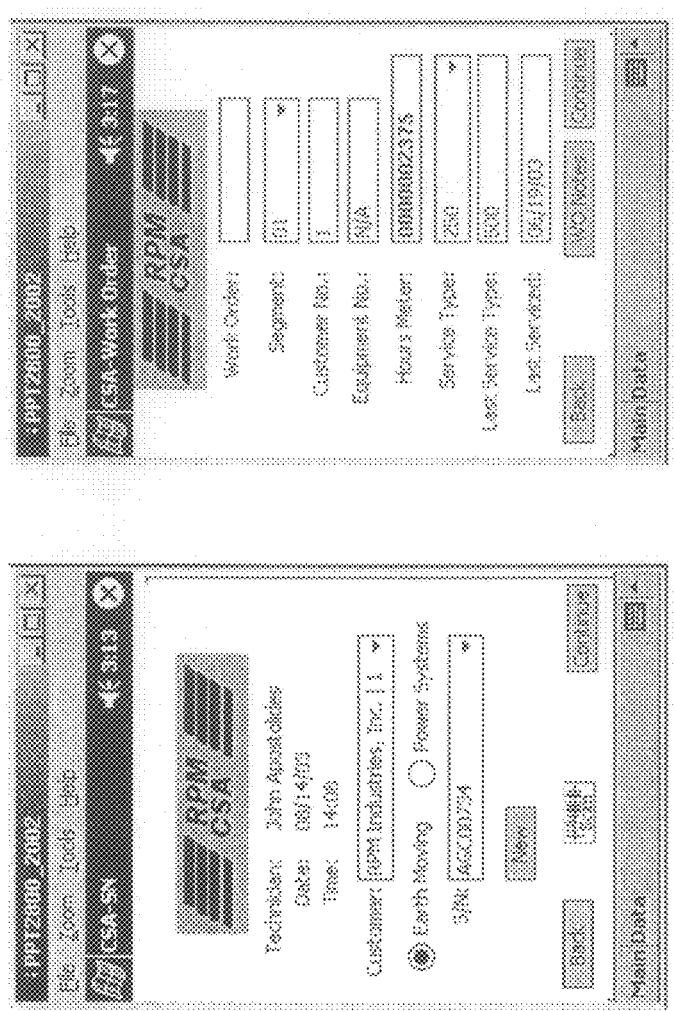
FIG. 45 includes an example data screen provided in association with one or more aspects of the present embodiments.
FIG. 46 includes an example data screen provided in association with one or more aspects of the present embodiments.

Referring now to FIGS. 45 and 46, in other embodiments of the present embodiments, a data screen can be provided that permits a service technician, for example, to perform one or more service operations associated with an unassigned work order for a given customer. In operation, a customer can be selected in a customer field and a serial number for a machine for which unassigned service operations are to be performed can be selected in a serial number field. As shown in FIG. 46, the service technician can proceed to enter an hours number in the hours meter field and/or select a service interval in the service type field, among other data selections such as a work order number, for example, and can then proceed to perform service operations on a previously unassigned work order for the selected machine. In various aspects, banner information can be pre-populated into one or more data fields of the data screens described herein such that, in one example aspect, a service technician need only enter machine hours/miles and a work order number to, initiate service operations for an inspected item. In one aspect, unassigned work orders can employ a system of identity ranges to ensure unique identifiers for each work order performed regardless of a work order number entered by a service technician, for example. In another aspect, multiple service operations can be associated with a common work order number, which may be useful for tracking and accounting activities, such as accounting activity associated with warranty service operations, for example.

Figure 47:
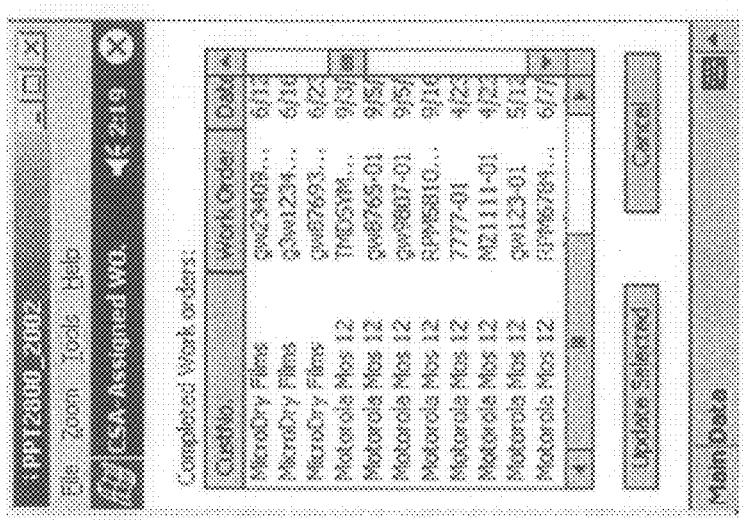
FIG. 47 includes an example data screen provided in association with one or more aspects of the present embodiments.
Figure 48:
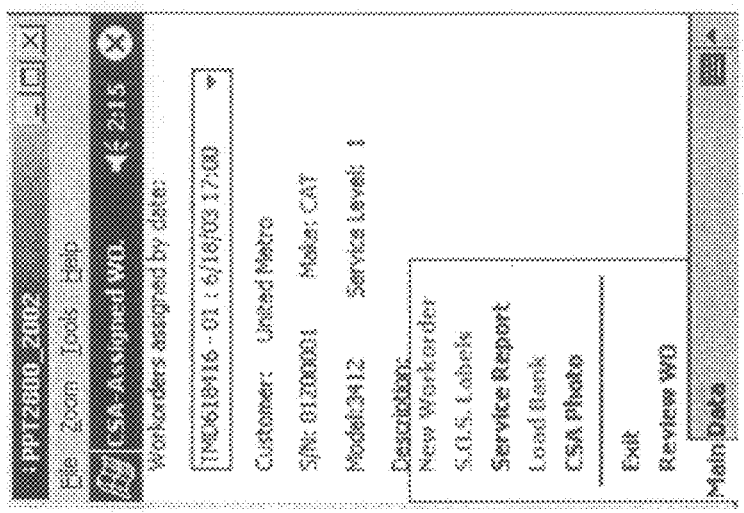
FIG. 48 includes an example data screen provided in association with one or more aspects of the present embodiments.
Figure 54:
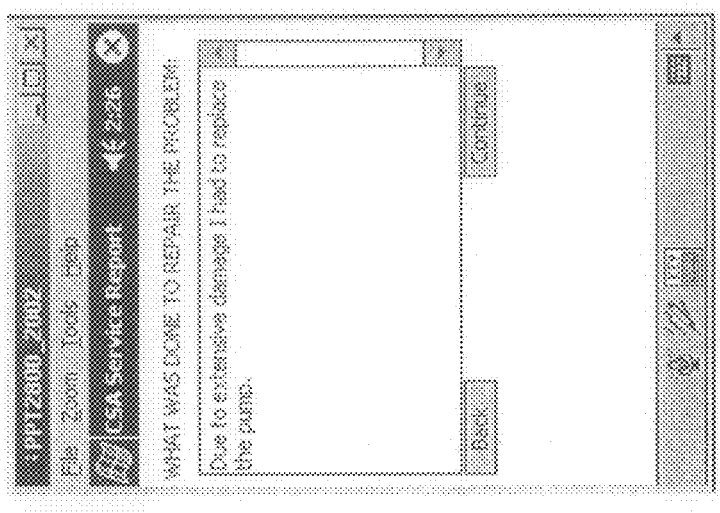
FIG. 54 includes an example data screen provided in association with one or more aspects of the present embodiments.
Figure 53:
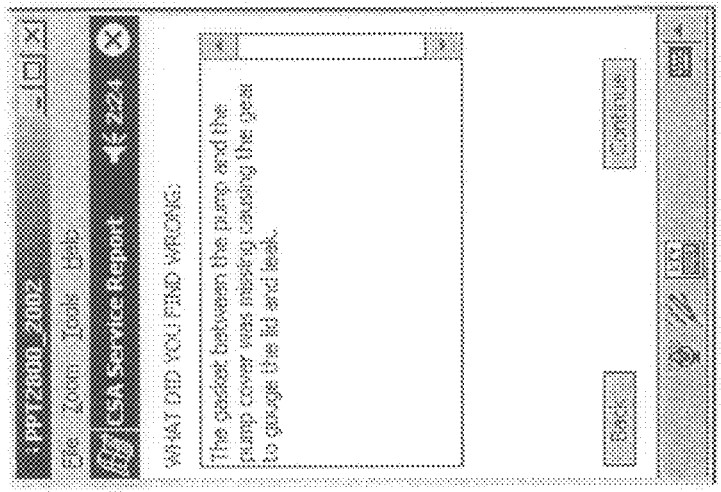
FIG. 53 includes an example data screen provided in association with one or more aspects of the present embodiments.
Figure 52:
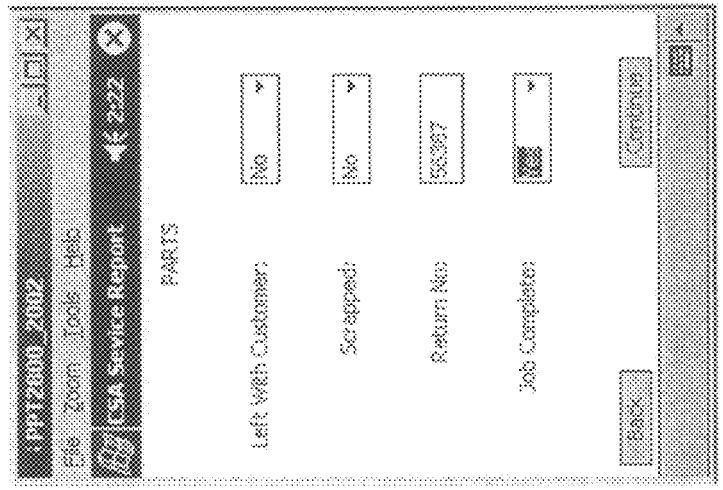
FIG. 52 includes an example data screen provided in association with one or more aspects of the present embodiments.
Figure 57:
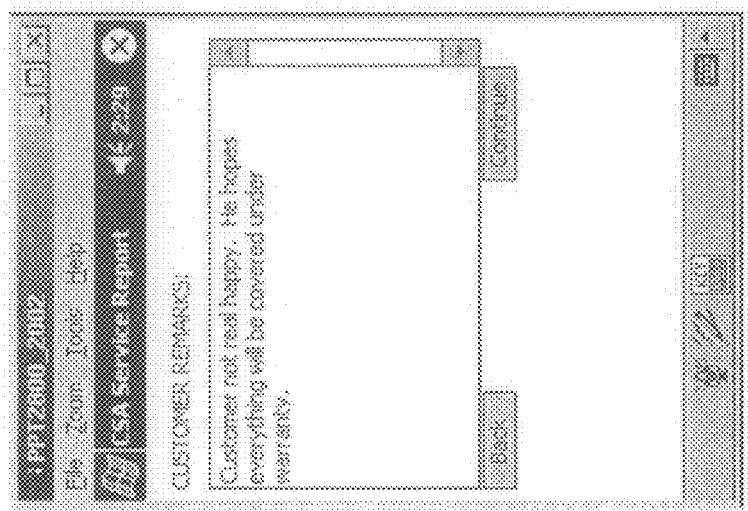
FIG. 57 includes an example data screen provided in association with one or more aspects of the present embodiments.
Figure 56:
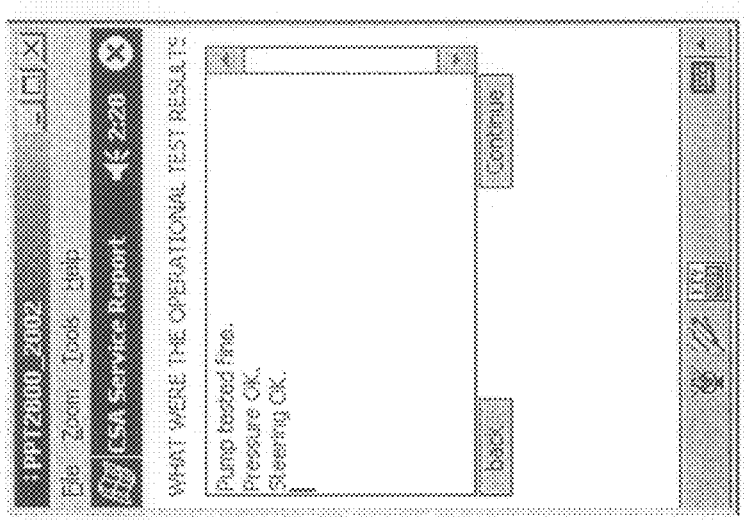
FIG. 56 includes an example data screen provided in association with one or more aspects of the present embodiments.
Figure 55:
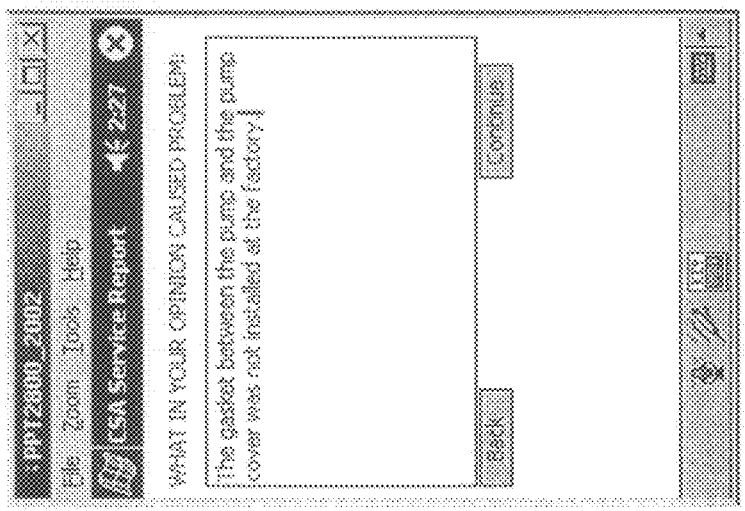
FIG. 55 includes an example data screen provided in association with one or more aspects of the present embodiments.

Referring now to FIGS. 47 and 48, in other embodiments of the present embodiments, examples of data screens that can be used to display and view previously completed work orders are provided. FIG. 47 illustrates how accessing the "Main" function provides a "Review WO" function, among other provided options. FIG. 48 displays a list of previously completed work orders in a data display field that can be accessed to facilitate display and/or modification of one or more of the previously completed work orders.

Figure 59:
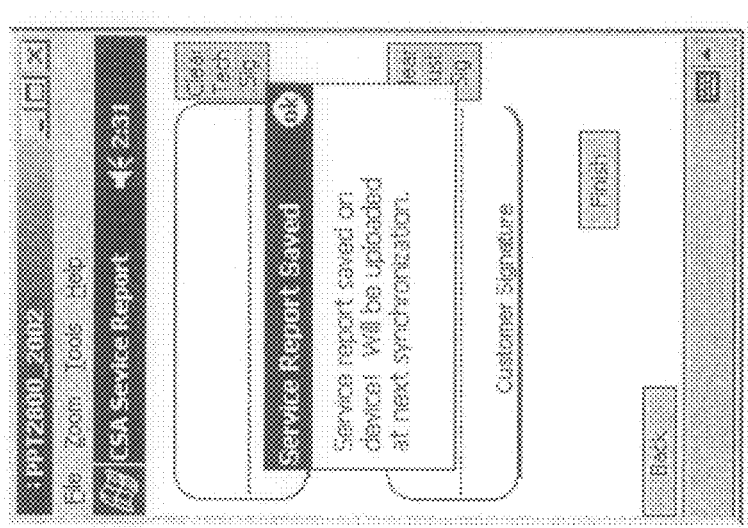
FIG. 59 includes an example data screen provided in association with one or more aspects of the present embodiments.
Figure 58:
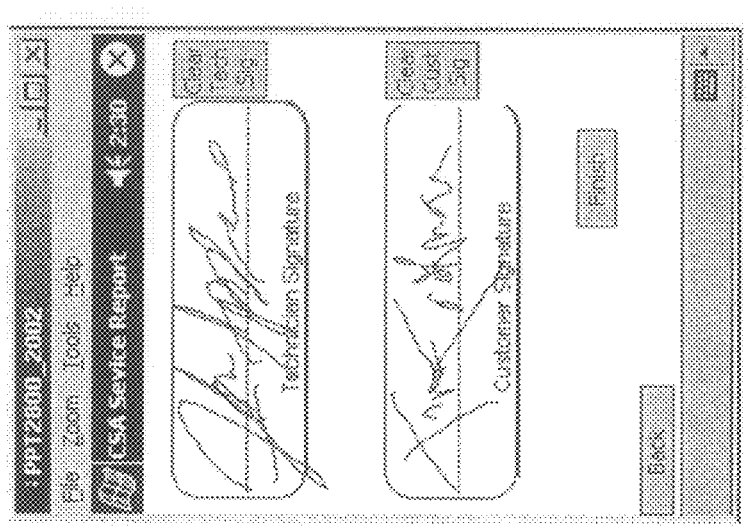
FIG. 58 includes an example data screen provided in association with one or more aspects of the present embodiments.

Referring now to FIGS. 49 through 57, example screen displays are provided that illustrate pre-population aspects of the present embodiments. In the context of performing warranty replacement and/or repair work on machines, for example, it can be seen that pre-population of the data screens with conditions expected to be found on a machine for which warranty work may be required can increase the efficiency of service operations performed pursuant to the warranty work. FIG. 58 illustrates a data screen that can be employed for a customer and a service technician to acknowledge that work has been completed (in accordance with prior discussion hereinabove). FIG. 59 illustrates a confirmation message that can be displayed once the service report (including data for service operations performed pursuant to warranty work, for example) is completed for the machine. In another aspect, a prompt or other notification can be generated for display in the event that one or more checklist items are not completed, for example, or one or more signatures are not provided, for example. In one aspect, the prompt can be provided as a dialog box notifying a technician of the missing or incomplete information and can be provided with or without navigational functionality to return to the portion or portions of the data screen or screens where the missing or incomplete information should be entered.

It can be seen that service intervals may be developed and revised based on the data collected and processed through practice of various aspects of the foregoing embodiments. A service interval of 250, for example, and its associated checklist items may be adjusted to a different service interval to account for the practical aspects actual maintenance and repair operations performed on a machine, for example.

Figure 60:
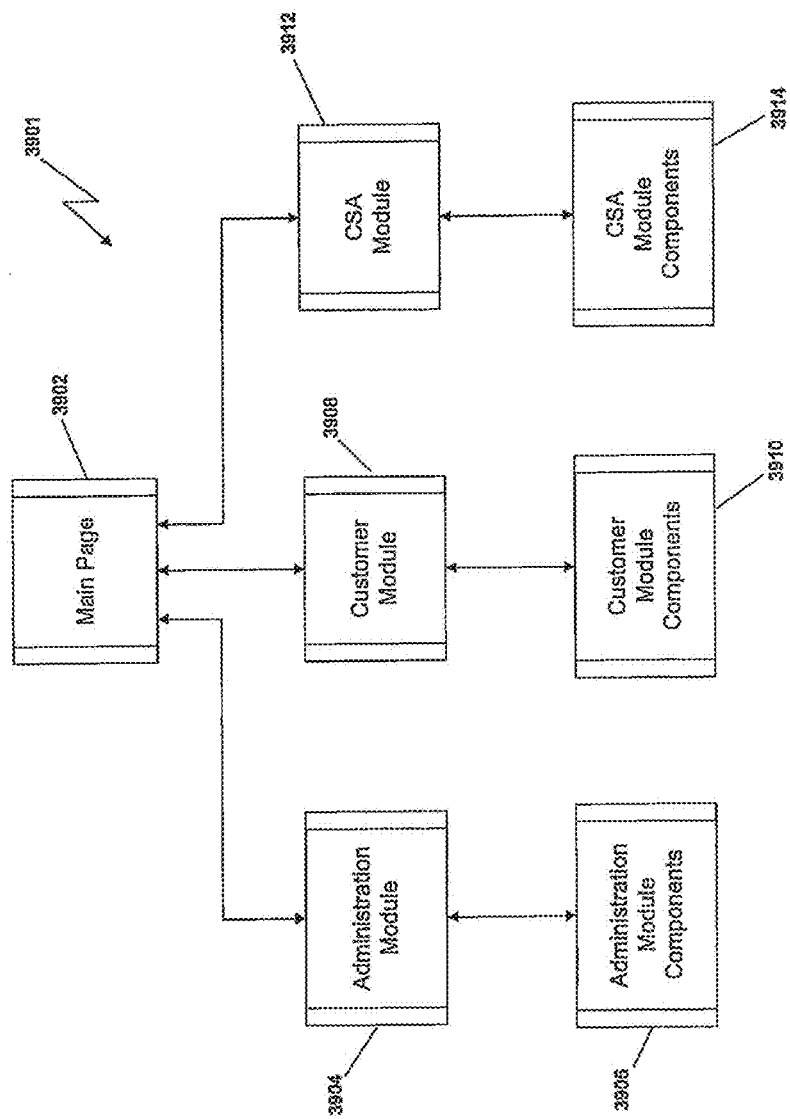
FIG. 60 includes a schematic of an example network architecture provided in accordance with one or more aspects of the present embodiments.

Referring now to FIGS. 60 and 61, in other embodiments of the present embodiments, a sample illustration of a network site 3901 operatively associated with the web server of the service administrator is provided. In the example configuration shown, the network site 3901 includes a main page 3902 for obtaining authorized access to the network site 3901. The network site 3901 also includes an administration module 3904 having one or more operatively associated administration module components 3906, a customer module 3908 having one or more operatively associated customer module components 3910, and a CSA module 3912 having one or more operatively associated CSA module components 3914. An example embodiment of a screen display for the main page 3902 is shown in FIG. 61. The main page 3902 can include buttons, for example, that permit a user to access the administration module 3904, the customer module 3908, and/or the CSA module 3912.

Figure 63A:
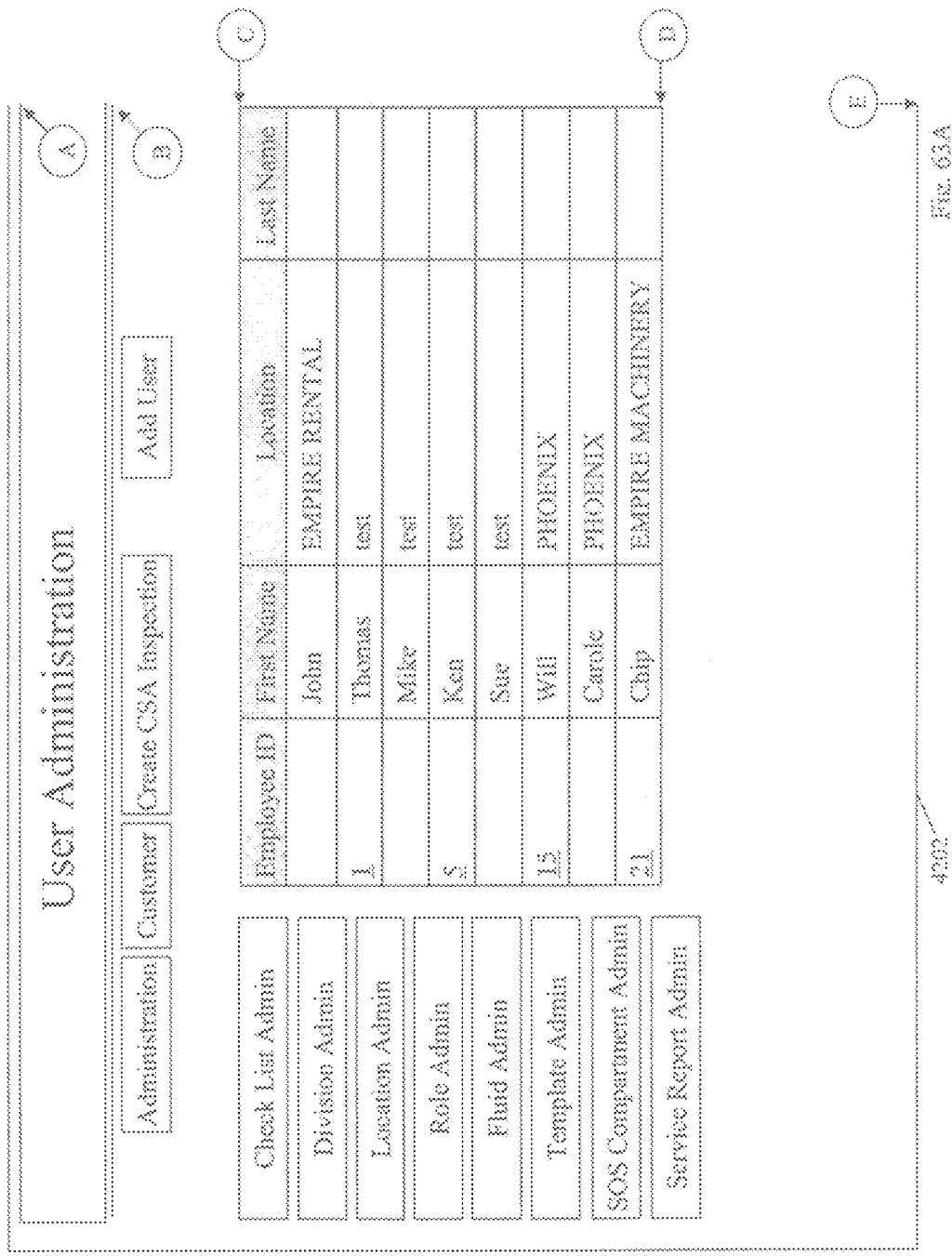
FIGS. 63A-63B include an example network site page provided in accordance with one or more aspects of the present embodiments.
Figure 63:
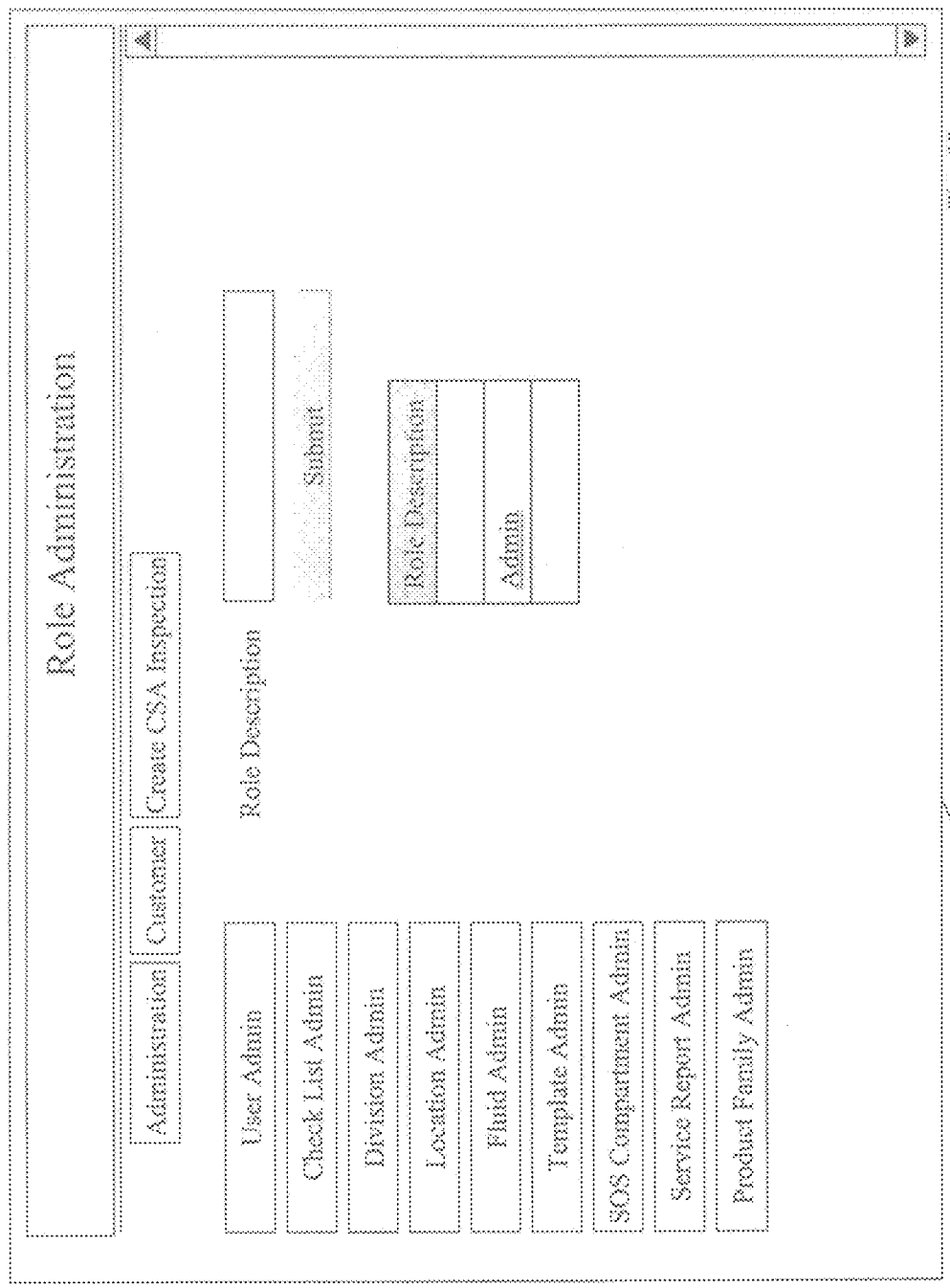
Figure 66A:
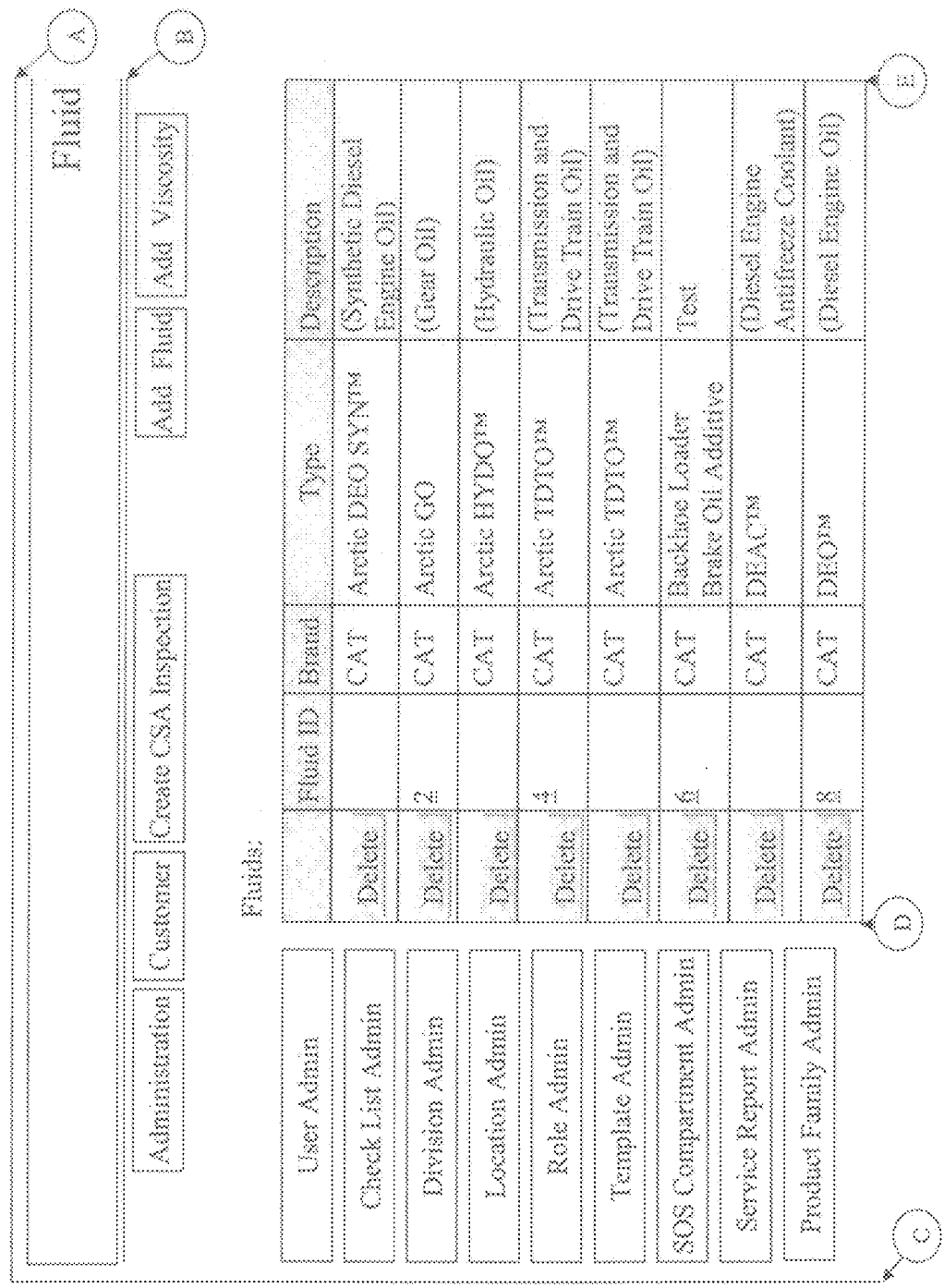
Figure 66B:
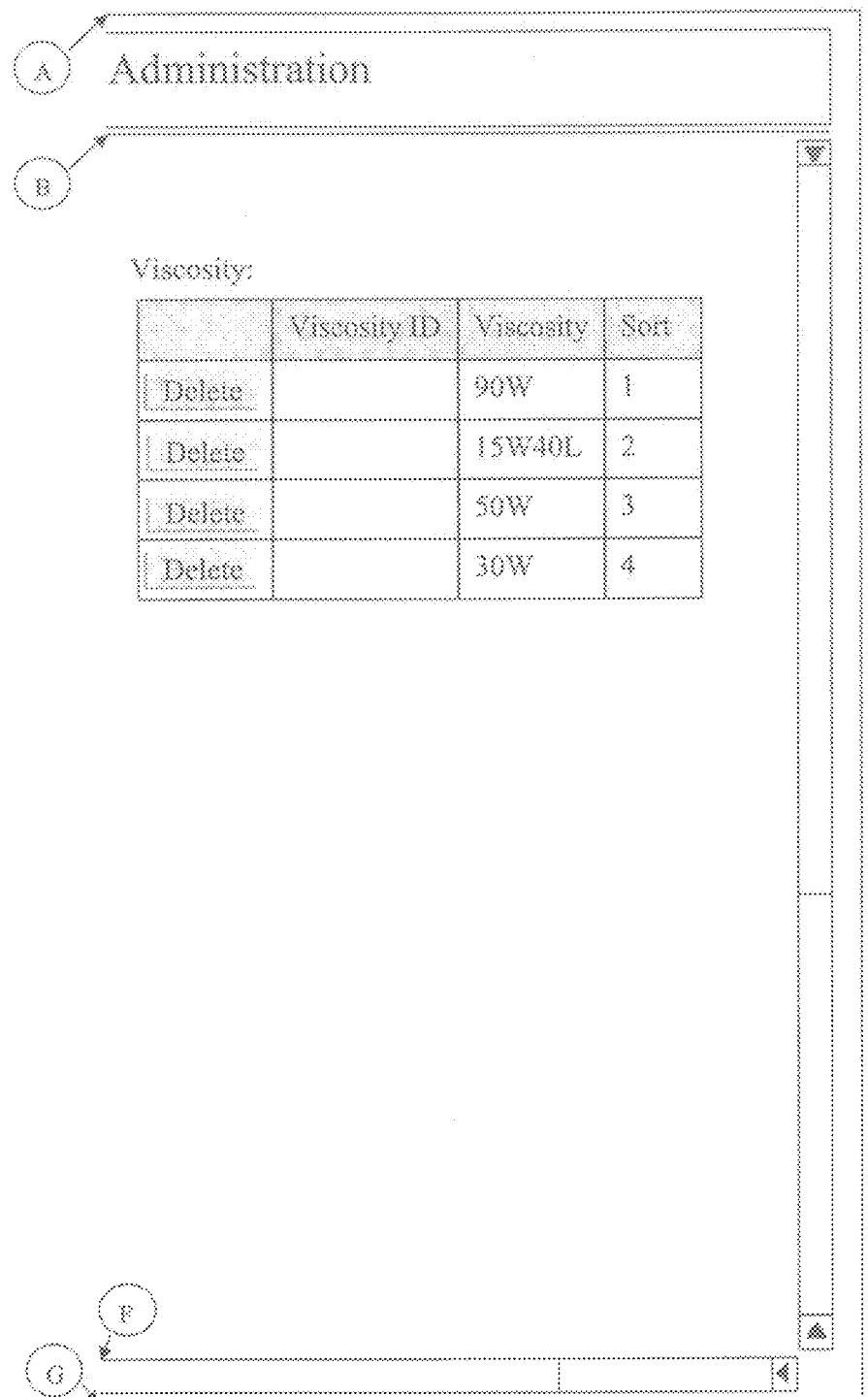

Referring now to FIG. 62, an illustrative screen display for a main page 4102 of the administration module 3904 is shown. The administration module main page 4102 includes links to various administrative functions that can be performed on the network site 3901. As shown in FIGS. 63A-63B, a user administration page 4202 can be provided to add, remove or edit information associated with various users of the network site 3901. FIG. 64 illustrates a division page 4302 including administrative functionality associated with editing one or more division descriptions. In one aspect, division types can include "Earth Moving" and "Power Systems" (or EPG), for example, among other types of potential division designations. FIG. 65 illustrates a role administration page 4402 that can be employed to configure the roles of various users of the network site 3901. Examples of roles can include administrator, technician, clerk, among other types of roles. FIGS. 66A-66C illustrate a fluid administration page 4502 that can be used to configure data associated with one or more types of fluids such as oil, for example, employed in various service operations for various machines.

Figure 67:
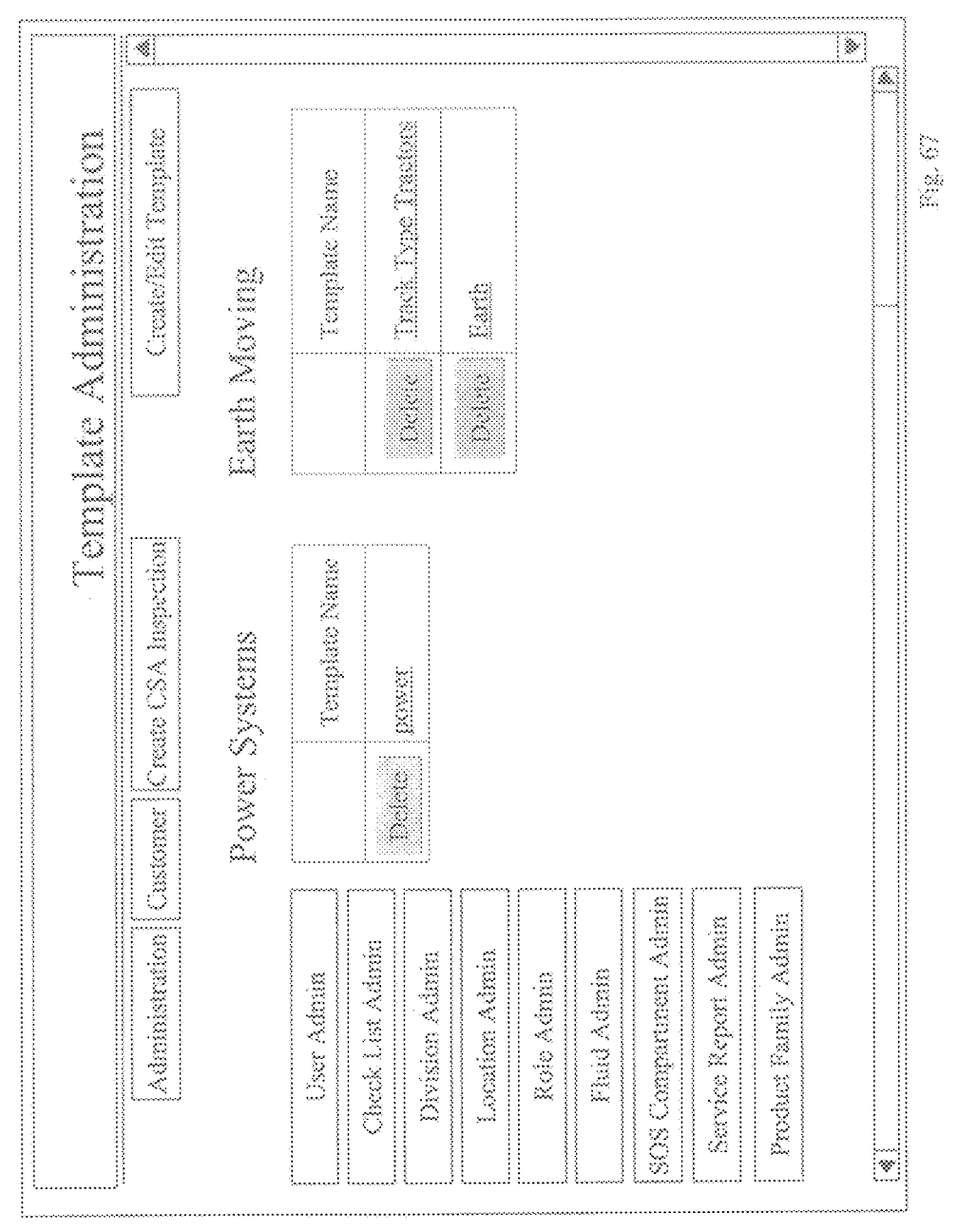

Referring now to FIG. 67, a template administration page 4602 is shown which displays various templates that are available, by division, for use on the network site 3901. In one aspect, a template can form the basis for developing and designing a customized checklist for use in a service operation, for example, which is designed to meet the needs of a particular customer, for example. The page 4602 displays all available templates by division and permits creation and/or deletion of templates to be initiated. In other aspects, template administration functions can be employed in association with customizing one or more data screens associated with one or more load bank testing service operations.

Figure 68:
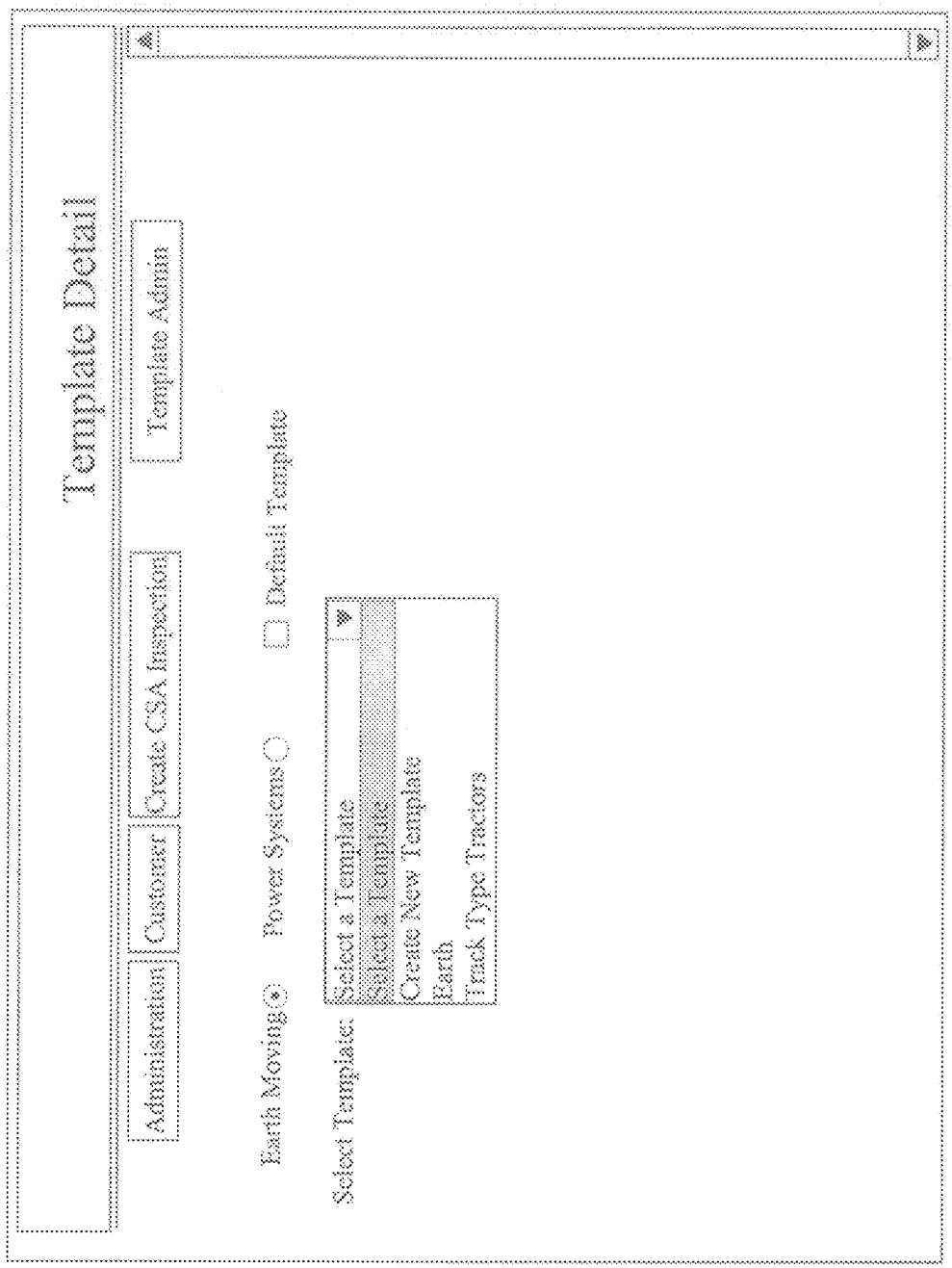
FIG. 68 includes an example network site page provided in accordance with one or more aspects of the present embodiments.
Figure 69:
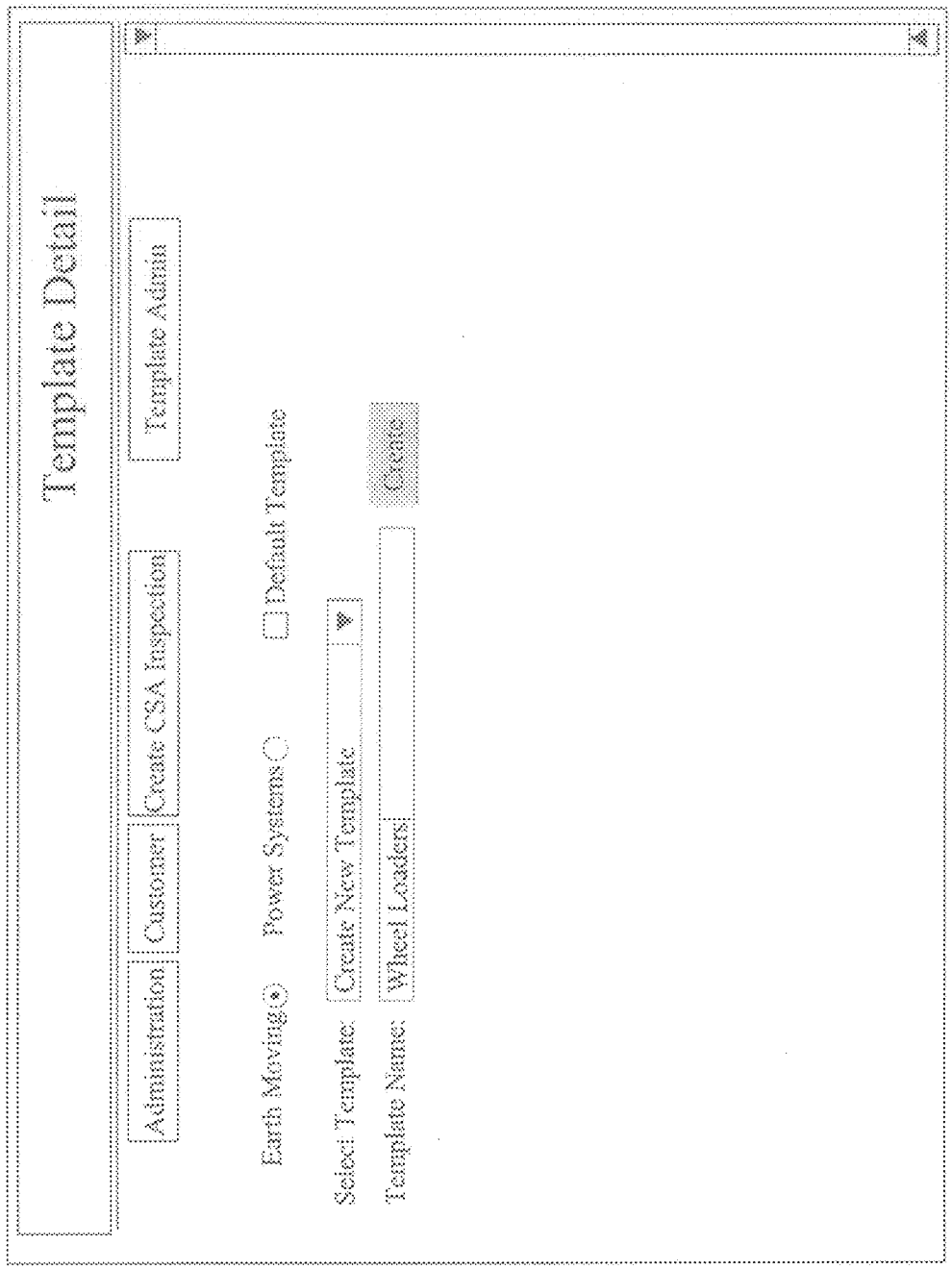
FIG. 69 includes an example network site page provided in accordance with one or more aspects of the present embodiments.

Referring now to FIG. 68, a template detail page can be provided to permit a user to create a new template or edit an existing template. A template can be selected for edit/creation as a function of division type, and an edited/created template can be designated as a default template, as shown. As illustrated in FIG. 69, a new template can be given an appropriate designation (e.g., a name) and a "Create" button can be accessed to initiate the template creation process. As shown in FIG. 70, one or more inspection types are provided that represent headers for grouping on various reports. The inspection types and their associated checklist questions can be established on a checklist administration page to reflect various questions that a customer needs to have addressed during service operations performed on a machine, for example. In one aspect, the association between inspection types and a given template can be established on a template administration page.

As shown in FIG. 71, once an inspection type is selected, one or more questions associated with that inspection type can be selected for the template. In one aspect, the service interval for a given question may be shown adjacent to the question for convenience of creating the new template. In another aspect, once selection of questions is completed, a "Create Template" button can be selected to finalize creation of the new template. FIG. 72 illustrates how questions are added to the template during the process of template creation.

Referring now to FIG. 73, a sample template administration page is illustrated. The template administration page displays checklist questions for various inspection types including the service interval associated with each checklist question.

Figure 74:
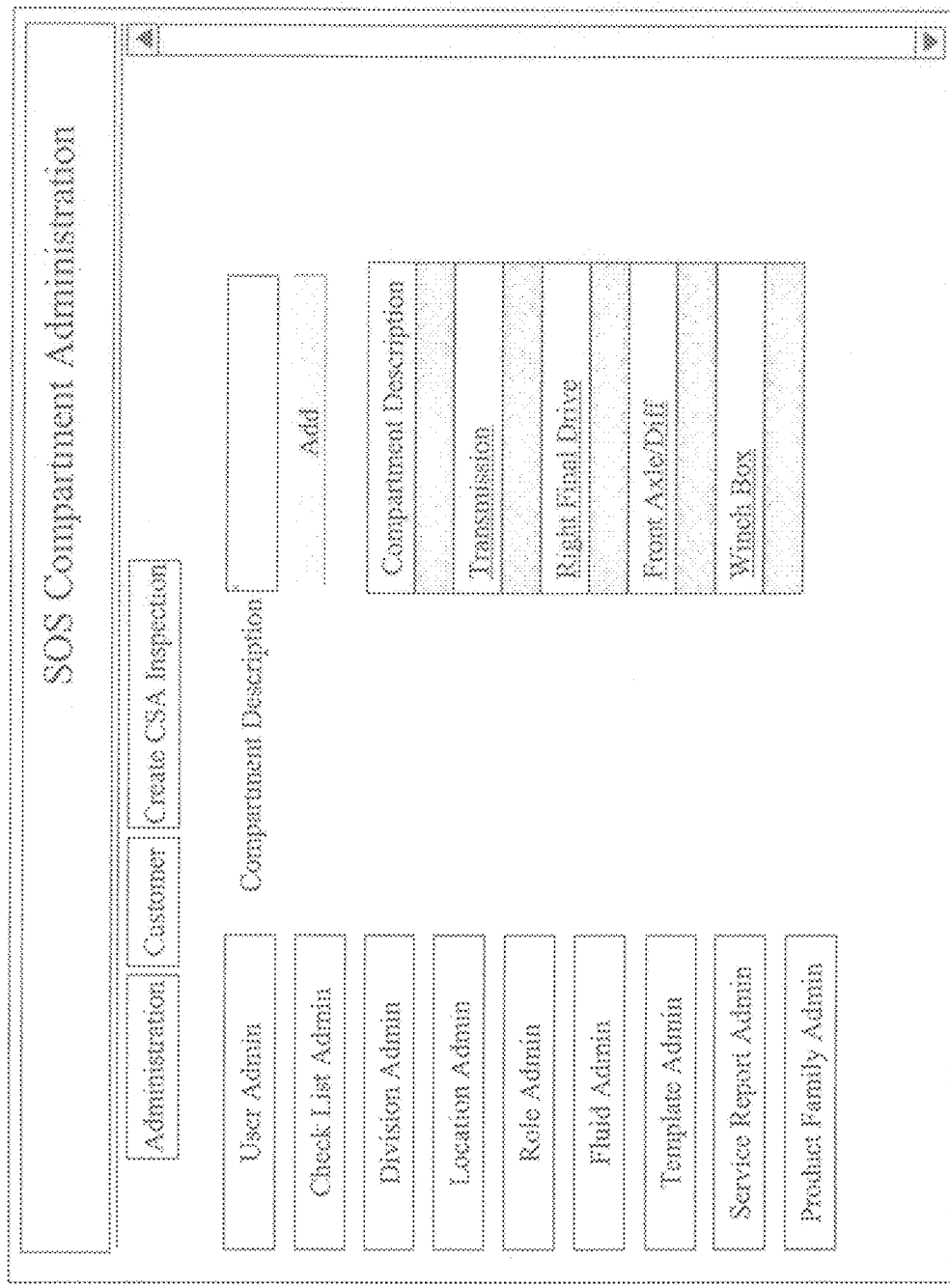
FIG. 74 includes an example network site page provided in accordance with one or more aspects of the present embodiments.
Figure 76A:
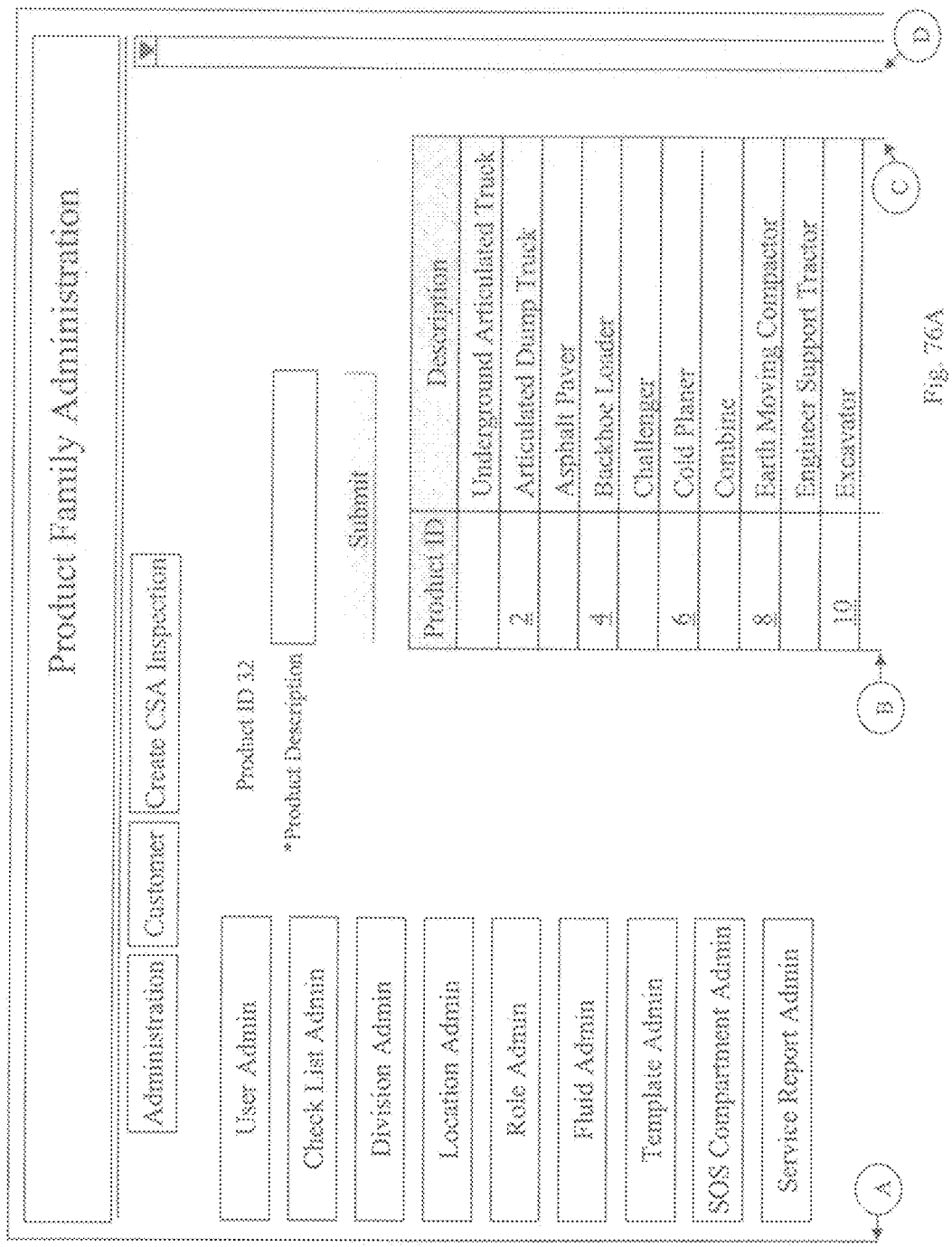
FIGS. 76A-76B include an example network site page provided in accordance with one or more aspects of the present embodiments.
Figure 76B:
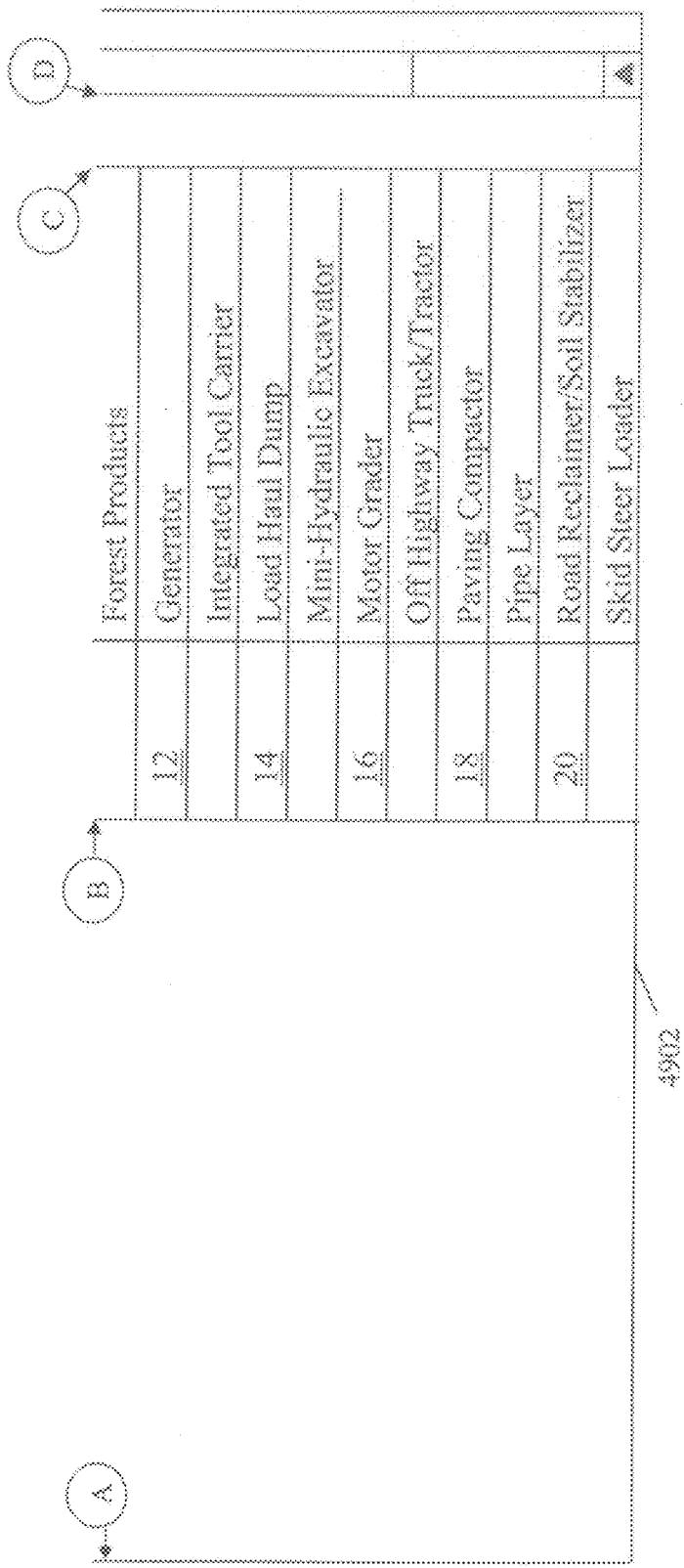

FIG. 74 illustrates a compartment administration page 4702 which can include information on various fluid compartments such as, for example, oil compartments, transmission fluid compartments, hydraulic fluid compartments, among other types of compartments used in association with machine service operations. FIG. 75 includes a description code administration page 4802 that can be employed to generate various types of codes used to describe issues associated with machines and/or their components. FIGS. 76A-76B illustrate a product family administration page 4902 that can be used to configure various machines, or components of machines, within a particular product family group designation.

Referring now to FIG. 77, an example embodiment of a customer module main page 5002 is shown. The customer module main page 5002 includes information for various customers of machines for which service operations are performed.

FIG. 78 illustrates a customer detail page 5102 which includes various detailed data associated with one or more of the customers displayed on the customer module main page 5002.

FIG. 79 illustrates a contracts page 5202 which includes agreement numbers and customer contacts, for example, for service contracts associated with service operations performed on customer machines.

Figure 80D:
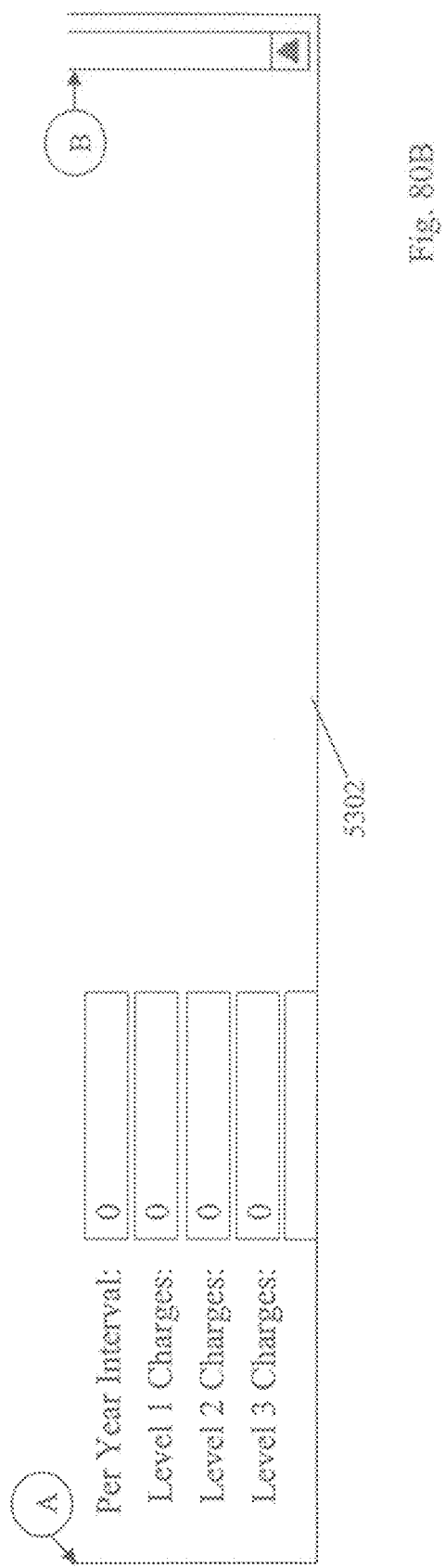
FIGS. 80A-80B include an example network site page provided in accordance with one or more aspects of the present embodiments.

FIGS. 80A-80B illustrate a contract administration page 5302 which includes detailed data relating various machines to contract data such as contact information, length of contract, service area, and other data as shown.

Figure 81A:
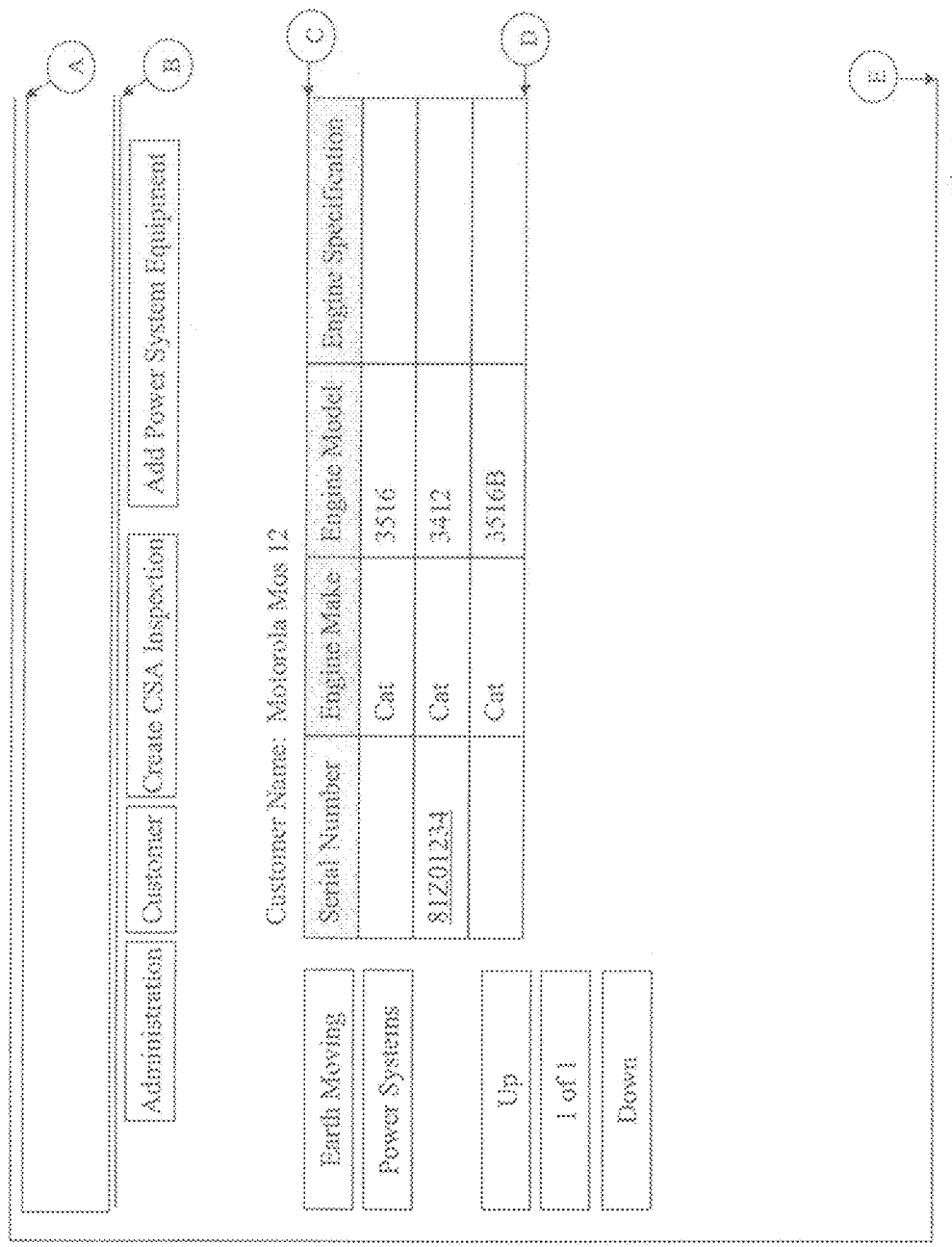

FIGS. 81A-81B illustrate an equipment page 5402 which relates customer equipment (such as machines, for example) to data obtained and stored by the service administrator 12 in association with service operations performed on the customer equipment. The equipment page 5402 includes one or more links to data such as, for example, equipment specifications, CSA inspections, service reports, and recommended repairs data.

FIG. 82 illustrates an equipment detail page 5502 which includes various data fields associated with a particular customer machine.

Figure 83B:
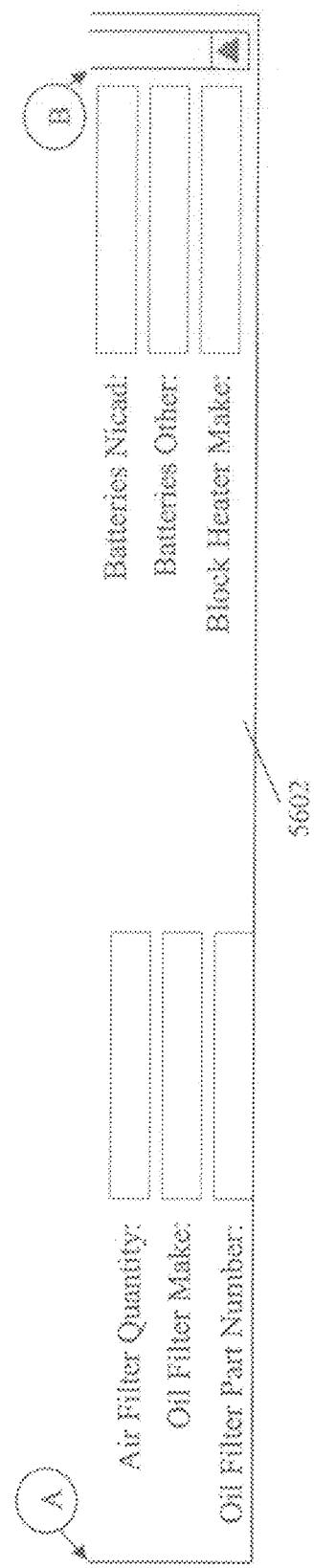

FIGS. 83A-83B are an example of a power systems equipment detail page 5602 provided in connection with a customer machine characterized as a power systems (EPG) machine.

Figure 84:
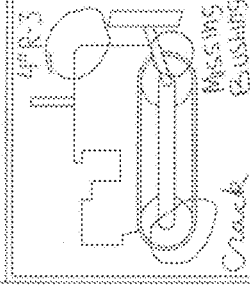
FIG. 84 includes an example network site page provided in accordance with one or more aspects of the present embodiments.

FIG. 84 illustrates a pictures and audio notes page 5702 that provides, for example, digital photographic images and/or audio recordings association with service operations performed on a customer machine.

FIG. 85 includes an illustrative load bank test page 5802 that includes information obtained from one or more load bank tests performed on a machine.

Figure 86A:
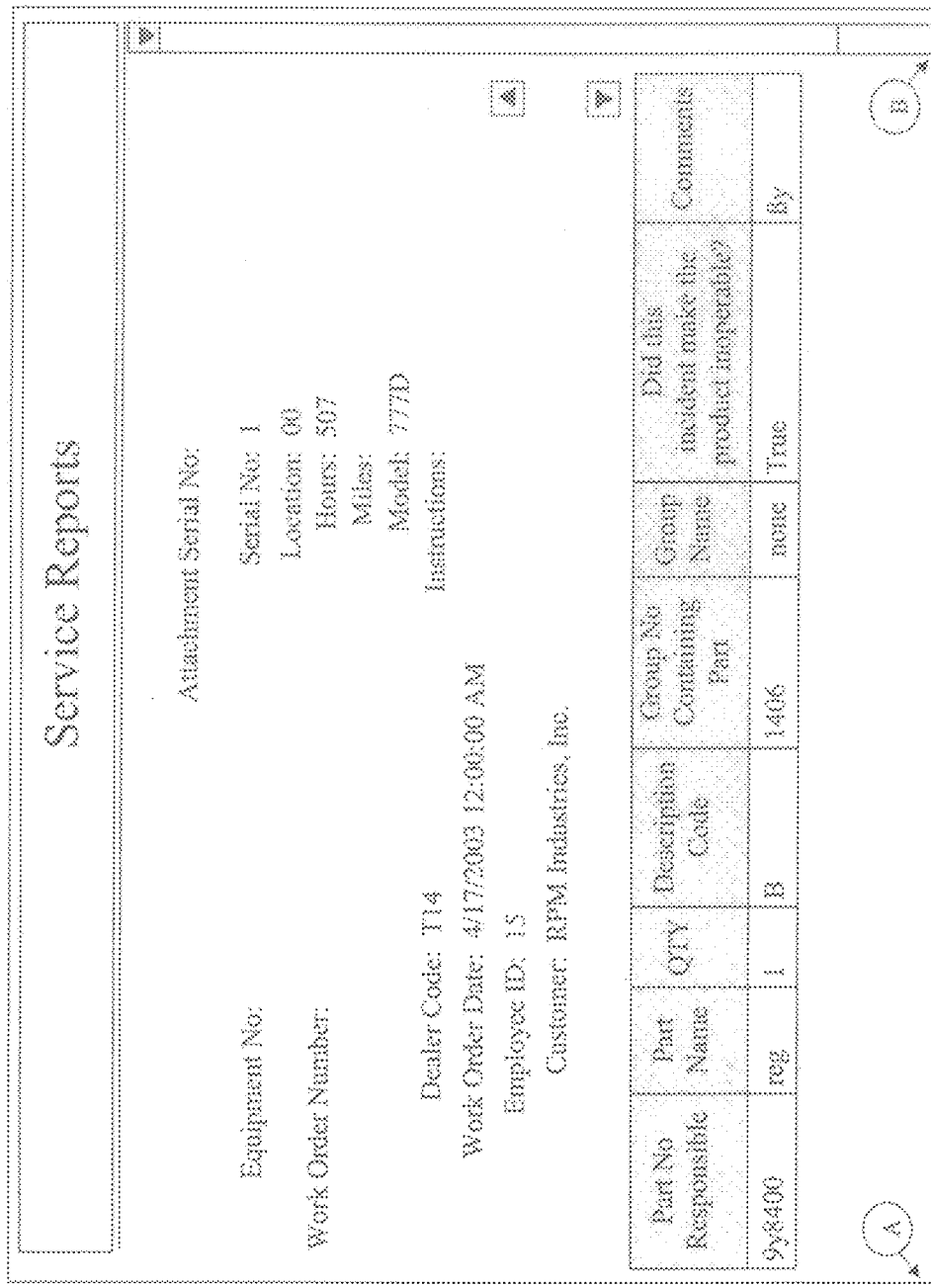
FIG. 86 includes an example network site page provided in accordance with one or more aspects of the present embodiments.

FIG. 86 illustrates an inspection type notes page 5902 including notes recorded by a service technician, for example, derived from service operations performed on a machine.

FIG. 87 includes a sample inspection checklist item notes page 6002 including notes recorded by a service technician, for example, derived from service operations performed on a machine.

FIGS. 88A-88B illustrate a sample service reports page 6102 which includes data collected and communicated from service operations performed on a machine.

FIG. 89 includes a required repair reports page 6202 that includes checklist items identified with an "RR" designation during one or more service operations performed for a machine.

FIGS. 90A-90B include a CSA inspection report page 6302 which illustrates various checklist responses entered by a service technician, for example, performing one or more service operations on a machine. In one aspect, one or more checklist items can be associated with a note or notes entered by a user and stored for subsequent retrieval. As shown, a note or notes can be accessed through one or more hyperlinks, for example, or other links to the data underlying the stored note or notes (hyperlinks are represented as underlined text as shown in FIGS. 90A-90B).

Figure 91A:

Referring now to FIGS. 91A-91B, in association with the CSA module 3912, an embodiment of a create CSA inspection page 6402 is shown. As can be readily appreciated, the create CSA inspection page 6402 permits the service administrator 12, in conjunction with the customer 22, to develop a customized approach to performance of service operations for customer machines. Various functions shown on the create CSA inspection page 6402 include designating the type of machine (e.g., "Earth Moving" or "Power Systems"), loading a pre-designed template as a basis for the template being currently developed, adding questions to a checklist for inspection operations, determining service intervals, among other customizable features as shown in FIGS. 91A-91B.

Figure 92A:

In addition, with reference to FIGS. 92A-92B, a list of assigned inspections can be generated and displayed on an assigned CSA inspection page. Created CSA inspections and their associated service operations can be assigned based on, for example, a technician desired for a particular machine, work order identification, date/time a service operation is required or desired, and/or other factors. In various aspects, one or more assigned CSA inspections can be edited in the event of changes in dates, service intervals, and/or other information changes or updates.

In other embodiments of the present embodiments, data communicated between the service administrator 12 and the data device 6, for example, can be communicated in one or more languages such as, for example, and without limitation, English, French, German, Spanish, and/or any other language used for communication between parties. A data screen including a checklist, for example, can be translated using a conventional language translation software, for example, into any suitable language for use on the data device 6 based on the geographical location, culture, and/or preferred language choice, among other factors of the location of service operations. In one aspect, the checklists can be customized such that a given checklist item is provided with a unique identifier (e.g., a numerical identifier) that survives translation of the checklist item into a different language. In this manner, data communicated to the service administrator 12, for example, as a result of completion of the checklist item (which checklist item may have been completed in a variety of different languages, e.g., different countries, different regions of the world, and so forth), can be filtered based on the unique identifier regardless of the language into which the checklist item was translated and employed in service operations. It can be seen that, in this manner, data from a checklist item can be consolidated in a data storage medium, for example, despite the origin of the checklist data from potentially a diversity of different languages.

In another aspect, one or more viewing screens can be provided on the data device 6 and/or at the service administrator 12 to permit viewing of a checklist, for example, in a variety of languages. For example, checklists can be communicated to data devices around the world by the service administrator 12 in a non-English language and completed checklists communicated back to the service administrator in English. Functionality can be provided on either the data device 6 and/or the service administrator 12, in connection with a conventional language translation software, to view translations of checklist items, for example, from one language to at least one other language. In one example aspect, checklists and other data screens can be translated initially into selected multiple languages for subsequent convenience of movement between and among the selected multiple languages.

Operational Example 2

Patients

In another operational example, an inspected item can include a patient arriving at a healthcare facility such as a hospital emergency room, for example, to receive medical treatment for a head injury, for example. As noted above, it can be seen that various aspects of the present embodiments applicable to machine service operations described above are equally and analogously applicable to the present operational example.

In one aspect, a social security number (compare serial number for machines—see above) of a patient can be a key identifier for automatically populating a data screen with information regarding the patient. Data such as patient name, patient address, patient phone number, patient date of birth, sex of the patient, patient next of kin, and other like personal information can be collected on a data screen, stored locally on the data device, communicated to a service administrator operatively associated with the healthcare facility, and/or otherwise processed in accordance with various aspects of the present embodiments described above. In one aspect, once patient data is initially collected and stored, the patient data can be subsequently retrieved and displayed upon entry of the social security number of the patient, for example, or another suitable key identifier. In another aspect, bar code scanning of patient data can occur as the patient is processed through the healthcare facility permitting, for example, patient identity recognition, quality assurance for administered medications, confirmation of proper patient location within healthcare facility, among other functions. In one example aspect, bar code scanning can be employed to reduce the possibility of medication interactions, improper dosaging, patient allergies to medications, and/or the potential for other adverse consequences that may affect the patient.

Customized checklist questions can be transmitted to a data device employed by a doctor, for example, or other healthcare professional, to inspect or diagnose the condition of the patient. Examples of checklist questions are provided as follows (with various data entry options such as drop-down menu selections, for example, illustrated in parenthesis next to each question as shown, with the process flow assuming that a head injury is selected for the first checklist question):

Social Security Number: (Enter number)
Nature of injury (head injury, cut, knee, stomach pain, broken arm, broken leg, ankle sprain)
How did injury occur? (fall, home injury, sports accident)
How long have symptoms been present? (Enter data)
Are you allergic to any medications? (penicillin, aspirin, codeine)
Is vision blurry? (YES/NO)
Do you have a headache now? (YES/NO)
  If "YES" where in head is pain? (front, back, side)2
  Are headaches a common problem for you? (YES/NO)—How often? (weekly, monthly, yearly)
Signs of any cuts? (YES/NO)
Are you sick in stomach, nauseous? (YES/NO)
Was there any vomiting following the head injury? (YES/NO)
Did you pass out at any time? (YES/NO)
When did you last eat? (Select hours ago: 2, 4, 6, 8)
When was your last X-ray? (Enter date)
When was your Last MRI? (Enter date)
Are you pregnant? (YES/NO/Not applicable)
Routing next: (ER, CAT scan, Admit to hospital for further testing/observation, Discharge)
Medications recommended: (morphine, aspirin, codeine)

In accordance with aspects and embodiments of the present embodiments described above, a signature of the patient can be captured on the data device such as to ensure informed consent of the patient to receive medical treatment, for example. In addition, the signature of the attending physician, nurse, or other healthcare professional can be captured and stored in association with a service report generated during examination/inspection of the patient as a quality control measure, for example.

It can be appreciated by those skilled in the art that various aspects of the present embodiments described hereinabove with respect to machines can be functionally and analogously applied to the present operational example within the scope of the present embodiments.

Operational Example 3

Financial Documents

In another operational example, an inspected item can include the financial information such as loan application information for a mortgage, for example, for a borrower seeking to procure the mortgage from a financial institution. As noted above, it can be seen that various aspects of the present embodiments applicable to the machine service operations and the patient treatment operations described above are equally and analogously applicable to the present operational example.

In one aspect, a social security number (compare serial number for machines—see above) of a borrower can be a key identifier for automatically populating a data screen with information regarding the borrower. Data such as borrower name, borrower address, borrower phone number, borrower date of birth, and other like personal information can be collected on a data screen, stored locally on the data device, communicated to a service administrator operatively associated with the financial institution, and/or otherwise processed in accordance with various aspects of the present embodiments described above. In one aspect, once borrower data is initially collected and stored, the borrower data can be subsequently retrieved and displayed upon entry of the social security number of the borrower, for example, or another suitable key identifier.

Customized checklist questions can be transmitted to a data device employed by a loan officer, for example, or other financial professional, to inspect or evaluate the financial condition of the borrower. Examples of checklist questions are provided as follows (with various data entry options such as drop-down menu selections, for example, illustrated in parenthesis next to each question as shown):

Social Security Number: (Enter Number)
Employer: (Enter Employer Name)
  Current position/job: (Enter Data)
  How long have you worked there: (more than two years, less than two years)
Annual Salary: (Enter Data)
Other Income: (Enter Data)
  Total Income: (Can be calculated field)
Provide three credit references: (Enter Data)
Bank references: (Enter Bank Information)
Debts:
  Installment loans: (Enter outstanding amount owed)
  Car loan: (Enter outstanding amount owed)
  Credit Cards: (Visa, American Express, MasterCard, Discover) other)
  Other debt: (Enter total outstanding amount owed)
Total Debt: (Can be calculated field)
Assets:
  Securities, Cash, Savings: (Enter Total Amount)
  Stocks: (Enter Total Amount)
  Bonds: (Enter Total Amount)
  Other Assets: (Enter Total Amount)
Total Assets: (Can be calculated field)
Are you guarantor to any debts of others? (YES/NO)
Are there any liens on your home: (YES/NO)
Are there any liens on any assets in your portfolio: (YES/NO)
Current debt payments per month: (Can be calculated field)
Current Income per month: (Can be calculated field)
Ratio of current debt to current income: (Can be calculated field)
% of income available for mortgage: (Can be calculated field)

In accordance with aspects and embodiments of the present embodiments described above, a signature of the borrower can be captured on the data device such as to warrant completeness and accuracy of financial information provided by the borrower, for example. In addition, the signature of the loan officer or other financial professional can be captured and stored in association with a service report generated during inspection of the financial information of the borrower.

It can be appreciated by those skilled in the art that various aspects of the present embodiments described hereinabove with respect to machines can be functionally and analogously applied to the present operational example within the scope of the present embodiments.

In other example aspects of the present embodiments, use of the time/date stamping functionality associated with login, completion of checklists, and/or other functions performed on a data device 6 can provide a time card function for an organization or other entity employing aspects of the present embodiments. The time card function can include one or more data screens for receiving and/or storing relevant information associated with the service technician, details of service operations to be performed, hours worked on service operations, mileage information, mileage charge data, time/date information, cycle time information, overtime hours worked on service operations, salary rates, and/or other time card related information. The time card function can be used to record, review and track employee work performance and activities such as, for example, a cycle time or times associated with work activities of a maintenance person performing one or more service operations on an inspected item.

In other example aspects of the present embodiments, the time/date when a service technician logs into a data device in response to a customer complaint about an inspected item can be collected and stored. Based on the time/date of the customer complaint, the time/date of the technician login responding to the complaint, and/or other factors, the service administrator 12, for example, can communicate a prompt to the service technician as reminder of the need to perform a follow-up activity in association with the customer complaint. Follow-up activities can include, without limitation, a prompt for the service technician to call the customer to discuss the customer complaint and what was done in response to the customer complaint, a reminder to close out a work order number, and/or other types of follow-up activities. In another aspect, the elapsed time from initiation of customer complaint to a follow-up activity notifying the customer of resolution of the complaint can be tracked, stored, and/or analyzed as a customer response time calculation suitable for assessing customer service effectiveness of an entity/organization providing service operations to the customer.

Figure 93:
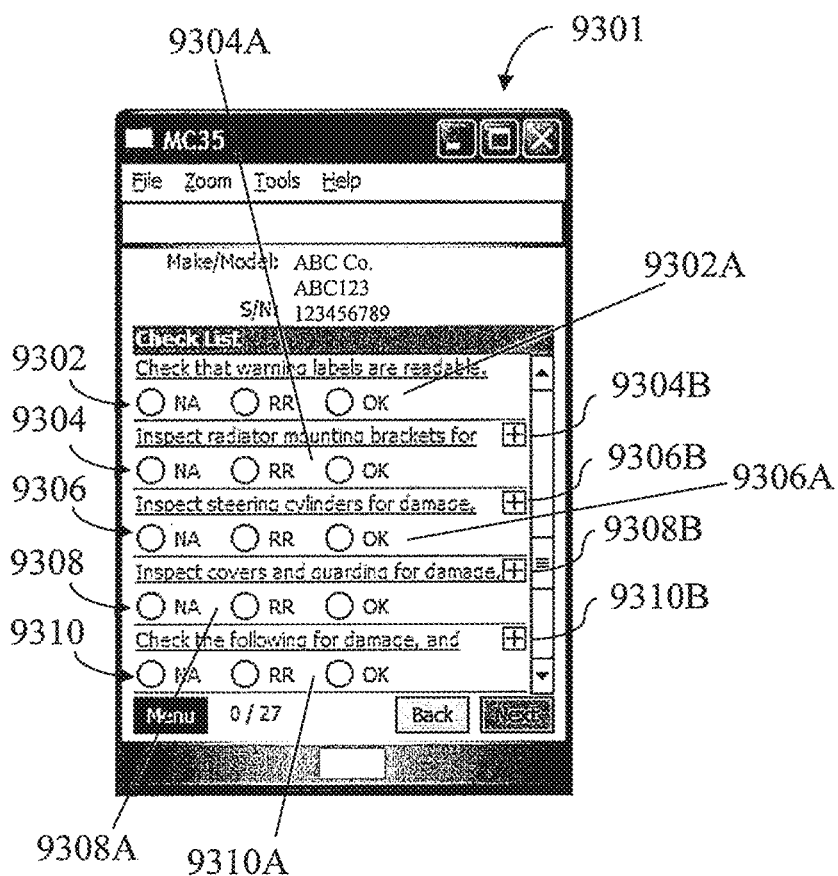
FIGS. 93 through 95 include examples of screen displays that may be configured for display on a data service device in accordance with various embodiments of the present embodiments.

In various embodiments, the checklist functionality described above may be enhanced with supplemental data screens associated with various service operations. For example, with reference to FIG. 93, a series of checklist items 9302, 9304, 9306, 9308, 9310 are shown on a screen display 9301 of a data service device. For each checklist item 9302-9310, a series of corresponding data entry options 9302A-9310A can be displayed for a user to complete with respect to performing the service operation. For example, such data entry options may include "NA" for "not applicable"; "RR" for "recommended repair"; or "OK" as an indication that the service operation has been completed or is otherwise satisfactory.

In certain situations, it may be desirable or useful to associate supplemental information with certain checklist items. For example, such supplemental information might include detailed instructions for performing an inspection-type service operation on an inspected item. Access to the supplemental information may be enabled by providing one or more links 9304B-9310B operatively associated with and corresponding to each of the checklist items 9304-9310. In the example illustrated by FIG. 93, the links 9304B-9310B are represented by plus signs.

Figure 94:
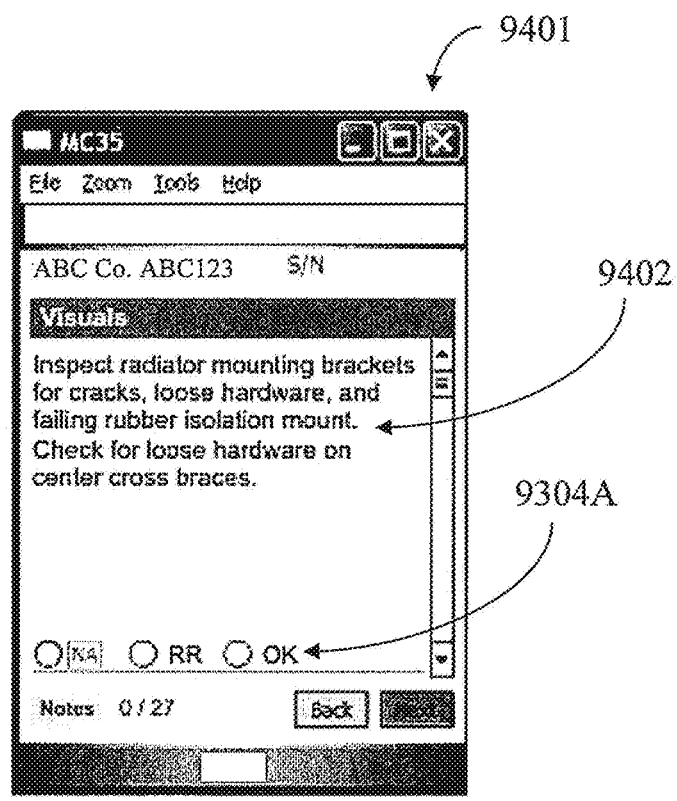
Figure 95:
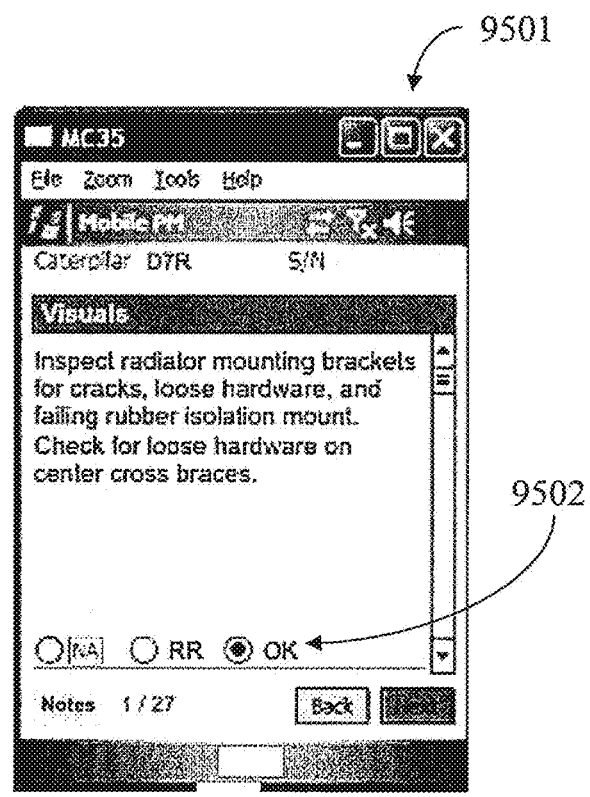

For example, selecting the link 9304B associated with checklist item 9304 may cause a supplemental data screen (i.e., screen display 9401 illustrated in FIG. 94) to be displayed on the data service device. In this example, supplemental information 9402 displayed on the supplemental data screen 9401 includes more detailed instructions on performing the visual inspection service operation of the checklist item 9304. It can be seen that the data entry options 9304A associated with the checklist item 9304 are retained on the supplemental data screen 9401 for convenient access by a user. The screen display 9501 of FIG. 95 illustrates selection of the "OK" data entry option 9502, wherein the data entry has been made from the supplemental data screen. In addition, a "Notes" function 9504 can be provide to allow a user to enter notes regarding the service operation, such as in accordance with note data entry features described above.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, digital versatile discs of all varieties (e.g., DVD's), optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be, for example and without limitation, either alone or in combination, a personal computer (PC), server-based computer, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein can include memory for storing certain software applications used in obtaining, processing, storing and/or communicating data. It can be appreciated that such memory can be internal or external, remote or local, with respect to its operatively associated computer or computer system. The memory can also include any means for storing software, including a hard disk, an optical disk, floppy disk, ROM (read only memory), RAM (random access memory), PROM (programmable ROM), EEPROM (extended erasable PROM), and other like computer-readable media.

In accordance with various embodiments discussed herein, wireless communication may be, for example and without limitation, communicated by satellite communications, infrared frequency, radio frequency, and/or communicated in accordance with a protocol such as IEEE 802.11, for example, among other types of wireless communication suitable for application to the present methods and systems.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention.

Use of language, nomenclature, numbering, and/or formatting is not intended to limit the scope of the present embodiments. Use of the "RR" for designation of "recommended repair" situation, for example, can be readily replaced by another functionally equivalent designation based on language, culture, customs, trade or industry practices, or other factors of a given environment in which service operations on an inspected item are performed.

It should be appreciated that figures presented herein are intended for illustrative purposes and are not intended for use as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the claims.

What is claimed is:

1. A system, comprising:
   a service data device configured for electronically displaying at least one data screen including at least one checklist configured for operative use in connection with a performance of at least one service operation on at least one inspected item, the service data device being portable and configured for processing a communication; and
   a service administrator computer system having at least one data storage medium configured for storing the at least one checklist displayed on the service data device, the service administrator computer system further comprising at least one server for enabling communication between the service administrator computer system and the service data device; and
   wherein the service data device is configured to electronically display the at least one checklist after synchronization with the service administrator computer system; and
   wherein the at least one checklist comprises a current checklist stored in the at least one data storage medium of the service administrator computer system, and wherein the at least one checklist comprises at least one checklist item; and
   wherein the at least one checklist item comprises a link to a supplemental data screen that when activated, causes the supplemental data screen to be displayed by the service data device; and
   wherein the supplemental data screen comprises current supplemental information that is associated with performing the at least one service operation on the at least one inspected item and that is associated with the at least one checklist item.

2. The system of claim 1, wherein the supplemental data screen comprises at least one field for receiving a data entry from a user of the service data device.

3. The system of claim 2, wherein the at least one field for receiving the data entry from the user comprises a field for text entry.

4. The system of claim 2, wherein the data service device is configured to receive a checklist selection through the supplemental data screen.

5. The system of claim 1, wherein the data service device is configured to receive notes associated with a service operation through the supplemental data screen.

6. The system of claim 1, wherein the supplemental data screen comprises instructions on performing the at least one service operation on the at least one inspected item.

7. The system of claim 1, wherein the at least one checklist item comprises a plurality of checklist items and each checklist item of the plurality of checklist items comprises a respective link to a respective supplemental data screen.

8. The system of claim 7, wherein each respective supplemental data screen comprises current supplemental information that is different from each other respective supplemental data screen.

9. The system of claim 1, wherein the at least one checklist comprises a plurality of data entry options corresponding to the at least one checklist item.

10. The system of claim 9, wherein the supplemental data screen comprises the plurality of data entry options corresponding to the at least one checklist item.

11. The system of claim 10, wherein the plurality of data entry options correspond to the at least one checklist item having the link to the supplemental data screen that was activated to cause the service data device to display the supplemental data screen.

12. The system of claim 11, wherein the plurality of data entry options are predetermined selection boxes.

13. The system of claim 1, wherein the supplemental data screen comprises a dialog box.

14. The system of claim 1, wherein the current supplemental information of the supplemental data screen comprises a condition of the at least one inspected item.

15. The system of claim 14, wherein the supplemental data screen comprises data entry field associated with the condition of the at least one inspected item.

16. The system of claim 1, wherein the at least one inspected item further comprises at least one bar code and wherein the service data device is configured to read the at least one bar code.

17. The system of claim 1, wherein the service data device is configured to receive a type of input data, wherein the type of input data is selected from the group consisting of text entered via a keyboard, text entered via a pen-based computer system, verbal communications, verbal communications recorded by one or more microphones, verbal communications transcribed into text format, digital image data, and digital photographic data.

18. The system of claim 1, wherein the service data device is configured for associating, with at least one report, a data entry received via the supplemental data screen from a user of the service data device.

19. The system of claim 1, wherein the service data device is configured for assisting with a performance of a least one fluid operation of the at least one inspected item.

20. The system of claim 1, wherein the service data device is configured for generating a summary of the at least one checklist item including the information of the supplemental data screen.

* * * * *